(12) United States Patent
Pankratov et al.

(10) Patent No.: US 10,954,066 B2
(45) Date of Patent: Mar. 23, 2021

(54) STORAGE AND RETRIEVAL SYSTEM

(71) Applicant: Symbotic LLC, Wilmington, MA (US)

(72) Inventors: Kirill K. Pankratov, Acton, MA (US); Juergen D. Conrad, York, PA (US); Robert Hsiung, Cambridge, MA (US); William Johnson, Jr., Wilmington, MA (US); Edward A. MacDonald, Somerville, MA (US); Larry M. Sweet, Atlanta, GA (US)

(73) Assignee: Symbolic LLC, Wilmington, MA (US)

( * ) Notice: Subject to any disclaimer, the term of this patent is extended or adjusted under 35 U.S.C. 154(b) by 0 days.

(21) Appl. No.: 16/284,930

(22) Filed: Feb. 25, 2019

(65) Prior Publication Data

US 2019/0256289 A1 Aug. 22, 2019

Related U.S. Application Data

(63) Continuation of application No. 14/997,902, filed on Jan. 18, 2016, now Pat. No. 10,214,355.

(Continued)

(51) Int. Cl.
*B65G 1/137* (2006.01)
*B65G 1/04* (2006.01)

(52) U.S. Cl.
CPC ............. *B65G 1/1373* (2013.01); *B65G 1/04* (2013.01)

(58) Field of Classification Search
CPC combination set(s) only.
See application file for complete search history.

(56) References Cited

U.S. PATENT DOCUMENTS 2,945,604 A 7/1960 Kroll et al.
2,996,621 A 8/1961 Barret, Jr.
(Continued)

FOREIGN PATENT DOCUMENTS

AT 506221 7/2009
CA 1252430 4/1989
(Continued)

OTHER PUBLICATIONS

International Search Report, International Application No. PCT/US2016/013877, dated May 20, 2016.
(Continued)

*Primary Examiner* — Kyle O Logan
(74) *Attorney, Agent, or Firm* — Perman & Green, LLP

(57) ABSTRACT

In accordance with one or more aspects of the disclosed embodiment, a lift includes at least one load handling device configured so as to reciprocate along a lift axis, the load handling device including a frame forming a payload section with a payload support surface having a common elevation configured to hold one or more pickfaces at the common elevation of the payload support surface, at least one transfer arm movably mounted to the frame, and a drive section connected to the load handling device and being configured to move the load handling device along the lift axis, wherein the one or more pickfaces carried in unison by the payload support surface of the at least one load handling device, define an order sequence of pickfaces on the at least one load handling device according to a predetermined case out order sequence of mixed cases.

22 Claims, 29 Drawing Sheets

US 10,954,066 B2

Page 2

Related U.S. Application Data

(60) Provisional application No. 62/104,552, filed on Jan. 16, 2015.

(56) References Cited

U.S. PATENT DOCUMENTS

| | | | |
|---|---|---|---|
| 3,455,468 | A | 7/1969 | Saul |
| 3,554,390 | A | 1/1971 | Saul |
| 3,677,421 | A | 7/1972 | Kinter et al. |
| 3,737,056 | A | 6/1973 | Hathcock, Jr. |
| 3,802,580 | A | 4/1974 | Castaldi |
| 3,970,840 | A | 7/1976 | De Bruine |
| 4,001,139 | A | 1/1977 | Long |
| 4,406,570 | A | 9/1983 | Duncan et al. |
| 4,428,708 | A | 1/1984 | Burt |
| 4,492,504 | A | 1/1985 | Hainsworth |
| 4,595,329 | A | 6/1986 | Marques |
| 4,678,390 | A | 7/1987 | Bonneton et al. |
| 4,679,149 | A | 7/1987 | Merz |
| 4,692,876 | A * | 9/1987 | Tenma ................ B65G 1/1371 414/791.6 |
| 4,716,530 | A | 12/1987 | Ogawa et al. |
| 4,786,229 | A | 11/1988 | Henderson |
| 4,811,229 | A | 3/1989 | Wilson |
| 4,936,738 | A | 6/1990 | Brennan et al. |
| 5,134,353 | A | 7/1992 | Kita et al. |
| 5,134,940 | A | 8/1992 | Fujita et al. |
| 5,135,344 | A | 8/1992 | Kita et al. |
| 5,179,329 | A | 1/1993 | Nishikawa et al. |
| 5,273,392 | A | 12/1993 | Bernard, II et al. |
| 5,333,982 | A | 8/1994 | Tanizawa et al. |
| 5,370,492 | A | 12/1994 | Gleyze et al. |
| 5,379,229 | A | 1/1995 | Parson et al. |
| 5,380,139 | A | 1/1995 | Pohjonen et al. |
| 5,403,147 | A | 4/1995 | Tanaka |
| 5,425,612 | A | 6/1995 | Ebstein |
| 5,472,309 | A | 12/1995 | Bernard, II et al. |
| 5,525,884 | A | 6/1996 | Sugiura et al. |
| 5,529,165 | A | 6/1996 | Shupert |
| 5,601,395 | A | 2/1997 | Lichti, Sr. et al. |
| 5,718,551 | A | 2/1998 | Ebstein |
| 5,764,014 | A | 6/1998 | Jakeway et al. |
| 5,801,506 | A | 9/1998 | Netzler |
| 583,341 | A | 11/1998 | Rosse III et al. |
| 5,839,872 | A | 11/1998 | Goto et al. |
| 5,908,283 | A * | 6/1999 | Huang .................. B65G 47/90 414/21 |
| 5,988,306 | A | 11/1999 | Ooishi |
| 6,036,427 | A | 3/2000 | Kita et al. |
| 6,061,607 | A | 5/2000 | Bradley et al. |
| 6,272,406 | B2 | 8/2001 | Alofs et al. |
| 6,325,586 | B1 | 12/2001 | Loy |
| 6,341,269 | B1 | 1/2002 | Burrows |
| 6,345,217 | B1 | 2/2002 | Zeitler et al. |
| 6,721,638 | B2 | 4/2004 | Zeitler |
| 6,748,292 | B2 | 6/2004 | Mountz |
| 6,923,612 | B2 | 8/2005 | Hansl |
| 6,929,440 | B1 | 8/2005 | Grond |
| 6,950,722 | B2 | 9/2005 | Mountz |
| 7,008,164 | B2 | 3/2006 | Rokkaku |
| 7,025,191 | B2 | 4/2006 | Litchi et al. |
| 7,266,422 | B1 | 9/2007 | Demotte et al. |
| 7,329,081 | B2 | 2/2008 | Baker et al. |
| 7,402,018 | B2 | 7/2008 | Mountz et al. |
| 7,495,561 | B2 | 2/2009 | Bodin et al. |
| 7,931,431 | B2 | 4/2011 | Benedict et al. |
| 8,425,173 | B2 | 4/2013 | Lert et al. |
| 8,480,347 | B2 | 7/2013 | Schafer |
| 8,594,835 | B2 | 11/2013 | Lert et al. |
| 8,596,952 | B2 | 12/2013 | Wolkerstorfer |
| 8,740,542 | B2 | 6/2014 | Wolkerstorfer |
| 8,790,061 | B2 | 7/2014 | Yamashita |
| 8,894,344 | B2 | 11/2014 | Merry et al. |
| 8,954,188 | B2 | 2/2015 | Sullivan et al. |
| 8,956,009 | B2 | 2/2015 | Olszak et al. |
| 8,956,099 | B2 | 2/2015 | Olszak et al. |
| 8,974,168 | B2 | 3/2015 | Yamashita |
| 9,008,884 | B2 | 4/2015 | Toebes et al. |
| 9,037,286 | B2 | 5/2015 | Lert |
| 9,315,323 | B2 | 4/2016 | Schubilske |
| 9,321,591 | B2 | 4/2016 | Lert et al. |
| 9,409,728 | B2 | 8/2016 | Bastian, II |
| 9,499,338 | B2 | 11/2016 | Toebes et al. |
| 9,555,967 | B2 | 1/2017 | Stevens |
| 9,856,083 | B2 | 1/2018 | Conrad et al. |
| 10,155,623 | B2 | 12/2018 | Conrad et al. |
| 10,377,585 | B2 | 8/2019 | Cyrullik et al. |
| 2002/0029719 | A1 | 3/2002 | Matsukawa |
| 2002/0076307 | A1 | 6/2002 | Fallin et al. |
| 2003/0033217 | A1 | 2/2003 | Cutlip |
| 2003/0185656 | A1 | 10/2003 | Hansl |
| 2003/0200129 | A1 | 10/2003 | Klaubauf et al. |
| 2004/0093116 | A1 | 5/2004 | Mountz |
| 2004/0197171 | A1 | 10/2004 | Freudelsperger |
| 2004/0238326 | A1 | 12/2004 | Litchi |
| 2005/0158154 | A1 | 7/2005 | Leerintveld et al. |
| 2006/0245862 | A1 | 11/2006 | Hansl et al. |
| 2006/0257236 | A1 | 11/2006 | Stingel, III et al. |
| 2007/0021864 | A1 | 1/2007 | Mountz et al. |
| 2007/0068700 | A1 | 3/2007 | Ohtsuki et al. |
| 2007/0177011 | A1 | 8/2007 | Lewin et al. |
| 2007/0288123 | A1 | 12/2007 | D'Andrea et al. |
| 2007/0290040 | A1 | 12/2007 | Wurman et al. |
| 2007/0293978 | A1 | 12/2007 | Wurman et al. |
| 2008/0001372 | A1 | 1/2008 | Hoffman et al. |
| 2008/0131241 | A1 | 6/2008 | King |
| 2008/0166217 | A1 | 7/2008 | Fontana |
| 2008/0215180 | A1 | 9/2008 | Kota |
| 2009/0074545 | A1 | 3/2009 | Lert, Jr. et al. |
| 2009/0114115 | A1 | 5/2009 | Minges |
| 2009/0185884 | A1 | 7/2009 | Wurman et al. |
| 2009/0308000 | A1 | 12/2009 | Corcoran |
| 2010/0222915 | A1* | 9/2010 | Kuehnemann ......... B65G 57/00 700/217 |
| 2010/0272546 | A1 | 10/2010 | Wolkerstorfer |
| 2010/0316468 | A1 | 12/2010 | Lert |
| 2010/0316469 | A1 | 12/2010 | Lert |
| 2010/0322747 | A1* | 12/2010 | Lert ...................... B65G 1/045 414/273 |
| 2012/0101627 | A1* | 4/2012 | Lert ..................... B65G 1/1378 700/216 |
| 2012/0141236 | A1 | 6/2012 | Korner |
| 2012/0185082 | A1* | 7/2012 | Toebes ................ B65G 1/0492 700/218 |
| 2012/0185122 | A1 | 7/2012 | Sullivan et al. |
| 2012/0186192 | A1* | 7/2012 | Toebes ..................... B65G 1/04 53/235 |
| 2012/0189409 | A1 | 7/2012 | Toebes et al. |
| 2012/0189416 | A1 | 7/2012 | Toebes |
| 2012/0195720 | A1 | 8/2012 | Sullivan et al. |
| 2012/0197431 | A1* | 8/2012 | Toebes ................ B65G 1/0492 700/217 |
| 2012/0330458 | A1 | 12/2012 | Weiss |
| 2013/0129453 | A1 | 5/2013 | Salichs |
| 2013/0209202 | A1 | 8/2013 | Schmit et al. |
| 2013/0245810 | A1 | 9/2013 | Sullivan et al. |
| 2014/0044506 | A1 | 2/2014 | De Vries |
| 2014/0056672 | A1 | 2/2014 | Mathys et al. |
| 2014/0088748 | A1 | 3/2014 | Woodtli et al. |
| 2014/0100999 | A1 | 4/2014 | Mountz et al. |
| 2014/0124462 | A1 | 5/2014 | Yamashita |
| 2014/0197171 | A1 | 7/2014 | Taylor |
| 2014/0277692 | A1 | 9/2014 | Buzan et al. |
| 2014/0350717 | A1 | 11/2014 | Dagle et al. |
| 2015/0098775 | A1 | 4/2015 | Razumov |
| 2015/0225187 | A1 | 8/2015 | Razumov |
| 2016/0016731 | A1 | 1/2016 | Razumov |
| 2016/0167880 | A1 | 6/2016 | Pankaratov et al. |
| 2016/0207709 | A1 | 7/2016 | Pankratov et al. |
| 2016/0207710 | A1 | 7/2016 | Conrad et al. |
| 2016/0207711 | A1 | 7/2016 | Pankratov et al. |
| 2016/0214797 | A1 | 7/2016 | Pankratov et al. |
| 2016/0214808 | A1 | 7/2016 | Cyrulik et al. |
| 2018/0111770 | A1 | 4/2018 | Cyrulik et al. |

(56) References Cited

U.S. PATENT DOCUMENTS

FOREIGN PATENT DOCUMENTS

| | | |
|---|---|---|
| CN | 203294644 | 11/2013 |
| CN | 203794044 | 8/2014 |
| DE | 4104527 | 8/1992 |
| DE | 20011661 | 12/2000 |
| DE | 10142395 | 11/2002 |
| DE | 2011106677 | 1/2013 |
| DE | 102011106677 | 1/2013 |
| EP | 0169156 | 1/1986 |
| EP | 737630 | 4/1996 |
| EP | 1598291 | 11/2005 |
| EP | 1627830 | 2/2006 |
| EP | 1775240 | 4/2007 |
| FR | 2730715 | 8/1996 |
| GB | 2407565 | 5/2005 |
| JP | 4723489 | 8/1977 |
| JP | 2003012119 | 1/2003 |
| JP | 2004123240 | 4/2004 |
| JP | 3102245 | 7/2004 |
| TW | 201328951 | 7/2013 |
| WO | 9534491 | 12/1995 |
| WO | 2004103883 | 12/2004 |
| WO | 2005009324 | 2/2005 |
| WO | 2005056943 | 6/2005 |
| WO | 2006095047 | 9/2006 |
| WO | 2009150684 | 12/2009 |
| WO | 2012156355 | 11/2012 |
| WO | 2013004695 | 1/2013 |
| WO | 2014145450 | 9/2014 |
| WO | 20160115565 | 7/2016 |

OTHER PUBLICATIONS

International Search Report, International Application No. PCT/US2015/065574, dated Feb. 12, 2016.
International Search Report, International Application No. PCT/US2016/014747, dated May 17, 2016.

* cited by examiner

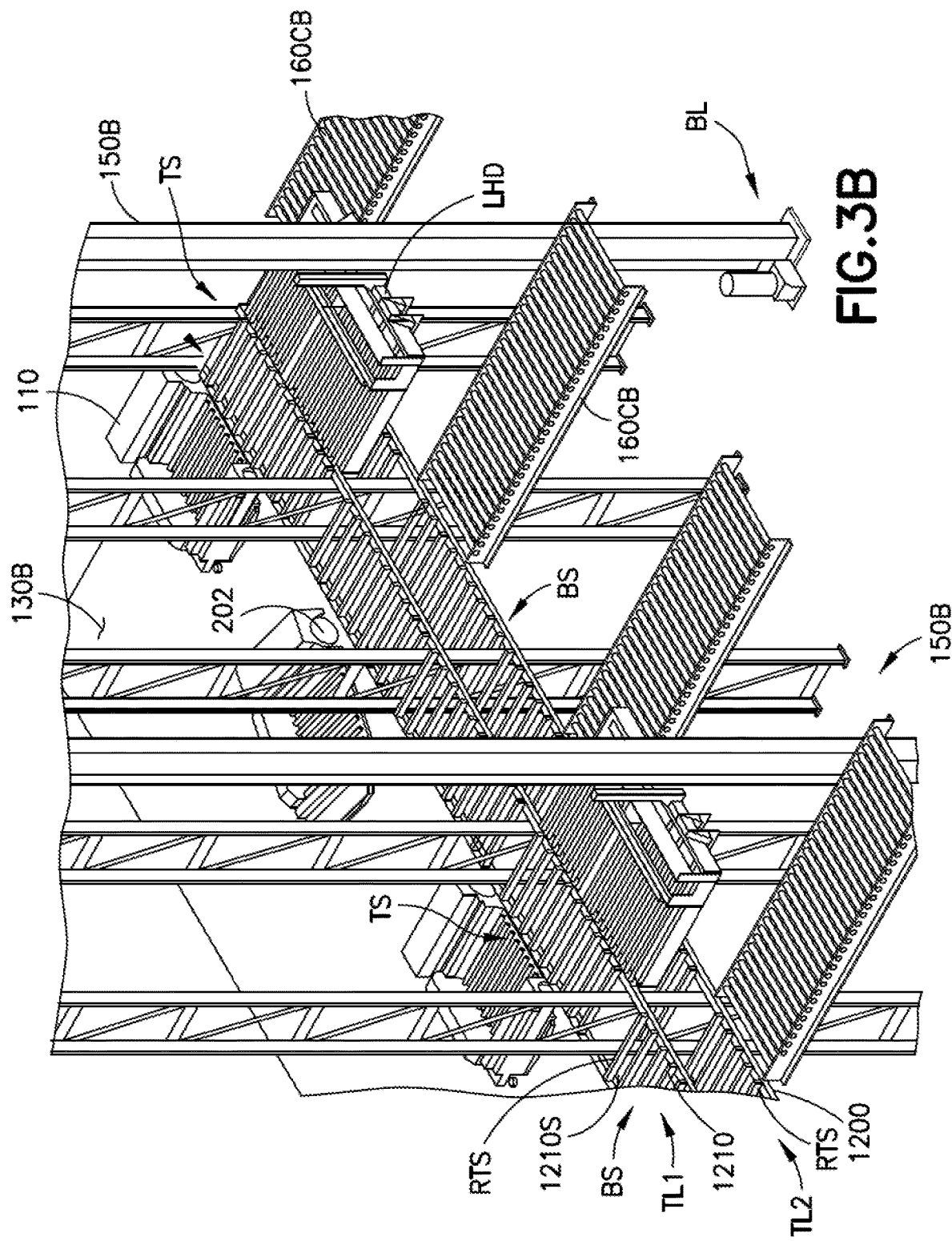

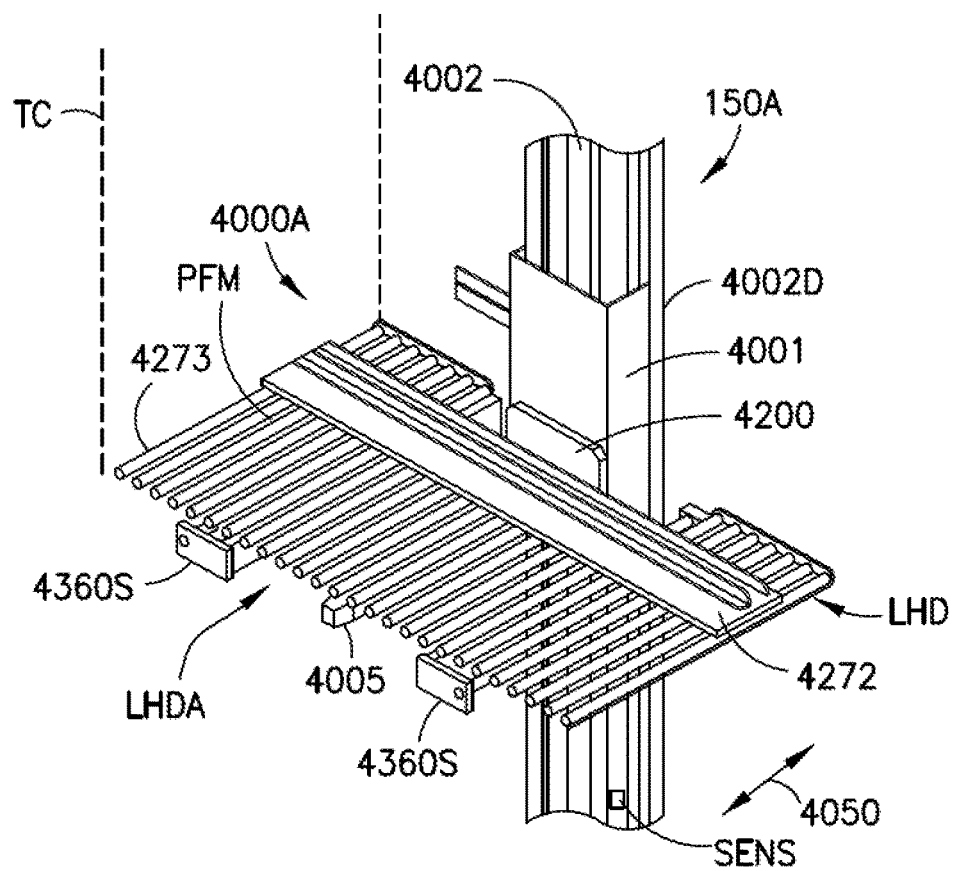
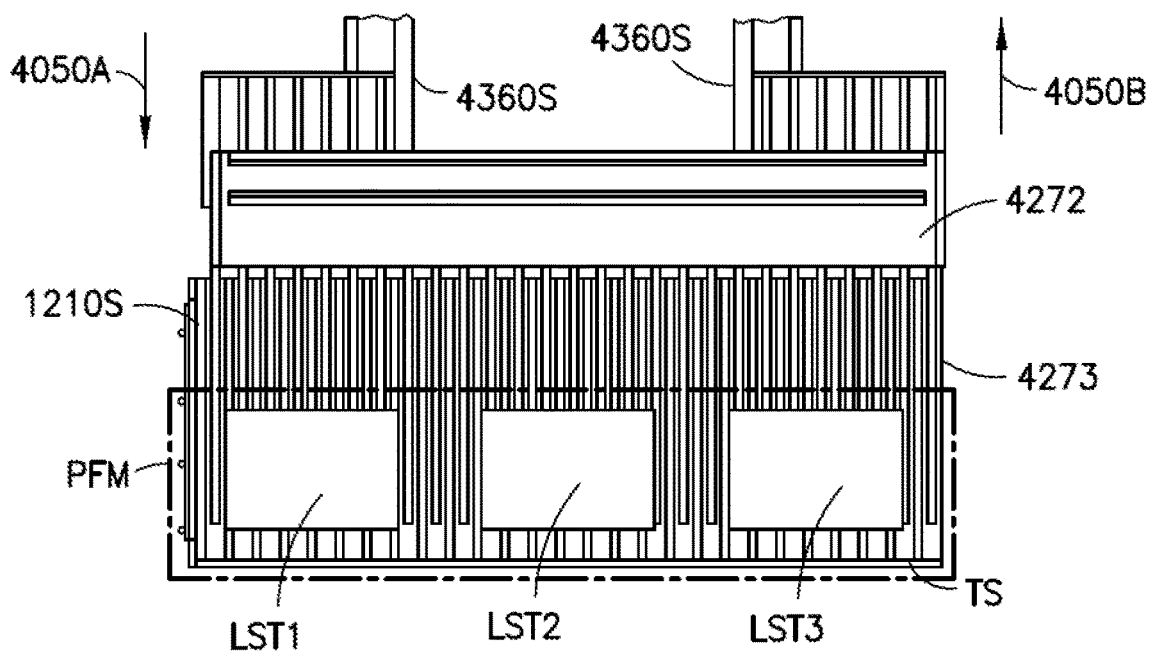
FIG.5A
FIG.5B

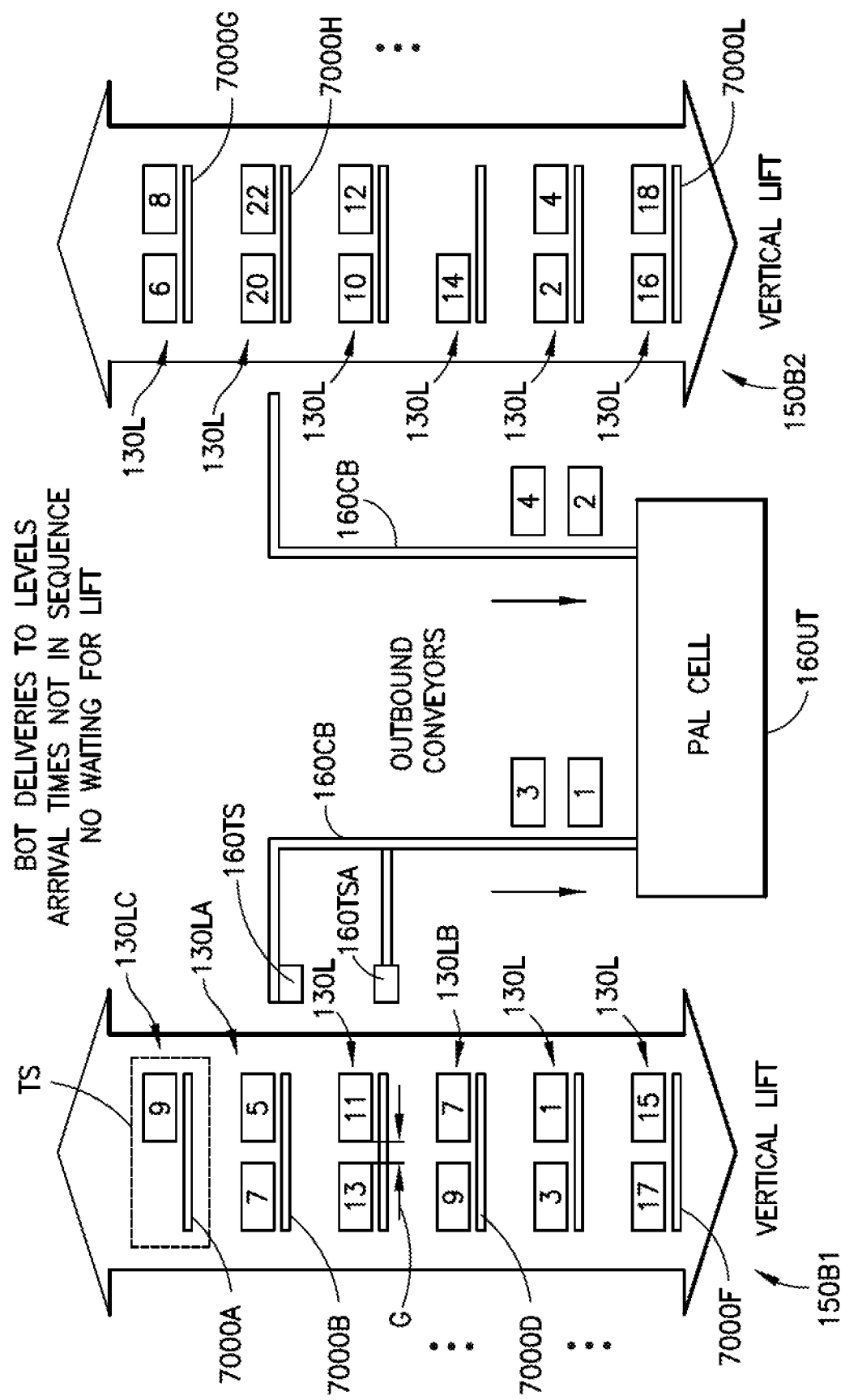

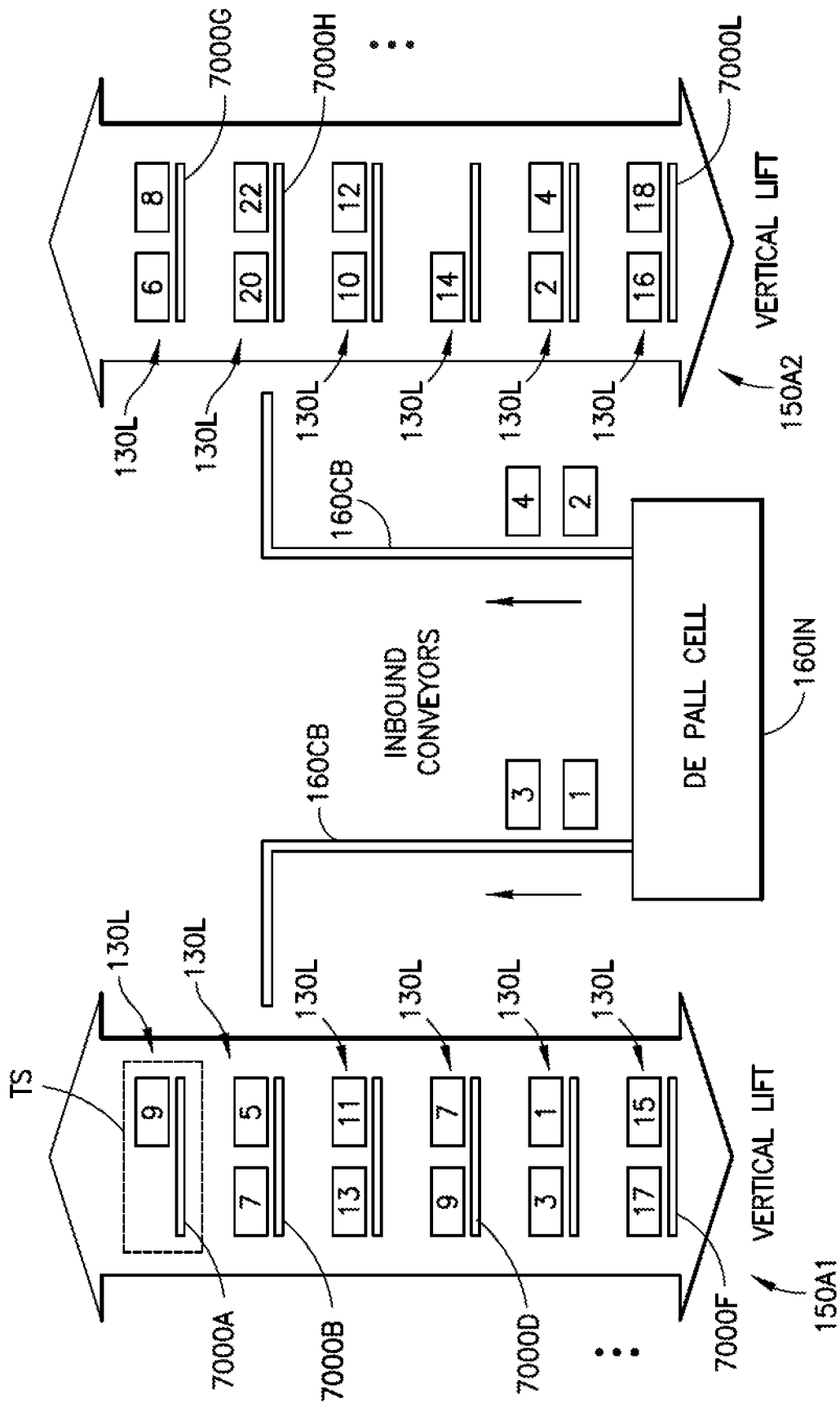

STORAGE AND RETRIEVAL SYSTEM

CROSS-REFERENCE TO RELATED APPLICATIONS

This application is a continuation of U.S. Non-Provisional patent application Ser. No. 14/997,902, filed on Jan. 18, 2016 (now U.S. Pat. No. 10,214,355, issued Feb. 26, 2019), which claims priority from and the benefit of United States Provisional Patent Application No. 62/104,552 filed on Jan. 16, 2015, the disclosures of which are incorporated by reference herein in its entirety.

This application is also related to U.S. patent application Ser. No. 14/966,978 filed on Dec. 11, 2015; U.S. patent application Ser. No. 14/997,892 filed on Jan. 15, 2016; U.S. patent application Ser. No. 14/997,925 filed on Jan. 15, 2016; U.S. patent application Ser. No. 14/997,920 filed on Jan. 15, 2016; and U.S. Provisional Patent Application No. 62/107,135 filed on Jan. 23, 2015, the disclosures of which are incorporated herein by reference in their entireties.

BACKGROUND

1. Field

The exemplary embodiments generally relate to material handling systems and, more particularly, to transport and storage of items within the material handling system.

2. Brief Description of Related Developments

Multilevel storage and retrieval systems may be used in warehouses for the storage and retrieval of goods. Generally the transportation of goods into and out of the storage structure is done with lifts for transfer to a vehicle on a storage level, vehicles travelling up ramps to a predetermined storage level, or with vehicles that include lifts traveling along guide ways. Goods stored within the storage and retrieval system are generally stored in storage spaces on each storage level such that a transport vehicle disposed on that level has access to one level of storage spaces. Generally, the lifts that transfer items to and from the storage spaces carry the vehicles between different storage levels, are incorporated into the vehicles (such as with a gantry crane) or have a paternoster configuration where the lift payload shelves continually circulate around a frame at a predetermined rate.

It would be advantageous to increase a rate of item transfer to and from the different storage levels within a storage and retrieval system independent of the transfer vehicles that deliver the items to the storage spaces.

BRIEF DESCRIPTION OF THE DRAWINGS

The foregoing aspects and other features of the disclosed embodiment are explained in the following description, taken in connection with the accompanying drawings, wherein:

FIGS. 3A and 3B are schematic illustrations of portions of the storage and retrieval system in accordance with aspects of the disclosed embodiment;

FIGS. 5A, 5B, 5C, 5D, 5E, 5F and 5G are schematic illustrations of portions of the storage and retrieval system in accordance with aspects of the disclosed embodiment;

FIG. 6 is a schematic illustration of a portion of the storage and retrieval system in accordance with aspects of the disclosed embodiment;

FIG. 6A is a schematic illustration of a portion of the storage and retrieval system in accordance with aspects of the disclosed embodiment;

DETAILED DESCRIPTION

Figure 1:
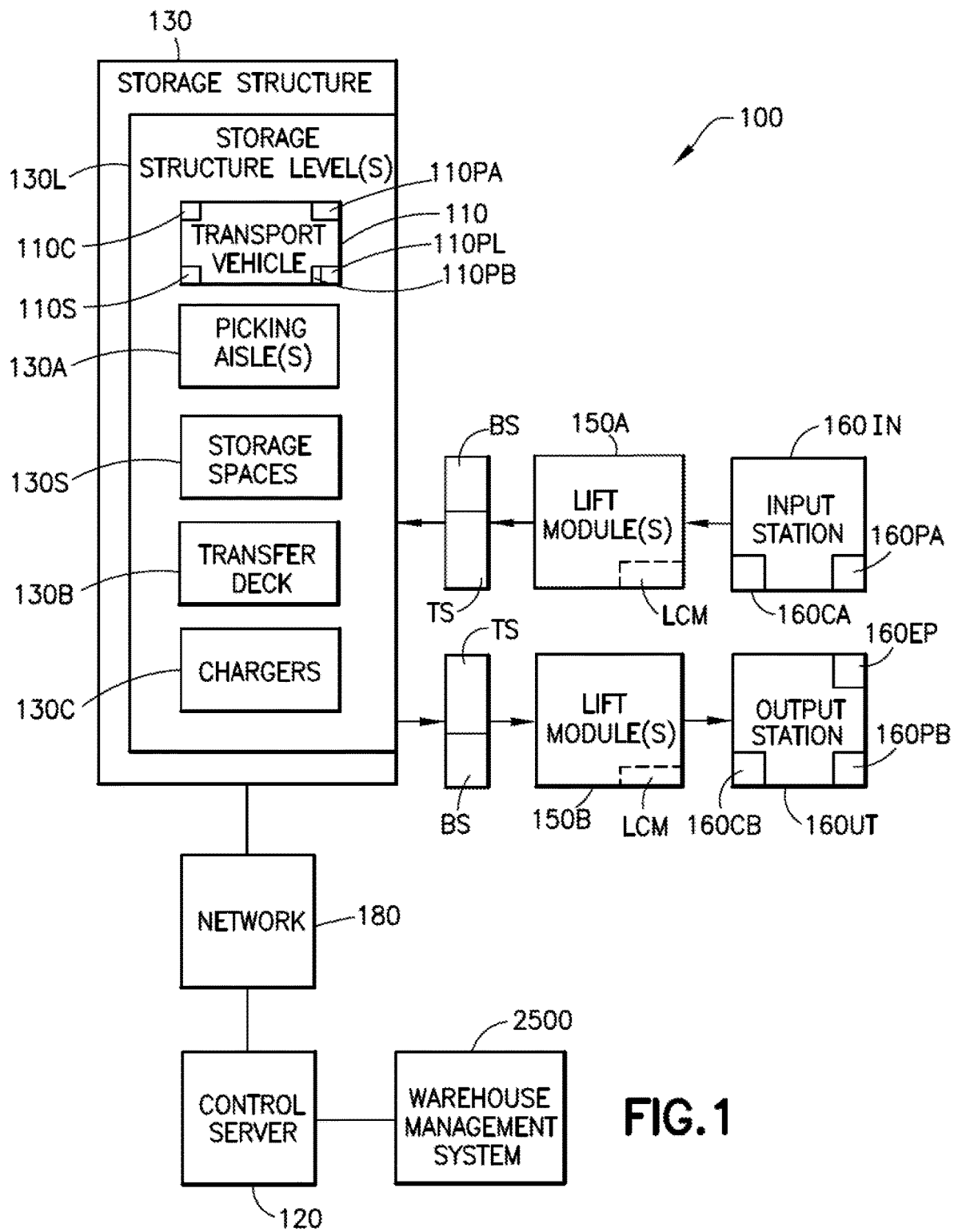
FIG. 1 is a schematic illustration of an automated storage and retrieval system in accordance with aspects of the disclosed embodiment.

FIG. 1 is a schematic illustration of an automated storage and retrieval system 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

In accordance with aspects of the disclosed embodiment the automated storage and retrieval system 100 may operate in a retail distribution center or warehouse to, for example, fulfill orders received from retail stores for case units such as those described in U.S. patent application Ser. No. 13/326,674 filed on Dec. 15, 2011, the disclosure of which is incorporated by reference herein in its entirety. For example, the case units are cases or units of goods not stored in trays, on totes or on pallets (e.g. uncontained). In other examples, the case units are cases or units of goods that are contained in any suitable manner such as in trays, on totes or on pallets. In still other examples, the case units are a combination of uncontained and contained items. It is noted that the case units, for example, include cased units of goods (e.g. case of soup cans, boxes of cereal, etc.) or individual goods that are adapted to be taken off of or placed on a pallet. In accordance with the aspects of the disclosed embodiment, shipping cases for case units (e.g. cartons, barrels, boxes, crates, jugs, or any other suitable device for holding case units) may have variable sizes and may be used to hold case units in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different case units (e.g. a mixed pallet where each mixed pallet holds different types of case units—a pallet holds a combination of soup and cereal) that are provided to, for example the palletizer in a sorted arrangement for forming the mixed pallet. In the embodiments the storage and retrieval system described herein may be applied to any environment in which case units are stored and retrieved.

Figure 2:
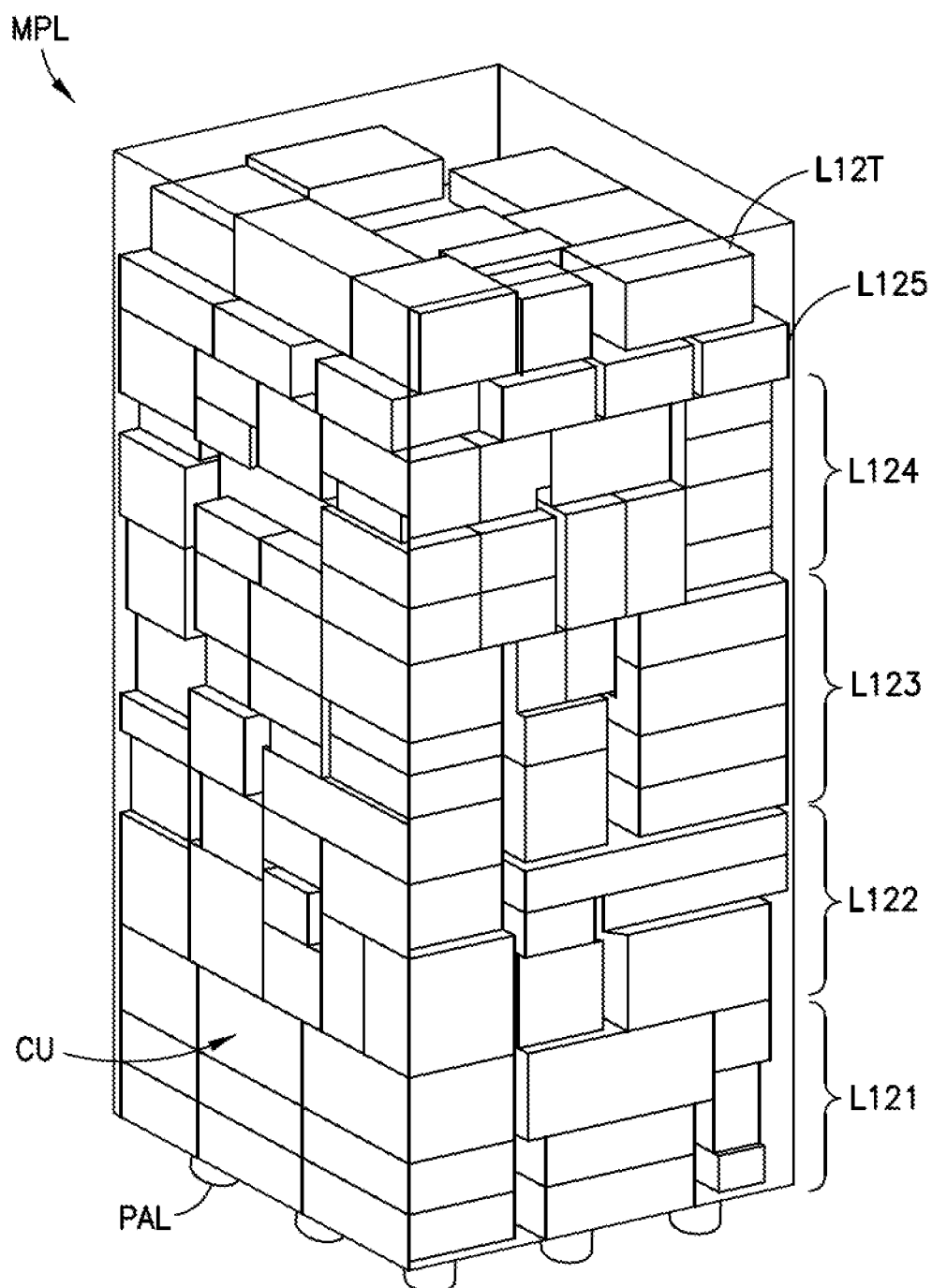
FIG. 2 is a schematic illustration of a mixed pallet load formed by the automated storage and retrieval system in accordance with aspects of the disclosed embodiment.
Figure 16:
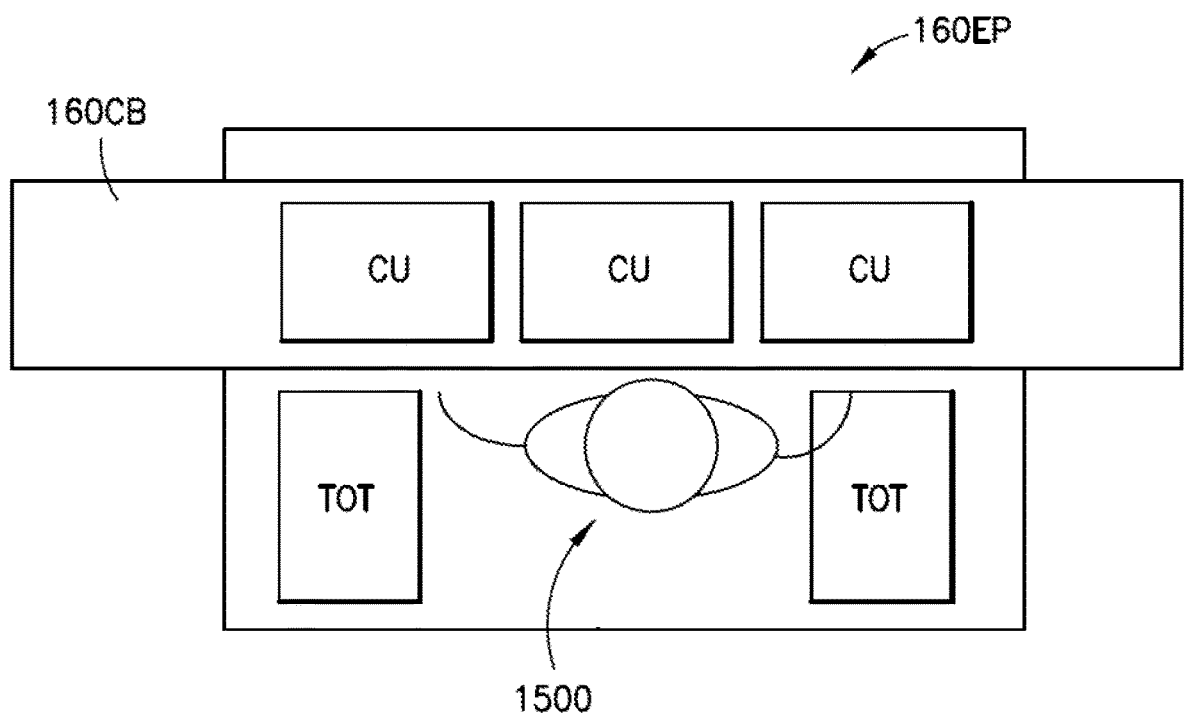
FIG. 16 is a schematic illustration of an operator station of the storage and retrieval system in accordance with aspects of the disclosed embodiment.

Also referring to FIG. 2, it is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets PAL leave the storage and retrieval system 100, with cases filling replenishment orders, the pallets PAL may contain any suitable number and combination of different case units CU (e.g. each pallet may hold different types of case units—a pallet holds a combination of canned soup, cereal, beverage packs, cosmetics and household cleaners). The cases combined onto a single pallet may have different dimensions and/or different SKU's. In one aspect of the exemplary embodiment, the storage and retrieval system 100 may be configured to generally include an in-feed section, a storage and sortation section (where, in one aspect, storage of items is optional) and an output section as will be described in greater detail below. As may be realized, in one aspect of the disclosed embodiment, the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and assemble the corresponding groups of cases into what may be referred to as mixed case pallet loads MPL. As may also be realized, as illustrated in FIG. 16, in one aspect of the disclosed embodiment the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and sequence the corresponding groups of cases (in the manner described herein) at an operator station 160EP where items are picked from the different case units CU, and/or the different case units CU themselves, are placed in one or more bag(s), tote(s) or other suitable container(s) TOT by an operator 1500, or any suitable automation, in a predetermined order sequence of picked items according to, for example, an order, fulfilling one or more customer orders, in which the case units CU are sequenced at the operator station 160EP in accordance with the predetermined order sequence, noting that the sequencing of the case units CU as described herein effects the sequencing of the case units CU at the operator station 160EP.

The in-feed section may generally be capable of resolving the uniform pallet loads to individual cases, and transporting the cases via suitable transport, for input to the storage and sortation section. The storage and sortation section in one aspect receives individual cases, stores them in a storage area and retrieves desired cases individually in accordance with commands generated in accordance to orders entered into a warehouse management system for transport to the output section. In other aspects, the storage and sortation section receives individual cases, sorts the individual cases (utilizing, for example, the buffer and interface stations described herein) and transfers the individual cases to the output section in accordance to orders entered into the warehouse management system. The sorting and grouping of cases according to order (e.g. an order out sequence) may be performed in whole or in part by either the storage and retrieval section or the output section, or both, the boundary between being one of convenience for the description and the sorting and grouping being capable of being performed any number of ways. The intended result is that the output section assembles the appropriate group of ordered cases, that may be different in SKU, dimensions, etc. into, in one aspect, mixed case pallet loads in the manner described in, for example, U.S. patent application Ser. No. 13/654,293 filed on Oct. 17, 2012, (now U.S. Pat. No. 8,965,559) the disclosure of which is incorporated herein by reference in its entirety, while in other aspects the output section assembles the appropriate group of ordered case units, that may be different in SKU, dimensions, etc. into bags, totes or other suitable containers according to the predetermined order sequence of picked items at the operator station 160E (such as to fill e.g., a customer order).

In one aspect of the exemplary embodiment, the output section generates the pallet load in what may be referred to as a structured architecture of mixed case stacks. The structured architecture of the pallet load described herein is representative and in other aspects the pallet load may have any other suitable configuration. For example, the structured architecture may be any suitable predetermined configuration such as a truck bay load or other suitable container or load container envelope holding a structural load. The structured architecture of the pallet load may be characterized as having several flat case layers L121-L125, L12T, at least one of which is formed of non-intersecting, free-standing and stable stacks of multiple mixed cases. The mixed case stacks of the given layer have substantially the same height, to form as may be realized substantially flat top and bottom surfaces of the given layer, and may be sufficient in number to cover the pallet area, or a desired portion of the pallet area. Overlaying layer(s) may be orientated so that corresponding cases of the layer(s) bridge between the stacks of the supporting layer. Thus, stabilizing the stacks and correspondingly the interfacing layer(s) of the pallet load. In defining the pallet load into a structured layer architecture, the coupled 3-D pallet load solution is resolved into two parts that may be saved separately, a vertical (1-D) part resolving the load into layers, and a horizontal (2-D) part of efficiently distributing stacks of equal height to fill out the pallet height of each layer. In other aspects the load fill of mixed cases may be configured in any other suitable ordered sequence and may be loaded on or in any suitable transport device such as, for example, a bag, tote, shopping carriage, a truck or other suitable container fill without palletization. As will be described below, the storage and retrieval system outputs case units to the output section so that the two parts of the 3-D pallet load solution are resolved, while in other aspects the storage and retrieval system outputs case units to the output section according to a sequence for filling non-palletized item picking sequence orders at the operator station 160EP. The predetermined structure of the mixed pallet load defines an order of case units, whether the case units are a singular case unit pickface or a combined case unit pickface provided by the sortation and output sections to a load construction system (which may be automated or manual loading). The term load fill or container fill as used herein refers to case units that are delivered to either a pallet load fill section/cell (such as for the creation of a mixed pallet load MPL) or an itemized load fill section/cell as described with respect to FIG. 16 where both the pallet load fill section/cell and the itemized load fill section/cell are referred to generally as load fill section/ station or cell.

In accordance with aspects of the disclosed embodiment, referring again to FIG. 1, the automated storage and retrieval system 100 includes input stations 160IN (which include depalletizers 160PA, operator stations 160EP and/or conveyors 160CA for transporting items to lift modules for entry into storage) and output stations 160UT (which include palletizers 160PB and/or conveyors 160CB for transporting case units from lift modules for removal from storage), input and output vertical lift modules 150A, 150B (generally referred to as lift modules 150—it is noted that while input and output lift modules are shown, a single lift module may be used to both input and remove case units from the storage structure), a storage structure 130, and a number of autonomous transport vehicles 110 (referred to herein as "bots"). As used herein the lift modules 150, storage structure 130 and bots 110 may be collectively referred to herein as the storage and sorting section noted above. It is also noted that the depalletizers 160PA may be configured to remove case units from pallets so that the input station 160IN can transport the items to the lift modules 150 for input into the storage structure 130. The palletizers 160PB may be configured to place items removed from the storage structure 130 on pallets PAL (FIG. 2) for shipping.

Figure 3A:
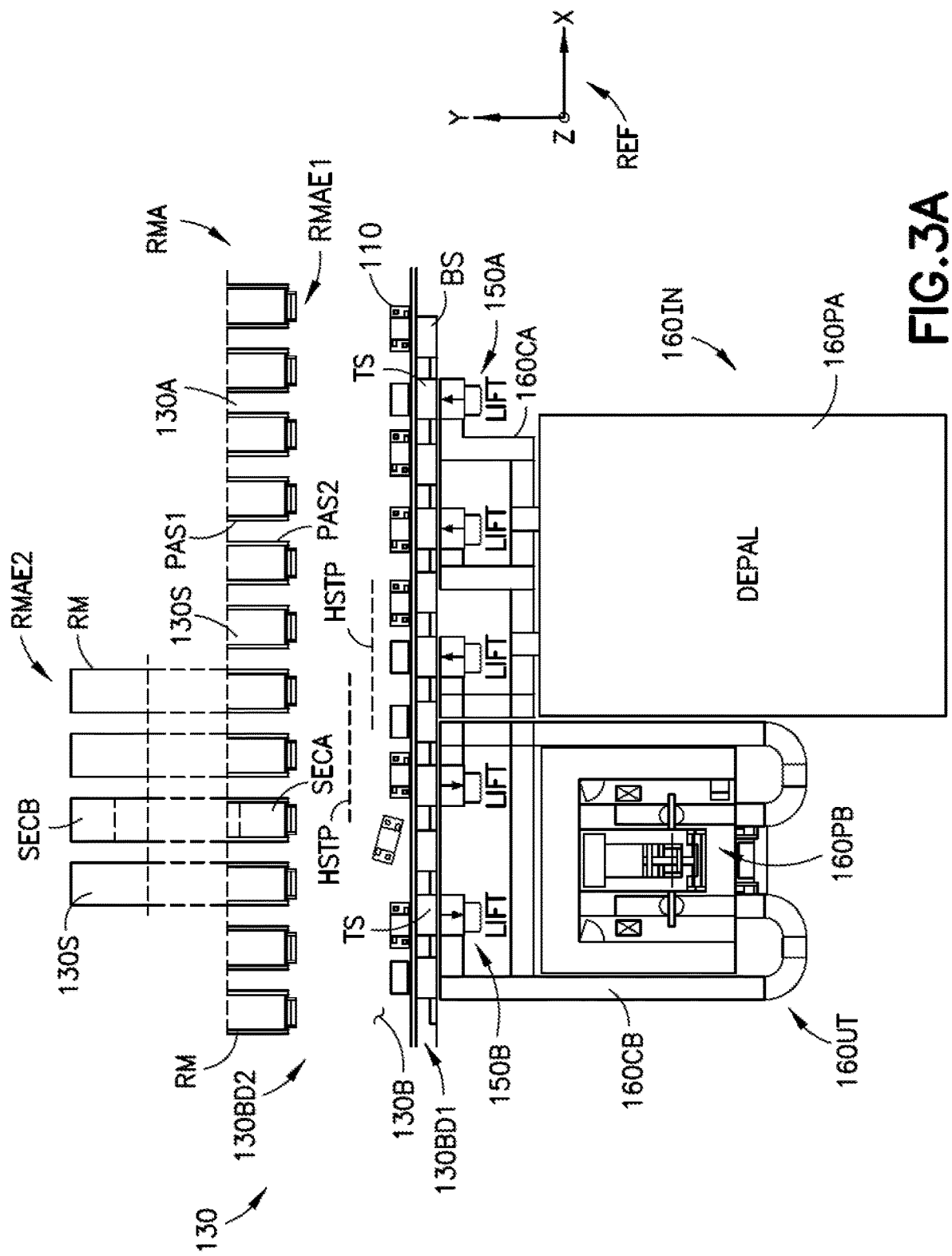

Also referring to FIG. 3A, the storage structure 130 may include multiple storage rack modules RM, configured in a three dimensional array RMA, that are accessible by storage or deck levels 130L. Each storage level 130L includes pickface storage/handoff spaces 130S (referred to herein as storage spaces 130S) formed by the rack modules RM where the rack modules include shelves that are disposed along storage or picking aisles 130A which, e.g., extend linearly through the rack module array RMA and provide access to the storage spaces 130S and transfer deck(s) 130B over which the bots 110 travel on a respective storage level 130L for transferring case units between any of the storage spaces 130S of the storage structure 130 (e.g. on the level which the bot 110 is located) and any of the lift modules 150 (e.g. each of the bots 110 has access to each storage space 130S on a respective level and each lift module 150 on a respective storage level 130L). The transfer decks 130B are arranged at different levels (corresponding to each level 130L of the storage and retrieval system) that may be stacked one over the other or horizontally offset, such as having one transfer deck 130B at one end or side RMAE1 of the storage rack array RMA or at several ends or sides RMAE1, RMAE2 of the storage rack array RMA as described in, for example, U.S. patent application Ser. No. 13/326,674 filed on Dec. 15, 2011 the disclosure of which is incorporated herein by reference in its entirety.

The transfer decks 130B are substantially open and configured for the undeterministic traversal of bots 110 across and along the transfer decks 130B. As may be realized, the transfer deck(s) 130B at each storage level 130L communicate with each of the picking aisles 130A on the respective storage level 130L. Bots 110 bi-directionally traverse between the transfer deck(s) 130B and picking aisles 130A on each respective storage level 130L to access the storage spaces 130S disposed in the rack shelves alongside each of the picking aisles 130A (e.g. bots 110 may access storage spaces 130S distributed on both sides of each aisle such that the bot 110 may have a different facing when traversing each picking aisle 130A, for example, referring to FIG. 3B, drive wheels 202 leading a direction of travel or drive wheels trailing a direction of travel). As noted above, the transfer deck(s) 130B also provide bot 110 access to each of the lifts 150 on the respective storage level 130L where the lifts 150 feed and remove case units to and/or from each storage level 130L and where the bots 110 effect case unit transfer between the lifts 150 and the storage spaces 130S. As described above, referring also to FIG. 3A, in one aspect the storage structure 130 includes multiple storage rack modules RM, configured in a three dimensional array RMA where the racks are arranged in aisles 130A, the aisles 130A being configured for bot 110 travel within the aisles 130A. The transfer deck 130B has an undeterministic transport surface on which the bots 100 travel where the undeterministic transport surface 130BS has more than one juxtaposed travel lane (e.g. high speed bot travel paths HSTP) connecting the aisles 130A. As may be realized, the juxtaposed travel lanes are juxtaposed along a common undeterministic transport surface 130BS between opposing sides 130BD1, 130BD2 of the transfer deck 130B. As illustrated in FIG. 3A, in one aspect the aisles 130A are joined to the transfer deck 130B on one side 130BD2 of the transfer deck 130B but in other aspects, the aisles are joined to more than one side 130BD1, 130BD2 of the transfer deck 130B in a manner substantially similar to that described in U.S. patent application Ser. No. 13/326,674 filed on Dec. 15, 2011, the disclosure of which is previously incorporated by reference herein in its entirety. As will be described in greater detail below the other side 130BD1 of the transfer deck 130B includes deck storage racks (e.g. interface stations TS and buffer stations BS) that are distributed along the other side 130BD1 of the transfer deck 130B so that at least one part of the transfer deck is interposed between the deck storage racks and the aisles 130A. The deck storage racks are arranged along the other side 130BD1 of the transfer deck 130B so that the deck storage racks communicate with the bots 110 from the transfer deck 130B and with the lift modules 150 (e.g. the deck storage racks are accessed by the bots 110 from the transfer deck 130B and by the lifts 150 for picking and placing pickfaces so that pickfaces are transferred between the bots 110 and the deck storage racks and between the deck storage racks and the lifts 150 and hence between the bots 110 and the lifts 150).

Each storage level 130L may also include charging stations 130C for charging an on-board power supply of the bots 110 on that storage level 130L such as described in, for example, U.S. patent application Ser. No. 14/209,086 filed on Mar. 13, 2014 and Ser. No. 13/326,823 filed on Dec. 15, 2011, (now U.S. Pat. No. 9,082,112) the disclosures of which are incorporated herein by reference in their entireties.

The bots 110 may be any suitable independently operable autonomous transport vehicles that carry and transfer case units throughout the storage and retrieval system 100. In one aspect the bots 110 are automated, independent (e.g. free riding) autonomous transport vehicles. Suitable examples of bots can be found in, for exemplary purposes only, U.S. patent application Ser. No. 13/326,674 filed on Dec. 15, 2011; U.S. patent application Ser. No. 12/757,312 filed on Apr. 9, 2010, (now U.S. Pat. No. 8,425,173); U.S. patent application Ser. No. 13/326,423 filed on Dec. 15, 2011; U.S.

patent application Ser. No. 13/326,447 filed on Dec. 15, 2011, (now U.S. Pat. No. 8,965,619); U.S. patent application Ser. No. 13/326,505 Dec. 15, 2011, (now U.S. Pat. No. 8,696,010); U.S. patent application Ser. No. 13/327,040 filed on Dec. 15, 2011, (now U.S. Pat. No. 9,187,244); U.S. patent application Ser. No. 13/326,952 filed on Dec. 15, 2011; U.S. patent application Ser. No. 13/326,993 filed on Dec. 15, 2011; U.S. patent application Ser. No. 14/486,008 filed on Sep. 15, 2014; and United States Provisional Patent Application No. 62/107,315 filed on Jan. 23, 2015 the disclosures of which are incorporated by reference herein in their entireties. The bots 110 (described in greater detail below) may be configured to place case units, such as the above described retail merchandise, into picking stock in the one or more levels of the storage structure 130 and then selectively retrieve ordered case units.

The bots 110, lift modules 150 and other suitable features of the storage and retrieval system 100 are controlled in any suitable manner such as by, for example, one or more central system control computers (e.g. control server) 120 through, for example, any suitable network 180. In one aspect the network 180 is a wired network, a wireless network or a combination of wireless and wired networks using any suitable type and/or number of communication protocols. In one aspect, the control server 120 includes a collection of substantially concurrently running programs (e.g. system management software) for substantially automatic control of the automated storage and retrieval system 100. The collection of substantially concurrently running programs, for example, being configured to manage the storage and retrieval system 100 including, for exemplary purposes only, controlling, scheduling, and monitoring the activities of all active system components, managing inventory (e.g. which case units are input and removed, the order in which the cases are removed and where the case units are stored) and pickfaces (e.g. one or more case units that are movable as a unit and handled as a unit by components of the storage and retrieval system), and interfacing with a warehouse management system 2500. The control server 120 may, in one aspect, be configured to control the features of the storage and retrieval system in the manner described herein. For simplicity and ease of explanation the term "case unit(s)" is generally used herein for referring to both individual case units and pickfaces (formed of one or multiple case units). In one aspect, as will be described herein the control server 120 is connected to the lift modules 150 for controlling the lift modules 150 as described herein. In other aspects the lift modules 150 include a lift controller LCM connected to the control server 120 where one or more of the lift controller LCM and the control server 120 control the lift modules as described herein. In one aspect, one or more of the lift controller LCM and the control server 120 are configured to control the lift modules 150 to effect picking more than one pickface with the common payload support platform, and an on-the-fly sortation of the more than one pickface with the common payload support platform as described herein. In one aspect, one or more of the lift controller LCM and the control server 120 is configured to control the lift modules 150 to effect picking of the more than one pickface, with the common payload support platform, in an ordered sequence and placing the one or more pickfaces, with the common payload support platform, in the ordered sequence at an outbound pickface holding location as described herein. In one aspect one or more of the lift controller LCM and the control server 120 is configured to control the lift modules 150 to effect the on-the-fly sortation of the more than one pickface where the common payload support platform traverses a stack of pickface holding locations in a common direction as described herein. In one aspect one or more of the lift controller LCM and the control server 120 is configured to control the lift modules 150 to effect placement of more than one pickface at an outbound pickface holding location in one offload step, where the more than one pickface has a sorted arrangement at offload as described herein.

Figure 1A:
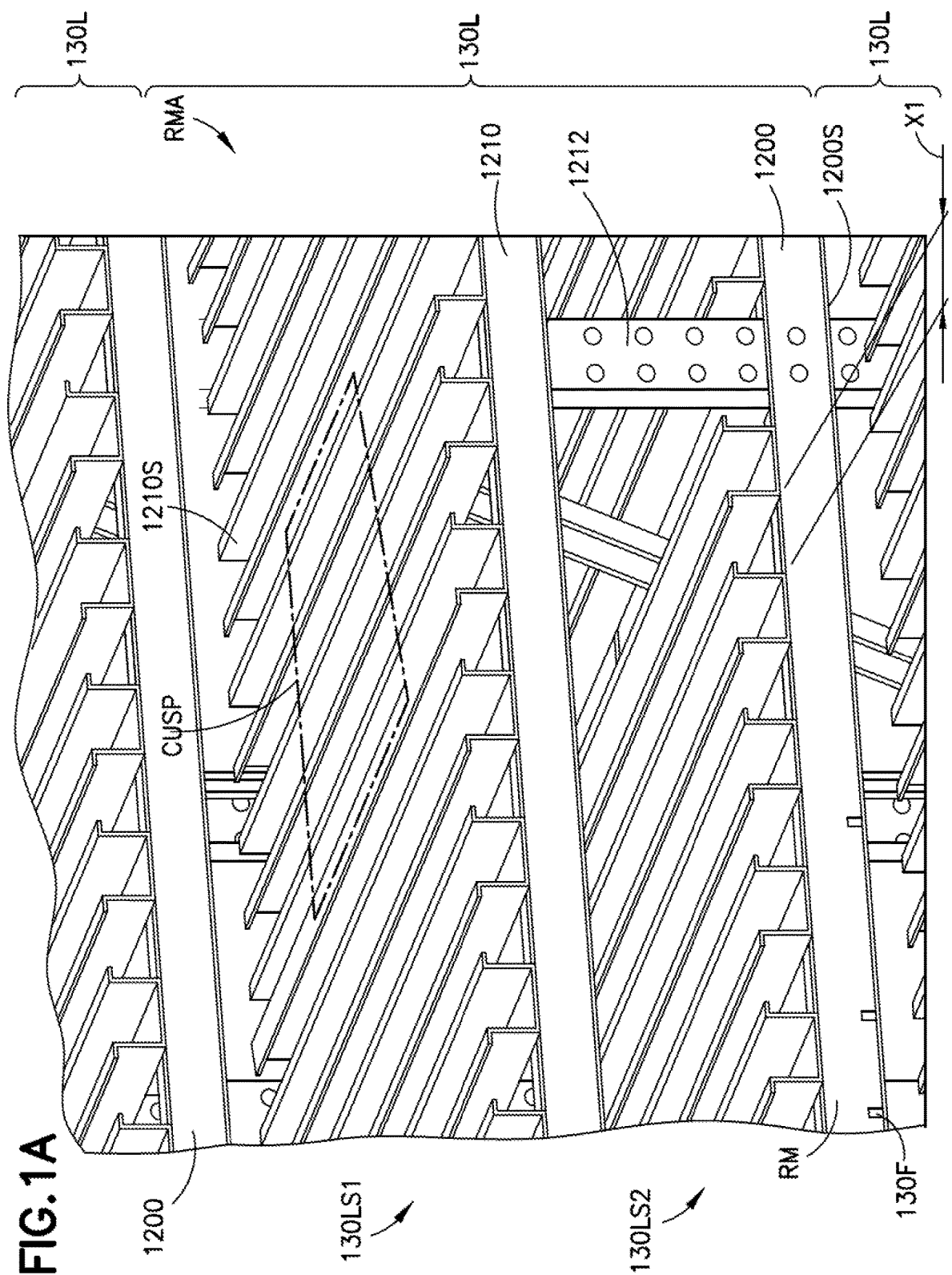
FIG. 1A is a schematic illustration of a portion of the storage and retrieval system in accordance with aspects of the disclosed embodiment.
Figure 1B:
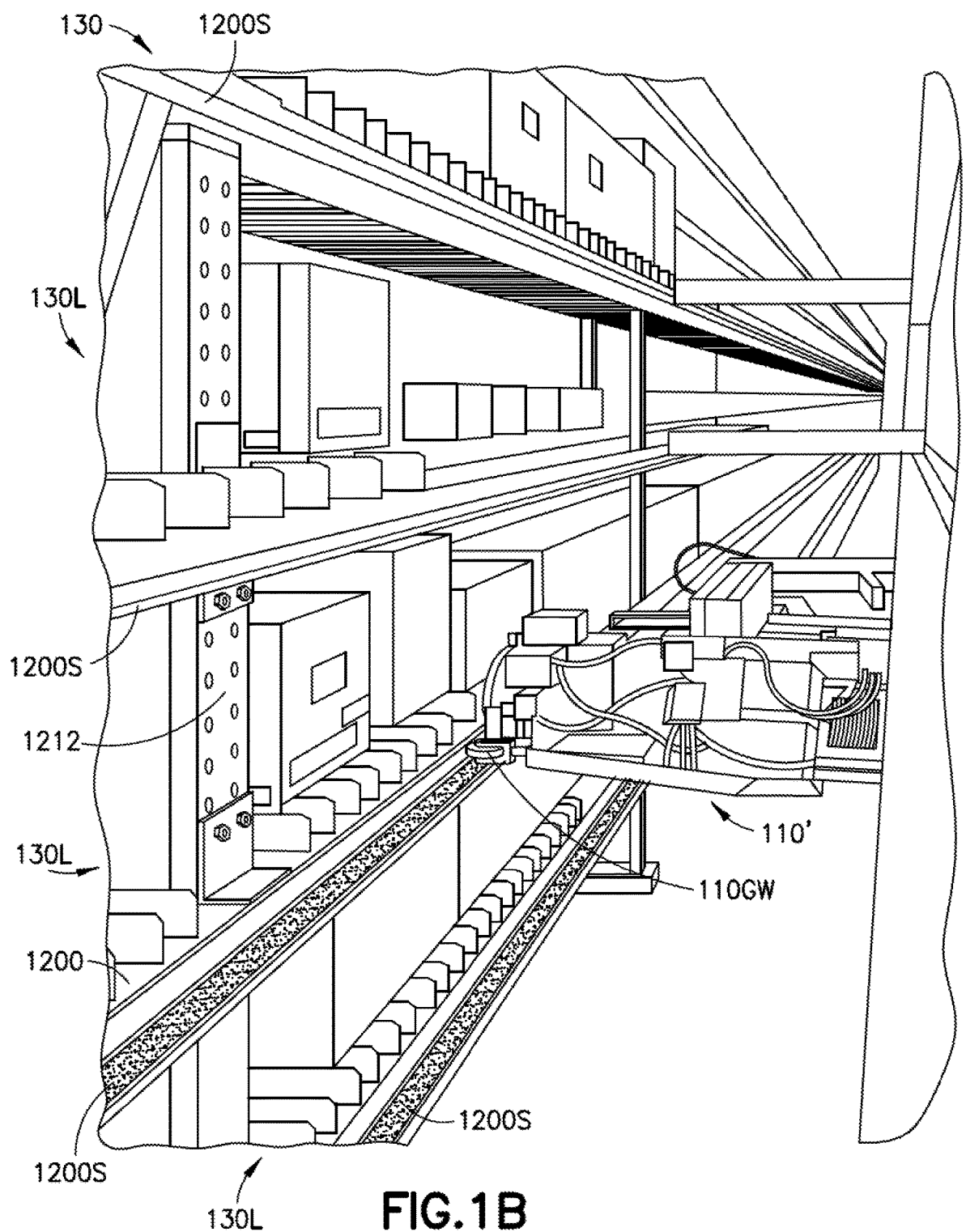
FIG. 1B is a schematic illustration of a portion of the automated storage and retrieval system in accordance with aspects of the disclosed embodiment.

Referring also to FIGS. 1A and 1B the rack module array RMA of the storage structure 130 includes vertical support members 1212 and horizontal support members 1200 that define a high density automated storage array such as described in, for example, U.S. patent application Ser. No. 14/966,978 filed on Jan. 15, 2016 and United States Provisional Patent Application No. 62/104,513 filed on Jan. 16, 2015, the disclosures of which are incorporated herein by reference in their entireties. Rails 1200S may be mounted to one or more of the vertical and horizontal support members 1212, 1200 in, for example, picking aisles 130A and be configured so that the bots 110 ride along the rails 1200S through the picking aisles 130A. At least one side of at least one of the picking aisles 130A of at least one storage level 130L may have one or more storage shelves (e.g. formed by rails 1210, 1200 and slats 1210S) provided at differing heights so as to form multiple shelf levels 130LS1-130LS2 (although two levels are illustrated any number of levels may be provided and the picking aisle can be divided into sections SECA, SECB each having a different number of levels or the same number of levels) between the storage or deck levels 130L defined by the transfer decks 130B (and the rails 1200S which form an aisle deck). Accordingly, there are multiple rack shelf levels 130LS1-130LS2, corresponding to each storage level 130L, extending along one or more picking aisles 130A communicating with the transfer deck 130B of the respective storage level 130L. As may be realized, the multiple rack shelf levels 130LS1-130LS2 effect each storage level 130L having stacks of stored case units (or case layers) that are accessible from a common deck 1200S of a respective storage level 130L (e.g. the stacks of stored cases are located between storage levels). In one aspect, referring to FIG. 1B each of the storage levels 130L includes a single level of storage shelves to store a single level of case units (e.g. each storage level includes a single case unit support plane CUSP) and the bots 110 are configured to transfer case units to and from the storage shelves of the respective storage level 130L.

As may be realized, bots 110 traversing a picking aisle 130A, at a corresponding storage level 130L, have access (e.g. for picking and placing case units) to each storage space 130S that is available on each shelf level 130LS1-130LS2, where each shelf level 130LS1-130LS2 is located between the storage levels 130L on one or more side(s) PAS1, PAS2 (see e.g. FIG. 3A) of the picking aisle 130A. As noted above, each of the storage shelf levels 130LS1-130LS2 is accessible by the bot 110 from the rails 1200S (e.g. from a common picking aisle deck 1200S that corresponds with a transfer deck 130B on a respective storage level 130L). As can be seen in FIG. 1A there are one or more shelf rails 1210 vertically spaced (e.g. in the Z direction) from one another to form multiple stacked storage spaces 130S each being accessible by the bot 110 from the common rails 1200S. As may be realized, the horizontal support members 1200 also form shelf rails (in addition to shelf rails 1210) on which case units are placed. Here the bots 110 includes a transfer arm 110PA having a vertical drive axis configured to transfer case units to each of the shelf levels 130LS1-130LS2 from the common picking aisle deck. A suitable example of bot that services multiple shelf levels from a common picking aisle deck can be found in, for example, U.S. patent application Ser. No. 14/997,892 Jan. 15, 2016 and U.S. Provisional Patent Application No. 62/104,513 filed on Jan. 16, 2015, the disclosures of which are incorporated herein by reference in their entireties. In other aspects, where each storage level 130L includes a single level of storage shelves as illustrated in FIG. 1B the bot, such as bot 110' (which is substantially similar to bot 110), is not provided with sufficient Z-travel of the transfer arm 110PA for placing case units on the multiple storage shelf levels 130LS1-130LS2 (e.g. accessible from a common rail 1200S) as described above. Here the transfer arm drive of the bots 110' includes only sufficient Z-travel for lifting the case units from the case unit support plane CUSP of the single level of storage shelves, for transferring the case units to and from the payload area 110PL and for transferring the case units between the transfer arm 110PA and the payload bed 110PB of the payload area 110PL. Suitable examples of bots 110' can be found in, for example, U.S. patent application Ser. No. 13/326,993 filed on Dec. 15, 2011, the disclosure of which is incorporated herein by reference in its entirety.

Each stacked shelf level 130LS1-130LS2 (and/or each single shelf level) of a corresponding storage level 130L defines an open and undeterministic two dimensional storage surface (e.g. having a case unit support plane CUSP as shown in FIG. 1A) that facilitates a dynamic allocation of pickfaces both longitudinally (e.g. along a length the aisle or coincident with a path of bot travel defined by the picking aisle) and laterally (e.g. with respect to rack depth, transverse to the aisle or the path of bot travel). Dynamic allocation of the pickfaces and case units that make up the pickfaces is provided, for example, in the manner described in U.S. patent application Ser. No. 12/757,337, (now U.S. Pat. No. 8,594,835), the disclosure of which is incorporated by reference herein in its entirety. As such, case unit (or tote) pickfaces of variable lengths and widths are positioned at each two dimensional storage location on the storage shelves (e.g. on each storage shelf level 130LS1-130LS2) with minimum gaps (e.g. that effect picking/placing of case units free from contact with other case units stored on the shelves) between adjacent stored case units/storage spaces. In one aspect, the storage space(s) 130S defined by the storage shelf levels 130LS1-130LS2 between the storage or deck levels 130L accommodates case units of different heights, lengths, widths and/or weights at the different shelf levels 130LS1-130LS2 as described in, for example, U.S. patent application Ser. No. 14/966,978, filed on Dec. 11, 2015 and U.S. Provisional Patent Application No. 62/091,162 filed on Dec. 12, 2014, the disclosures of which are incorporated by reference herein in their entireties.

Referring again to FIG. 3A each transfer deck or storage level 130L includes one or more lift pickface interface/handoff stations TS (referred to herein as interface stations TS) where case unit(s) (of single or combined case pickfaces) or totes are transferred between the lift load handling devices LHD and bots 110 on the transfer deck 130B. The interface stations TS are located at a side of the transfer deck 130B opposite the picking aisles 130A and rack modules RM, so that the transfer deck 130B is interposed between the picking aisles and each interface station TS. As noted above, each bot 110 on each picking level 130L has access to each storage location 130S, each picking aisle 130A and each lift 150 on the respective storage level 130L, as such each bot 110 also has access to each interface station TS on the respective level 130L. In one aspect the interface stations are offset from high speed bot travel paths HSTP along the transfer deck 130B so that bot 110 access to the interface stations TS is undeterministic to bot speed on a high speed travel path HSTP. As such, each bot 110 can move a case unit(s) (or pickface, e.g. one or more cases, built by the bot) from every interface station TS to every storage space 130S corresponding to the deck level and vice versa.

Figure 14:
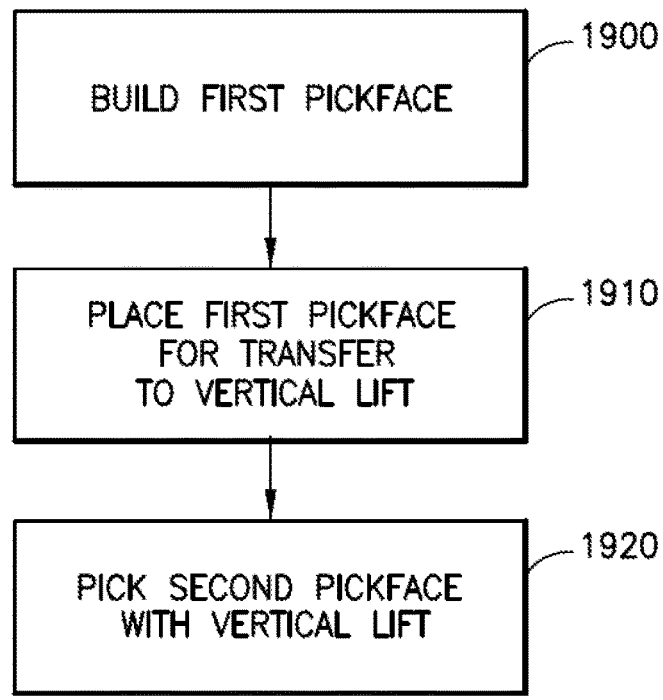

As an example, in one aspect, the pickface, built by the bot 110 (e.g. in the manner described above), that is transferred to (e.g. placed to), for example, the interface station TS (and/or buffer station BS) is not the same pickface that is picked from the interface station TS (and/or buffer station BS) by the lift 150. For example, referring to FIG. 6, the bot 110 builds a first pickface from the storage spaces 130S within the rack modules RM (e.g. FIG. 3A) and/or buffers BS on the transfer deck 130B that includes individual pickfaces 7 and (FIG. 14, Block 1900). The bot 110 transfers the first pickface to and places the first pickface on, for example, shelf 7000B of interface station TS for transfer to a lift 150 (FIG. 14, Block 1910). As may be realized, while in this example, the individual pickfaces 5, 7 (e.g. forming the first pickface) are placed on a common shelf 7000B for exemplary purposes only, in other aspects the individual pickfaces 5, 7 are placed on different shelves 7000A-7000F so that the pickface placed on the shelves by the bot 110 is different than the first pickface but includes at least one case unit in common with the first pickface. For example, the first pickface is broken up such that a different pickface including individual pickface 5 is placed on shelf 7000B while another different pickface including individual pickface 7 is placed on, for example, shelf 7000H. A lift, such as lift 150B1 picks a second pickface from one or more shelves 7000A-7000F (e.g. common to both the bot 110 and the lift 150B1) of the transfer stations TS (FIG. 14, Block 1920). Here the second pickface is different than the first pickface but includes at least one of the individual pickfaces 5, 7 so that at least one case unit is common between the first pickface and the second pickface.

Figure 15:
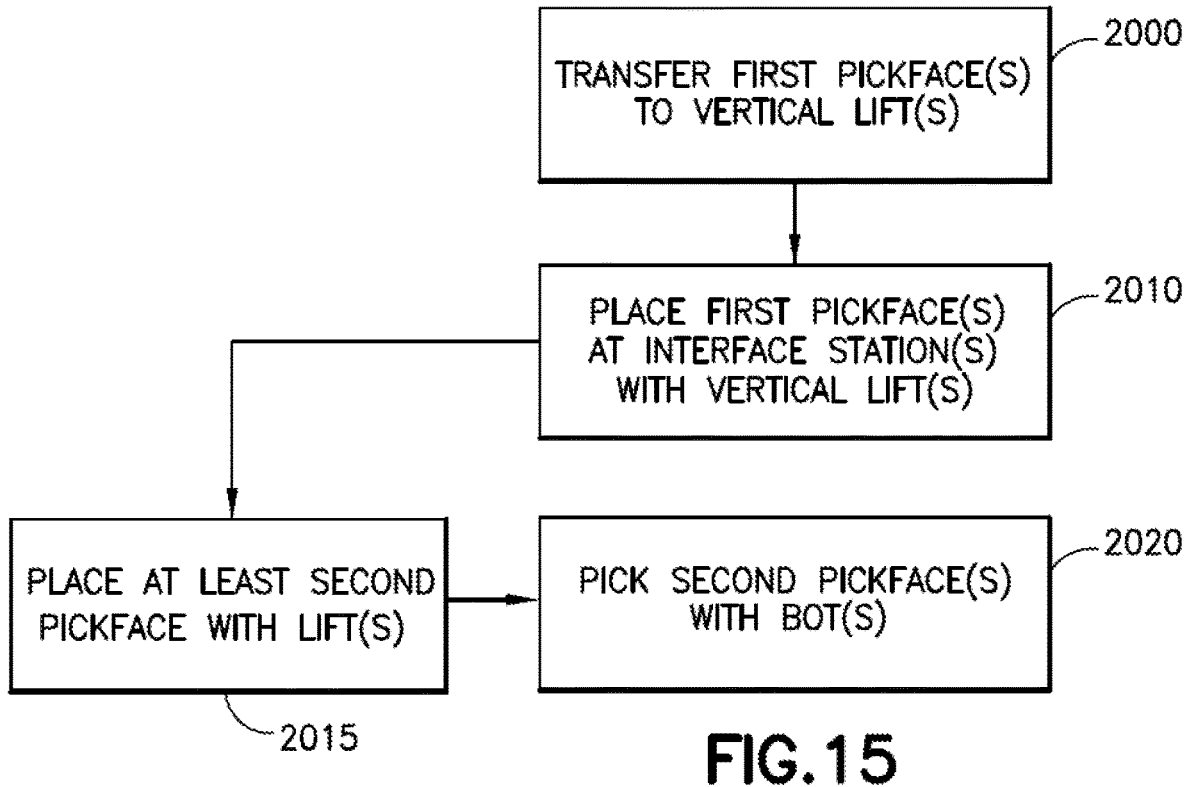

Similarly, in one aspect, the pickface that is transferred to (e.g. placed to), for example, the interface station TS (and/or buffer station BS) by the inbound lift 150 (see lift 150A in FIG. 1) is not the same pickface that is picked from the interface station TS (and/or buffer station BS) by the bot 110. In one aspect, the control server 120 is configured to command the bot 110, and effect with the bot 110 inbound flow (which may also be referred to as warehouse replenishment or inbound stream(s)) case sortation at a handoff station TS (and/or buffer station BS) with the bot 110 forming a pickface, independent of the pick order of cases from an input station by the lift 150. In one aspect, the bot controller 110C is configured to command the bot 110, and effect with the bot 110 inbound flow case sortation at the handoff station TS (and/or buffer station BS) with the bot 110 forming the pickface, independent of the pick order of cases from an input station by the lift 150. In still other aspects, the control server 120 and the bot controller 110C are both configured to command the bot 110, and effect with the bot 110 inbound flow case sortation at the handoff stations TS (and/or buffer station BS) with the bot 110 forming the pickface, independent of the pick order of cases from an input station by the lift 150. Thus, the control server 120 and/or the bot controller 110C is/are configured to set the inbound case flow, at least in part with bot 110 sortation of the cases carried in common by the both 110 and decoupled from the pick order of the cases by the lift 150. This may be referred to for description purposes as inbound flow case sortation with the bot 110 at the handoff station TS (and/or buffer station BS). For example, referring to FIG. 6A, first pickfaces are transferred to one or more lifts 150A1, 150A2 from the input station(s) 160IN by the inbound conveyors 160CB, i.e., the lifts 150A1, 150A2 each pick a first pickface (FIG. 15, Block 2000). In this example, one of the first pickfaces, such as the first pickface picked by lift 150A1, includes a combination of individual pickfaces 5, 7 while the other first pickface, picked by lift 150A2, includes a combination of individual pickfaces 20, 22. The lifts 150 may effect sorting of the inbound case flow by placing one or more pickfaces held on a common shelf of the lift at a first interface station and retaining other case units on the common shelf of the lift for placement at another different interface station. For example, the lift 150A1 places the respective first pickface 5, 7 to shelf 7000B of interface station TS while lift 150A2 places the other respective first pickface 20, 22 to shelf 7000H of another interface station TS on the same storage level 130L (FIG. 15, Block 2010). In other aspects, the first pickface 5, 7 may be broken up into at least a second pickface where pickface 5 (e.g. the second pickface) may be placed on shelf 7000B while pickface 7 (e.g. a third pickface) is placed on shelf 7000D (FIG. 15, Block 2015). In one aspect, the lifts 150 may transfer one or more case units from one storage level to another, such as from shelf 7000A to shelf 7000D where a bot 110 picks the transferred case units (transferred from the storage level corresponding to shelf 7000A) and places the transferred case units in storage spaces on the storage level corresponding shelf 7000D. The bot 110 builds or otherwise picks a second pickface(s) from the interface station(s) TS so that the first pickface(s) placed on the shelf(s) 7000B, 7000H (e.g. common to both the bot 110 and a respective lift 150A) by the lifts 150A1, 150A2 is/are different than the second pickface but the second pickface includes at least one case unit in common with the first pickface (FIG. 15, Block 2020). For example, the first pickface 5, 7 is broken up such that a different pickface including individual pickface 5 (or individual pickface 7) is picked by the bot 110 and/or the other first pickface 20, 22 is broken up such that a different pickface including individual pickface 20 (or individual pickface 22) is picked by the bot 110. Here the second pickface is different than the first pickface but includes at least one of the individual pickfaces of the first pickface so that at least one case unit is common between the first pickface and the second pickface. As may be realized, the second pickface may be broken up by the bot so that a pickface placed on at least one storage shelf with the 110 is different than the second pickface and where at least one case unit is common between the second pickface and the pickface placed on the at least one storage shelf. As may be realized, for inbound transfers the pickfaces 5, 7 are transferred from the lifts 150A1, 150A2 as a unit, the pickfaces 5, 7 (which may include combined case units/totes) at any of the interface stations TS may be distributed when transported by the bots 110 to the storage array so that one or more of the case units/totes in the pickface 5, 7 are transported to different storage rack locations (e.g. different storage spaces 130S).

Similarly for outbound transfers (as described in greater detail below) from the storage racks to a load out such as a palletizing cell, or truck load out, the combined cases/totes of the pickface 5, 7 at any of the multiple interfaces stations TS may be distributed in the load out. In one aspect, the distribution of case units/totes at load out is effected by the lift transferring cases/totes from the combined pickface in a desired sequence related to the order or sequence of the predetermined load out. Similarly, each of the multiple loads carried by the load handling devices LHD may be transferred in a desired sequence related to the predetermined load out. For example, in one aspect the load handling device LHD of the lift 150B delivers the multiple loads (e.g. of a common pickface) in ordered sequence at offload in a single placing step (where in one aspect the lift 150B picks the case units in the ordered sequence in one picking step. In other aspects the lift 150B picks the case units in multiple picking steps to effect the ordered sequence of case units. In one aspect, at least one pickface in the combined pickface, that is being carried on a common load handling device, is different (e.g. has a different configuration) than other pickfaces in the combined pickface.

In one aspect the interface stations TS are configured for a passive transfer (e.g. handoff) of case units (and/or pickfaces) between the bot 110 and the load handing devices LHD of the lifts 150 (e.g. the interface stations TS have no moving parts for transporting the case units) which will be described in greater detail below. For example, also referring to FIG. 3B the interface stations TS and/or buffer stations BS include one or more stacked levels TL1, TL2 of transfer rack shelves RTS (e.g. so as to take advantage of the lifting ability of the bot 110 with respect to the stacked rack shelves RTS) which in one aspect are substantially similar to the storage shelves described above (e.g. each being formed by rails 1210, 1200 and slats 1210S) such that bot 110 handoff (e.g. pick and place) occurs in a passive manner substantially similar to that between the bot 110 and the storage spaces 130S (as described herein) where the case units or totes are transferred to and from the shelves. In one aspect the buffer stations BS on one or more of the stacked levels TL1, TL2 also serve as a handoff/interface station with respect to the load handling device LHD of the lift 150. In one aspect, where the bots, such as bots 110', are configured for the transfer of case units to a single level 130L of storage shelves, the interface stations TS and/or buffer stations BS also include a single level of transfer rack shelves (which are substantially similar to the storage rack shelves of the storage levels 130L described above with respect to, for example, FIG. 1B). As may be realized, operation of the storage and retrieval system with bots 110' serving the single level storage and transfer shelves is substantially similar to that described herein. As may also be realized, load handling device LHD handoff (e.g. pick and place) of case units (e.g. individual case units or pickfaces) and totes to the stacked rack shelves RTS (and/or the single level rack shelves) occurs in a passive manner substantially similar to that between the bot 110 and the storage spaces 130S (as described herein) where the case units or totes are transferred to and from the shelves. In other aspects the shelves may include transfer arms (substantially similar to the load handling device transfer arm shown in FIG. 5E, although Z direction movement may be omitted when the transfer arm is incorporated into the interface station TS shelves) for picking and placing case units or totes from one or more of the bot 110 and load handling device LHD of the lift 150. Suitable examples of an interface station with an active transfer arm are described in, for example, U.S. patent application Ser. No. 12/757,354 filed on Apr. 9, 2010, the disclosure of which is incorporated by reference herein in its entirety.

In one aspect, the location of the bot 110 relative to the interface stations TS occurs in a manner substantially similar to bot location relative to the storage spaces 130S. For example, in one aspect, location of the bot 110 relative to the storage spaces 130S and the interface stations TS occurs in a manner substantially similar to that described in U.S.

patent application Ser. No. 13/327,035 filed on Dec. 15, 2011, (now U.S. Pat. No. 9,008,884) and Ser. No. 13/608,877 filed on Sep. 10, 2012, (now U.S. Pat. No. 8,954,188), the disclosures of which are incorporated herein by reference in their entireties. For example, referring to FIGS. 1 and 1B, the bot 110 includes one or more sensors 110S that detect the slats 1210S or a locating feature 130F (such as an aperture, reflective surface, RFID tag, etc.) disposed on/in the rail 1200. The Slats and/or locating features 130F are arranged so as to identify a location of the bot 110 within the storage and retrieval system, relative to e.g. the storages spaces and/or interface stations TS. In one aspect the bot 110 includes a controller 110C that, for example, counts the slats 1210S to at least in part determine a location of the bot 110 within the storage and retrieval system 100. In other aspects the location features 130F may be arranged so as to form an absolute or incremental encoder which when detected by the bot 110 provides for a bot 110 location determination within the storage and retrieval system 100.

As may be realized, referring to FIG. 3B, the transfer rack shelves RTS at each interface station TS define multi-load stations (e.g. having one or more storage case unit holding locations for holding a corresponding number of case units or totes) on a common transfer rack shelf RS. As noted above, each load of the multi-load station is a single case unit/tote or a multi-case pickface (e.g. having multiple case units/totes that are moved as a single unit) that is picked and paced by either the bot or load handling device LHD. As may also be realized, the bot location described above allows for the bot 110 to position itself relative to the multi-load stations for picking and placing the case units/totes and pickfaces from a predetermined one of the holding locations of the multi-load station. The interface/handoff stations TS define buffers where inbound and/or outbound case units/totes and pickfaces are temporarily stored when being transferred between the bots 110 and the load handling devices LHD of the lifts 150.

In one aspect one or more peripheral pickface buffer/handoff stations BS (substantially similar to the interface stations TS and referred to herein as buffer stations BS) are also located at the side of the transfer deck 130B opposite the picking aisles 130A and rack modules RM, so that the transfer deck 130B is interposed between the picking aisles and each buffer station BS. The peripheral buffer stations BS are interspersed between or, in one aspect as shown in FIGS. 3A and 3B, otherwise in line with the interface stations TS. In one aspect the peripheral buffer stations BS are formed by rails 1210, 1200 and slats 1210S and are a continuation of (but a separate section of) the interface stations TS (e.g. the interface stations and the peripheral buffer stations are formed by common rails 1210, 1200). As such, the peripheral buffer stations BS also include one or more stacked levels TL1, TL2 of transfer rack shelves RTS as described above with respect to the interface stations TS. The peripheral buffer stations BS define buffers where case units/totes and/or pickfaces are temporarily stored when being transferred from one bot 110 to another different bot 110 on the same storage level 130L. As maybe realized, in one aspect the peripheral buffer stations are located at any suitable location of the storage and retrieval system including within the picking aisles 130A and anywhere along the transfer deck 130B. As may be realized, the case unit(s) placed at the buffer station BS are, in one aspect, transferred to the interface station TS by a bot 110 or, in other aspects, by any suitable conveyor that connects the buffer station BS to the interface station TS. In one aspect, where the case unit(s) are transferred from the buffer station BS to the interface station TS by a bot 110 that transfer is an opportunistic transfer such that a bot 110 travelling along the transfer deck, for example, in route for another task (e.g. transferring pickface(s) to storage, sorting pickfaces, transferring pickface(s) from storage, etc.) travelling by the buffer station BS stops to pick the pickface from the buffer station BS and transfer the pickface to the interface station TS while in the process of performing the other task.

Still referring to FIGS. 3A and 3B in one aspect the interface stations TS are arranged along the transfer deck 130B in a manner akin to parking spaces on the side of a road such that the bots 110 "parallel park" at a predetermined interface station TS for transferring case units to and from one or more shelves RTS at one or more levels TL1, TL2 of the interface station TS. In one aspect, a transfer orientation of the bots 110 (e.g. when parallel parked) at an interface station TS is the same orientation as when the bot 110 is travelling along the high speed bot transport path HSTP (e.g. the interface station is substantially parallel with a bot travel direction of the transfer deck and/or a side of the transfer deck on which the lifts 150 are located). Bot 110 interface with the peripheral buffer stations BS occurs by parallel parking so that a transfer orientation of the bots 110 (e.g. when parallel parked) at a peripheral buffer station BS is the same orientation as when the bot 110 is travelling along the high speed bot transport path HSTP.

Figure 4A:
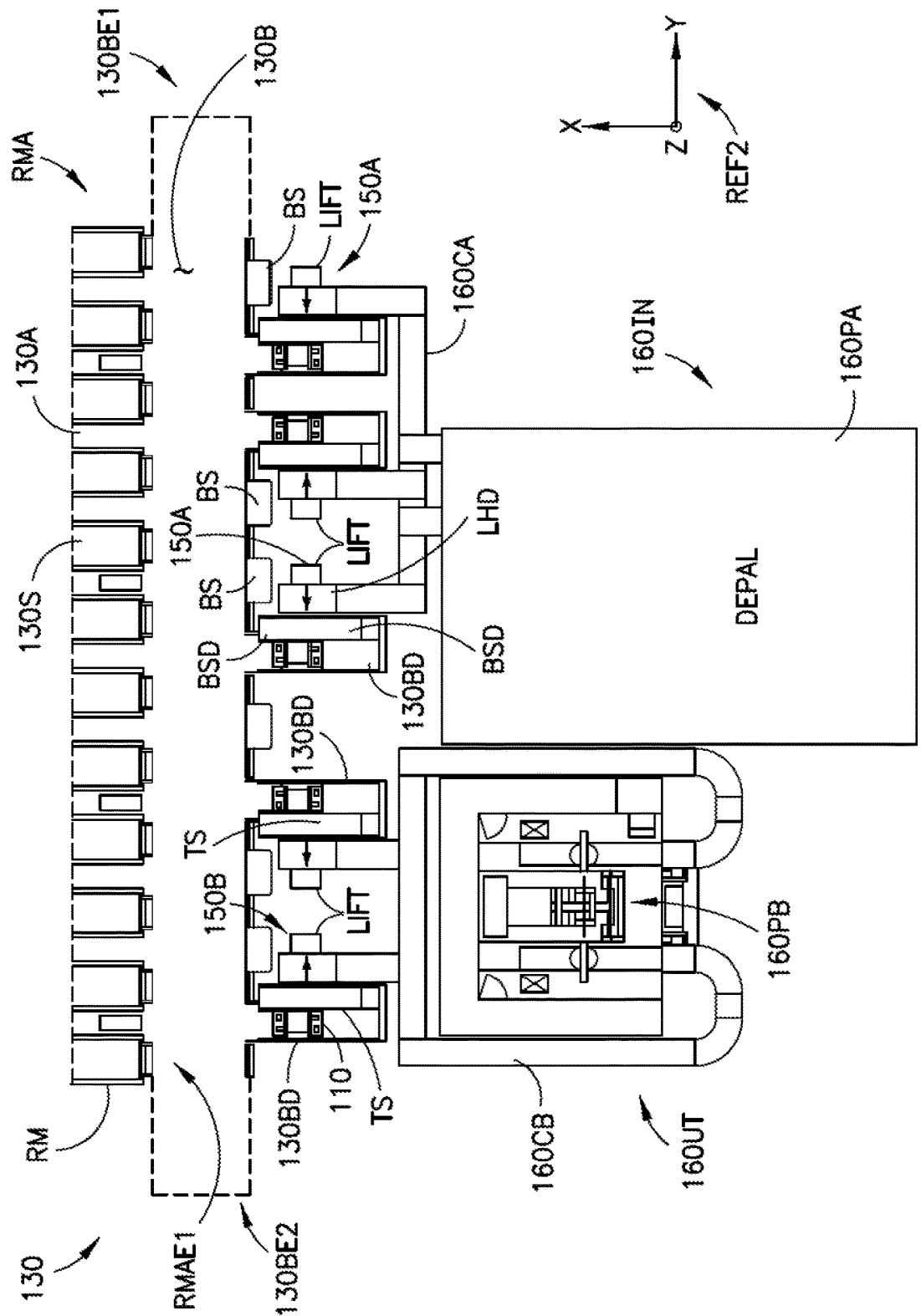
FIGS. 4A and 4B are schematic illustrations of portions of the storage and retrieval system in accordance with aspects of the disclosed embodiment.
Figure 4B:
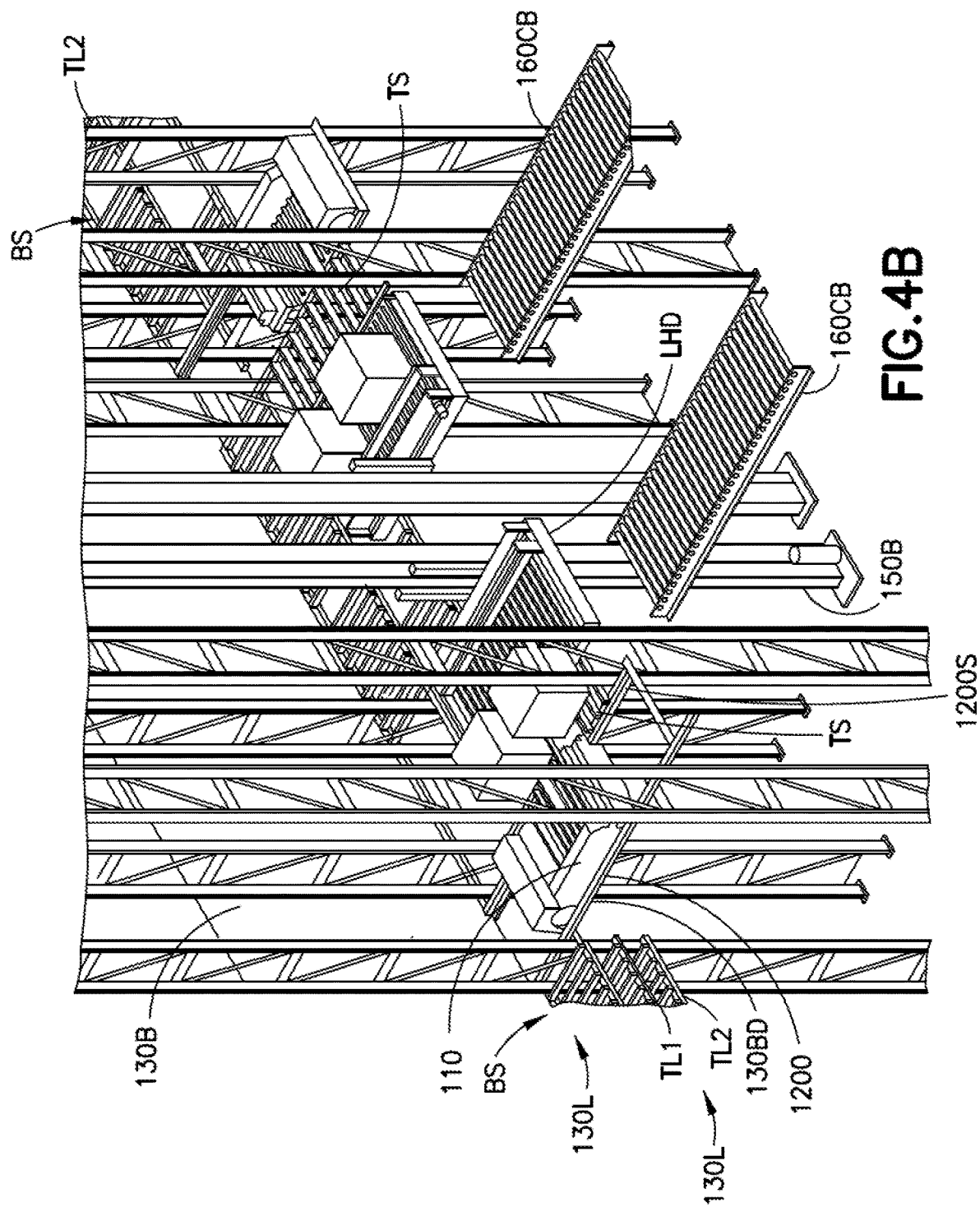

In another aspect, referring to FIGS. 4A and 4B, at least the interface stations TS are located on an extension portion or pier 130BD that extends from the transfer deck 130B. In one aspect, the pier 130BD is similar to the picking aisles where the bot 110 travels along rails 1200S affixed to horizontal support members 1200 (in a manner substantially similar to that described above). In other aspects, the travel surface of the pier 130BD may be substantially similar to that of the transfer deck 130B. Each pier 130BD is located at the side of the transfer deck 130B, such as a side that is opposite the picking aisles 130A and rack modules RM, so that the transfer deck 130B is interposed between the picking aisles and each pier 130BD. The pier(s) 130BD extends from the transfer deck at a non-zero angle relative to at least a portion of the high speed bot transport path HSTP. In other aspects the pier(s) 130BD extend from any suitable portion of the transfer deck 130B including the ends 130BE1, 130BE2 of the transfer deck 130BD. As may be realized, peripheral buffer stations BSD (substantially similar to peripheral buffers stations BS described above) may also be located at least along a portion of the pier 130BD.

Figure 5C:
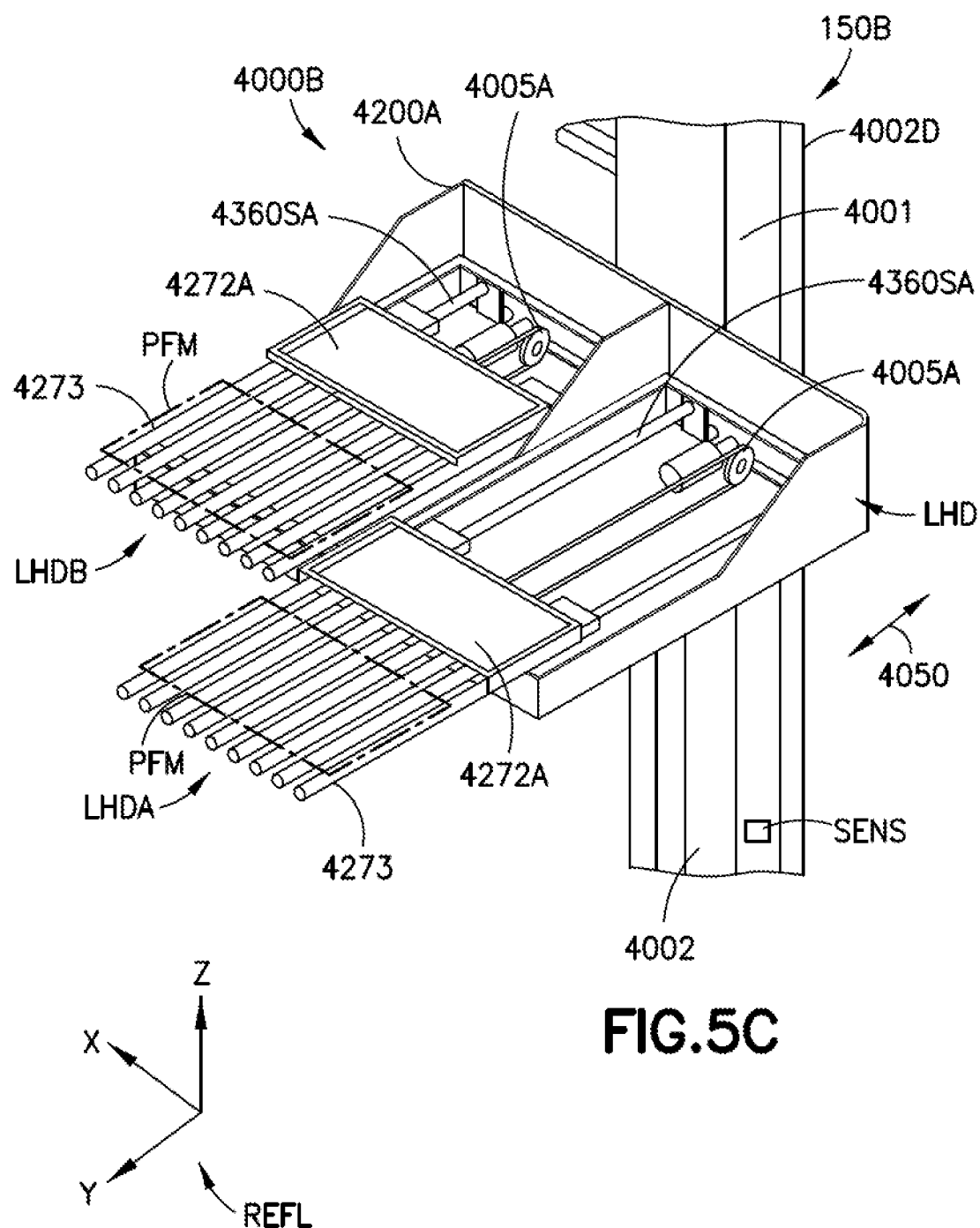

Referring now to FIGS. 5A, 5B and 5C, as described above, in one aspect the interface stations TS are passive stations and as such the load handling device LHD of the lifts 150A, 150B have active transfer arms or pick heads 4000A, 4000B. In one aspect the lifts 150 communicating between the input and output conveyors 160CA, 160CB and one or more of the interface station(s) TS (which in one aspect include stacked transfer rack shelves RTS) of the stacked deck levels 130C are reciprocating lifts (e.g. the lifts bi-directionally travel in the Z direction (relative to a reference frame of the lift as shown in FIG. 5C) linearly along a single straight line path). The lifts 150 are unconstrained in their rate of travel in the Z direction and are high speed lifts (rather than a continuous motion or paternoster type lift) where a transfer rate or speed of the lift is not a delimiting factor in the transfer of case units to and from the storage and retrieval system. For example, a case unit transfer transaction rate of the lifts 150 is substantially equal to a case unit transfer transaction rate of the bots 110. In one aspect the inbound lift modules 150A and the outbound lift modules 150B have different types of pick heads (as will be described below) while in other aspects the inbound lift modules 150A and the outbound lift modules 150B have the same type of pick head similar to one of the pick heads described below (e.g. both the lifts 150A, 150B have pick head 4000A or both lifts 150A, 150B have pick head 4000B). For example, both the inbound and outbound lift modules 150A, 150B have a vertical mast 4002 (while one mast is illustrated in other aspects there are multiple masts). The vertical mast(s) 4002 spans between a base level BL (FIG. 3B), such as where, for example, the input and output conveyors 160CA, 160CB of the input and output stations 160IN, 16OUT are located, and any desired decks or storage levels 130L of the multi-level storage array. One or more carriage(s) or slide(s) 4001 travel along the vertical mast(s) 4002 under the motive force of any suitable drive unit 4002D (e.g. connected to, for example, control server 120) configured to lift and lower the slide (and the pick head 4000A, 4000B mounted thereto) between the base level BL and any desired interface station shelf at a desired storage level 130L. The drive unit 4002D is one or more of a chain drive, a belt drive, a screw drive, a linear actuator, a solid state drive or any other drive capable of linearly driving the slide(s) and pick heads 4000A, 4000B mounted thereto along the mast(s) 4002.

As may be realized, the lifts 150 include any suitable pick head positioning system for positioning the pick head(s) 4000A, 4000B relative to the interface station TS shelves. For example, any suitable encoders or position sensors SENS are provided which, along with control server 120, provide for position determination of the pick head(s) 4000A, 4000B relative to the interface station TS shelves and input/output conveyors 160CA, 160CB. For example, the control server 120 provides control signals to the lift drives 4002D, 4005, 4005A. The control server 120 also receives signals from the position sensors SENS as the pick head(s) move along the mast 4002 and determines, based on the signals a location of the pick heads relative to the interface station TS shelves. The control server 120 stops the pick head(s) at a predetermined interface station shelf based on the sensor SENS signals and effects extension of the load handling device LHD as will be described in greater detail below to pick or place one or more case unit(s) to the interface station TS shelves.

As noted above, the inbound lift module(s) 150A include a pick head 4000A that is movably dependent from the mast(s) 4002, such as by being mounted to the slide(s) 4001 so that as the slide(s) moves the pick head 4000A moves with the slide(s) 4001. In this aspect the pick head 4000A includes a pick head portion or effector, referred to herein as a load handling device LHDA, having one or more tines or fingers 4273 mounted to a base member 4272 so as to form a platform PFM for housing loads. The platform PFM forms a payload support having a common elevation configured to hold one or more pickfaces at the common elevation of the platform PFM. In one aspect the common elevation is a substantially flat common surface while in other aspects the common elevation includes stacked shelves or effectors (e.g. where, as illustrated in FIG. 5F, one or more of the pick heads 4000A, 4000B includes the stacked shelves or effectors LHDA) with a common pick and place elevation position of the lift so that the lift can pick and place every load at once at one single elevation stop of the lift. As may be realized, while the stacked effectors of the pick head 4000A is illustrated with respect to lift 150A it should be understood that the one or more effectors LHDA, LHDB of the pick head 4000B of lift 150B, in one aspect, include stacked effectors. The fingers 4273 are configured to pass through or otherwise between the slats 1210S of the interface stations TS shelves for transferring one or more case unit(s) between the load handling device LHD and the shelves (as will be described in greater detail below). The base member 4272 is movably mounted to one or more rail 4360S of frame 4200 which in turn is mounted to the slide 4001. Any suitable drive unit 4005, such as a belt drive, chain drive, screw drive, gear drive, etc. (which is substantially similar in form but may not be similar in capacity to drive 4002D as the drive 4005 may be smaller than drive 4002D) is mounted to the frame 4200 and coupled to the base member 4272 for driving the base member 4272 (with the finger(s), i.e. the effector LHDA) in the direction of arrow 4050 (e.g. the Y direction relative to a lift reference frame REFL). The load platform PFM includes one or more load stations LST1-LST3, each being arranged for holding a case unit(s)/tote(s) or pickface(s) thereon. In one aspect each platform PFM is illustrated has having three load stations but in other aspects the platforms have more or less than three load stations. Each of the case unit(s)/tote or pickface in the one or more load stations LST1-LST3 is transferred to and from the lift 150 as a unit but it should be understood that where there are multiple case unit(s)/tote(s) in a load station (e.g. a pickface) the pickface, in one aspect is broken up so that one or more case units that form the pickface are distributed to a different section of the storage level 130L than other case unit(s) of that pickface while in other aspects the pickface may be placed within a storage space 130S as a unit in the manner described, for example, in U.S. patent application Ser. No. 14/997,892 filed on Jan. 15, 2016 and United States Provisional Patent Application No. 62/104,513 filed on Jan. 16, 2015 the disclosures of which were previously incorporated herein by reference in their entireties.

The outbound lift module(s) 150B also include a pick head 4000B mounted to the slide 4001 so that as the slide moves the pick head 4000B moves with the slide 4001. In this aspect the pick head 4000B includes one or more pick head portions or effectors LHDA, LHDB (which are each substantially similar to pick head 4000A) each having one or more tines or fingers 4273 mounted to a respective base member 4272A. Each base member 4272A is movably mounted to one or more rail 4360SA of frame 4200A which in turn is mounted to the slide 4001. Any suitable drive unit(s) 4005A, such as a belt drive, chain drive, screw drive, gear drive, etc. is mounted to the frame 4200A and coupled to a respective base member 4272A for driving the respective base member 4272A (with the finger(s)) in the direction of arrow 4050 (each effector has a respective drive unit so that each effector is independently movable in the direction of arrow 4050). While two effectors LHDA, LHDB are illustrated on pick head 4000B the pick head 4000B includes any suitable number of effectors that correspond to a number of case unit/pickface holding locations of, for example, the interface stations TS so that case units/pickfaces are individually picked from the interface stations TS are described in greater detail below.

Figure 5D:
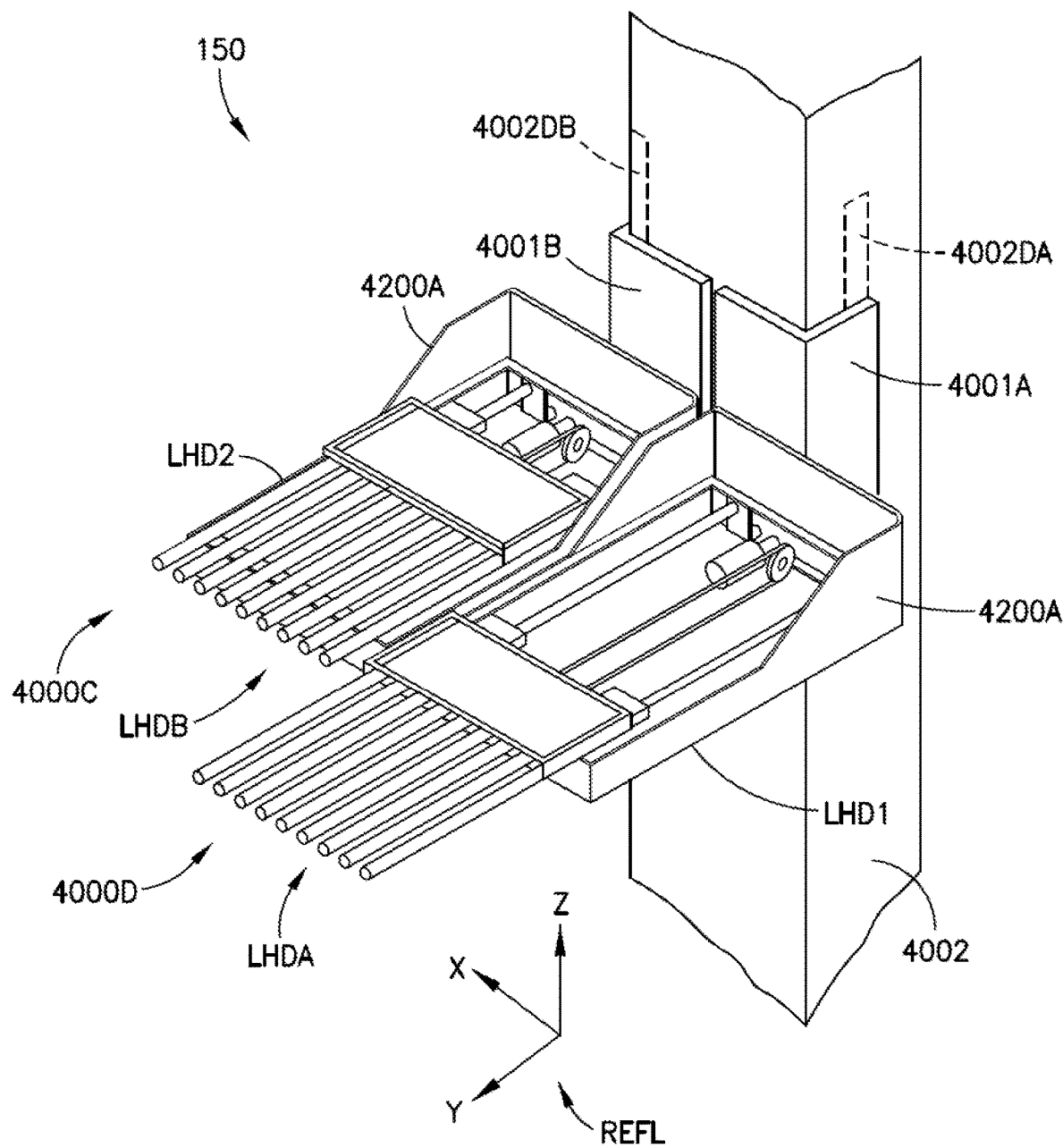

In one aspect, referring also to FIG. 5D, one or more of the input and output lifts 150 includes multiple pick heads 4000C, 4000D each mounted to a corresponding carriage or slide 4001A, 4001B. Each of the slides 4001A, 4001B (and the pick head mounted thereto) is mounted to the mast 4002 so as to be independently moveable in the Z direction by a respective drive 4002DA, 4002DB (which is substantially similar to drive 4002D described above). While each pick head 4000C, 4000D illustrated in FIG. 5D includes a single load handling device it should be understood that one or more of the pick heads, in other aspects, 4000C, 4000D includes multiple independently actuated load handling devices in a manner similar to pick head 4000B. As may also be realized, suitable clearance is provided between each of the slides 4001A, 4001B and the pick head(s) mounted thereto so that each pick head is provided with the full stroke of travel (e.g. from the base level BL to, for example, the interface station shelves at the top storage level 130L) along the mast 4002 is desired.

In another aspect each load handling device, as described above, of the lifts 150A, 150B is configured to sort one or more case units onboard the load handling device for building pickfaces on the load handling device. For example, referring to FIG. 5E the carriage 4200B includes a frame 4110F having a payload section 4110PL. The payload section 4110PL of the load handling device LHD includes a payload bed 4110PB, a fence or datum member 4110PF, a transfer arm LHDA and a pusher bar or member 4110PR. In one aspect the payload bed 4110PB includes one or more rollers 4110RL that are mounted to the frame 110F so as to be substantially parallel with the fingers 4273A-4273E where one or more case units carried within the payload section 110PL can be moved in the X direction (e.g. justified with respect to a predetermined location of the frame/payload section and/or a datum reference of one or more case units in the lift frame of reference REFL) to position the case unit at a predetermined position within the payload section 4110PL and/or relative to other case units within the payload section 4110PL (e.g. side to side justification of case units as opposed to fore/aft as defined by the direction of extension of the transfer arm LHDA as described below, e.g. in the Y direction relative to the lift frame of reference). In one aspect the rollers 411ORL may be driven (e.g. rotated about their respective axes) by any suitable motor for moving the case units within the payload section 4110PL. In other aspects the load handling device LHD includes one or more side justification movable pusher bar (not shown) for pushing the case units over the rollers 4110RL for moving the case unit(s) to the predetermined position within the payload section 4110PL along the X direction. The side justification movable pusher bar may be substantially similar to that described in, for example, U.S. patent application Ser. No. 13/326,952 filed on Dec. 15, 2011, the disclosure of which was previously incorporated by reference herein in its entirety. The pusher bar 4110PR is movable in the Y direction, relative to the lift reference frame REFL to effect, along with the fence 4110PF and or pick head 4270 of the transfer arm LDHA, a fore/aft justification of case unit(s) within the payload area 4110PL in the manner described in U.S. Provisional Patent Application No. 62/107,135 filed on Jan. 23, 2015 previously incorporated herein by reference in their entireties.

Figure 5E:
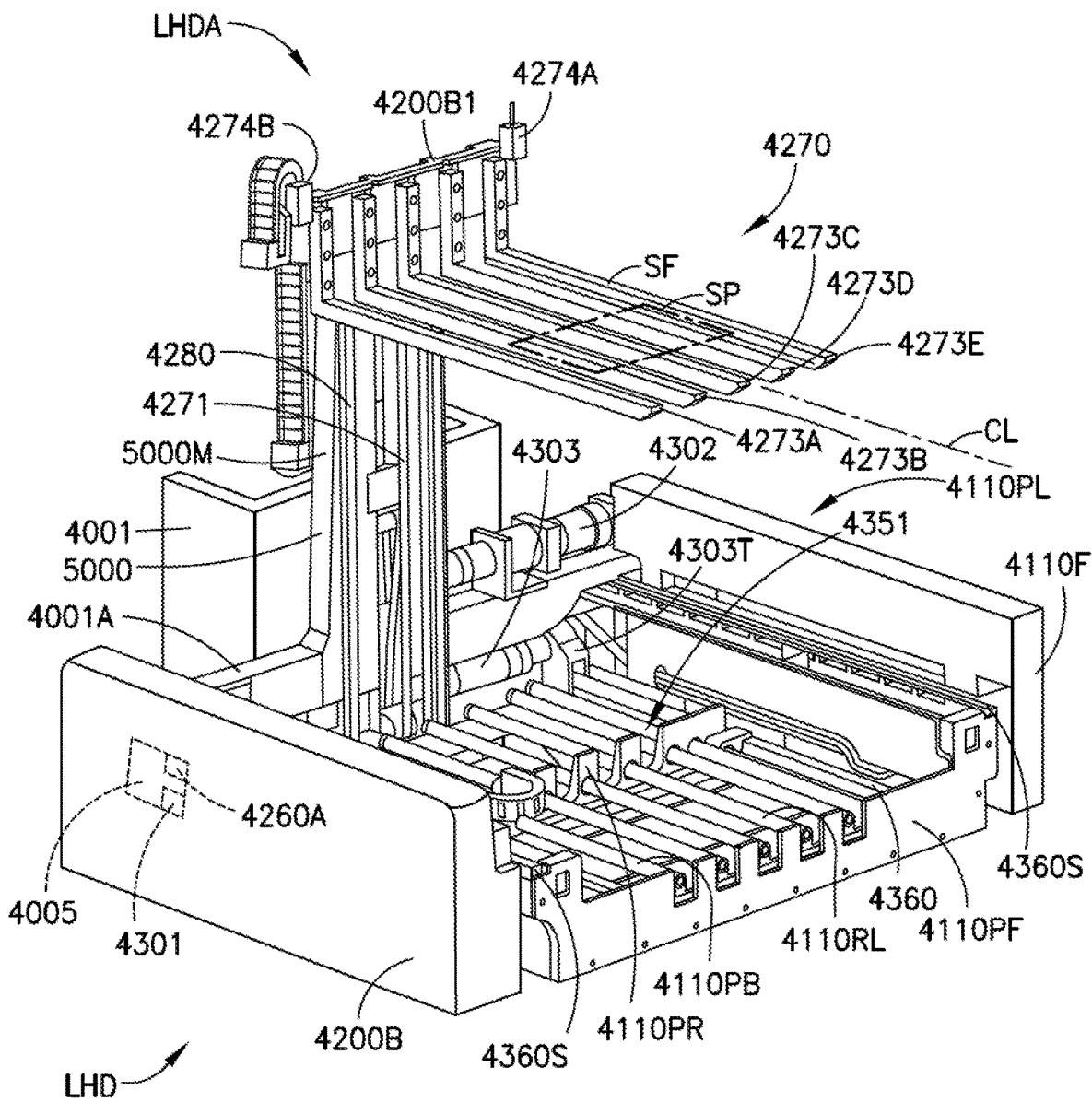

Still referring to FIG. 5E, the case units are placed on the payload bed 4110PB and removed from the payload bed 4110PB with the transfer arm LHDA. The transfer arm LHDA includes a lift mechanism or unit 5000 located substantially within the payload section 4110PL as described in, for example, U.S. Provisional Patent Application No. 62/107,135 filed on Jan. 23, 2015 previously incorporated herein by reference in their entireties. The lift mechanism 5000 provides, in addition to or in lieu of movement of the carriage 4200B in the Z direction, both gross and fine positioning of pickfaces carried by the load handling device LHD which are to be lifted into position in the storage structure 130 for picking and/or placing the pickfaces and/or individual case units to and from the shelves of the interface stations TS.

The lift mechanism 5000 is configured so that combined axis moves are performed (e.g. combined substantially simultaneous movement of the pusher bar 4110PR, lift mechanism 5000, pick head extension and fore/aft justification mechanism(s)), so that different/multi-sku or multi-pick payloads are handled by the lift 150. In one aspect, the actuation of the lifting mechanism 5000 is independent of actuation of the pusher bar 4110PR as will be described below. The decoupling of the lift mechanism 5000 and pusher bar 4110PR axes provides for combined pick/place sequences effecting a decreased pick/place cycle time, increased storage and retrieval system throughput and/or increased storage density of the storage and retrieval system as described above. For example, the lift mechanism 5000 provides for lifting case units from the a payload bed 4110PL of the load handling device LHD to allow for sorting and justifying case units to predetermined positions on the payload bed 41110PL and thus on the transfer arm LHDA. In one aspect the case units are lowered on the payload bed if sorting or justification is desired, otherwise the transfer arm LHDA may remain at least partially lifted to allow the arm to extend and retract for picking/placing case units to/from the interface stations TS without a secondary lifting of the transfer arm LHDA above the fence 4110PF in addition to, for example, traversal of the load handling device LHD along the mast(s) 4002.

The lifting mechanism 5000 may be configured in any suitable manner so that a pick head 4270 of the load handling device LHD bi-directionally (e.g. reciprocates) moves along the Z axis (e.g. in the Z direction). In one aspect, the lifting mechanism 5000 includes a mast 5000M and the pick head 4270 is movably mounted to the mast 4200M in any suitable manner. The mast 4200M is movably mounted to the frame 4110F in any suitable manner so as to be movable along the Y direction. In one aspect the frame includes guide rails 4360S to which the mast 4200M is slidably mounted. A transfer arm drive 4005 may be mounted to the frame for effecting at least movement of the transfer arm LHDA along the Y direction and the Z direction. In one aspect the transfer arm drive 4005 includes an extension motor 4301 and a lift motor 4302. The extension motor 4301 may be mounted to the frame 4110F and coupled to the mast 4200M in any suitable manner such as by a belt and pulley transmission 4260A, a screw drive transmission (not shown) and/or a gear drive transmission (not shown). The lift motor 4302 may be mounted to the mast 4200M and coupled to pick head 4270 by any suitable transmission, such as by a belt and pulley transmission 4271, a screw drive transmission (not shown) and/or a gear drive transmission (not shown). As an example, the mast 4200M includes guides, such as guide rails 4280, along which the pick head 4270 is mounted for guided movement in the Z direction along the guide rails 4280. In other aspects the pick head 4270 is mounted to the mast in any suitable manner for guided movement in the Z direction. With respect to the transmissions In other aspects any suitable linear actuators are used to move the pick head in the Z direction. The transmission 260A for the extension motor 301 is substantially similar to that described herein with respect to transmission 271.

Still referring to FIG. 5E the pick head 4270 of the load handling device LHD transfers case units between the load handling device LHD and interface stations TS (see e.g. FIG. 3A) and in other aspects substantially directly between the bot 110 and a lift module(s) 150. In one aspect, the pick head 4270 includes a base member 4200B1, one or more tines or fingers 4273A-4273E and one or more actuators 4274A, 4274B. The base member 4200B1 is mounted to the mast 4200M, as described above, so as to ride along the guide rails 4280. The one or more tines 4273A-4273E are mounted to the base member 4200B1 at a proximate end of the tines 4273A-4273E so that a distal end of the tines 4273A-4273E (e.g. a free end) is cantilevered from the base member 4200B1. Referring again to FIG. 1A, the tines 4273A-4273E are configured for insertion between slats 1210S that form the case unit support plane CUSP of the interface station TS shelves.

One or more of the tines 4273A-4273E is movably mounted to the base member 4200B1 (such as on a slide/guide rail similar to that described above) so as to be movable in the Z direction. In one aspect any number of tines are mounted to the base member 4200B1 while in the aspect illustrated in the figures there are, for example, five tines 4273A-4273E mounted to the base member 4200B1. Any number of the tines 4273A-4273E are movably mounted to the base member 4200B1 while in the aspect illustrated in the figures, for example, the outermost (with respect to a centerline CL of the pick head 4270) tines 4273A, 4273E are movably mounted to the base member 4200B1 while the remaining tines 4273B-4273D are immovable relative to the base member 4200B1.

In this aspect the pick head 4270 employs as few as three tines 4273B-4273D to transfer smaller sized case units (and/or groups of case units) to and from the load handling device LHD and as many as five tines 4273A-4273E to transfer larger sized case units (and/or groups of case units) to and from the load handling device LHD. In other aspects, less than three tines are employed (e.g. such as where more than two tines are movably mounted to the base member 4200B1) to transfer smaller sized case units. For example, in one aspect all but one tine 4273A-4273E is movably mounted to the base member 4200B1 so that the smallest case unit being transferred to and from the load handling device without disturbing other case units on, for example, the shelves of the interface stations has a width of about the distance X1 between slats 1210S (see FIG. 1A).

The immovable tines 4273B-4273D define a picking plane SP of the pick head 4270 and are used when transferring all sizes of case units (and/or pickfaces) while the movable tines 4273A, 4273E are selectively raised and lowered (e.g. in the Z direction with the actuators 274A, 274B) relative to the immovable tines 4273B-4273D to transfer larger case units (and/or pickfaces). Still referring to FIG. 5E an example is shown where all of the tines 4273A-4273E are positioned so that a case unit support surface SF of each tine 4273A-4273E is coincident with the picking plane SP of the pick head 4270 however, as may be realized, the two end tines 4273A, 4273E are movable so as to be positioned lower (e.g. in the Z direction) relative to the other tines 4273B-4273D so that the case unit support surface SF of tines 4273A, 4273E is offset from (e.g. below) the picking plane SP so that the tines 4273A, 4273E do not contact the one or more case units carried by the pick head 4270 and do not interfere with any unpicked case units positioned in predetermined case unit holding locations on the interface station TS shelves.

The movement of the tines 4273A-4273E in the Z direction is effected by the one or more actuators 4274A, 4274B mounted at any suitable location of the transfer arm LHDA. In one aspect, the one or more actuators 4274A, 4274B are mounted to the base member 4200B1 of the pick head 4270. The one or more actuators are any suitable actuators, such as linear actuators, capable of moving one or more tines 4273A-4273E in the Z direction. In the aspect illustrated in, for example, FIG. 5E there is one actuator 4274A, 4274B for each of the movable tines 4273A, 4273E so that each moveable tine is independently movable in the Z direction. In other aspects one actuator may be coupled to more than one movable tine so that the more than one movable tine move as a unit in the Z direction.

As may be realized, movably mounting one or more tines 4273A-4273E on the base member 4200B1 of the pick head 4270 provides for full support of large case units and/or pickfaces on the pick head 4270 while also providing the ability to pick and place small case units without interfering with other case units positioned on, for example, the shelves of interface stations TS. The ability to pick and place variably sized case units without interfering with other case units at the interface stations reduces a size of a gap G (FIG. 6) between case units on the interface stations shelves Referring again to FIG. 5E, it is again noted that the pusher bar 4110PR is movable independent of the transfer arm LHDA. The pusher bar 4110PR is movably mounted to the frame 4110F in any suitable manner such as by, for example, a guide rod and slide arrangement and is actuated along the Y direction (e.g. in a direction substantially parallel to the extension/retraction direction of the transfer arm LHDA). In one aspect at least one guide rod 4360 is mounted within the payload section 4110PL for guiding movement of the pusher 4110PR in the Y direction. In one aspect, at least the guide rod/slide arrangement holds the pusher bar 4110PR captive within the payload section 4110PL. The pusher bar 4110PR is actuated by any suitable motor and transmission, such as by motor 4303 and transmission 4303T. In one aspect the motor 4303 is a rotary motor and the transmission 4303T is a belt and pulley transmission. In other aspects the pusher bar 110PR may be actuated by a linear actuator having substantially no rotary components.

The pusher bar 4110PR is arranged within the payload section 4110PL so as to be substantially perpendicular to the rollers 411ORL and so that the pusher bar 4110PR does not interfere with the pick head 4270 (the pusher bar 4110PR includes slots 4351 into which the fingers 4273A-4273E pass when lowered into the payload bed 4110PB where the slots 4351 are sized to allow unhindered movement of the pusher bar relative to the fingers 4273A-4273E). The pusher bar 4110PR also includes one or more apertures through which the rollers 4110RL pass where the apertures are sized to allow free rotation of the rollers about their respective axes. As may be realized, the independently operable pusher bar 4110PR does not interfere with the rollers 4110PR, extension of the transfer arm LHDA in the transverse direction (e.g. Y direction) and the lifting/lowering of the pick head 4270.

As may be realized, the lift modules 150A, 150B are under the control of any suitable controller, such as control server 120, such that when picking and placing case unit(s) the pick head is raised and/or lowered to a predetermined height corresponding to a shelf of an interface station TS at a predetermined storage level 130L. At the interface stations TS the pick head 4000A, 4000B, 4270 or individual portion thereof (e.g. effector LHDA, LHDB), corresponding to one or more case unit holding location(s) of the interface station TS from which one or more case unit(s) are being picked, is extended so that the fingers 4273 are interdigitated between the slats 1210S (as illustrated in FIG. 5B) underneath the case unit(s) being picked. The lift 150A, 150B raises the pick head 4000A, 4000B, 4270 to lift the case unit(s) from the slats 1210S and retracts the pick head 4000A, 4000B, 4270 for transport of the case unit(s) to another level of the storage and retrieval system, such as for transporting the case unit(s) to output station 16OUT. Similarly, to place one or more case unit(s) the pick head 4000A, 4000B, 4270 or individual portion thereof (e.g. effector LHDA, LHDB), corresponding to one or more case unit holding location(s) of the interface station TS from which one or more case unit(s) are being placed, is extended so that the fingers 4273 are above the slats. The lift 150A, 150B lowers the pick head 4000A, 4000B, 4270 to place the case unit(s) on the slats 1210S and so that the fingers 4273 are interdigitated between the slats 1210S underneath the case unit(s) being picked.

An example of a lift 150 case unit(s) transfer transaction including a case unit(s) multi-pick and place operation and on the fly sortation of the case units for creating a mixed pallet load MPL (as shown in FIG. 2) according to a predetermined order out sequence and/or in the predetermined order sequence (e.g. an order out sequence) of picked items according to, for example, an order, fulfilling one or more customer orders, in which case units CU are placed in one or more bag(s), tote(s) or other container(s) TOT at an operator station 160EP (as shown in FIG. 16) as will be described with respect to FIGS. 5A-5E, 6 and 7-7E in accordance with an aspects of the disclosed embodiment. For example, referring to FIG. 6 a customer order may require case unit(s) 7 and 5 to be delivered to output conveyor 160CB such that case units are carried and transferred by a common load handling device LHD of lift 150B1 from different holding locations of one or more interface station shelves 7000A-7000F in a single pass of the stack of interface stations TS. To efficiently use each lift 150 in the storage and retrieval system 100 the controller, such as control server 120, determines on which interface stations(s) case units 5, 7 are located. The controller sends commands to a lift, such as lift 150B1 associated with the interface stations TS where case units 5, 7 are located to pick one or more of the outbound case units. As described herein, in one aspect, the lifts 150 may move cases from the interface stations TS at the different storage levels to the interface station of the outbound conveyors. In other aspects, the lifts 150 may move case units between storage levels such as from shelf 7000A to shelf 7000D where the case units transferred from shelf 7000A may be picked from shelf 7000D (e.g. combined with case units previously disposed on shelf 7000D) by the lift 150 for transfer to the interface station of the outbound conveyor. In one aspect, the control server 120 is configured to command the lift 150, and effect with the lift 150 outbound flow (which may also be referred to as order fulfillment stream(s), outbound stream(s) or order fulfillment) sortation of case order(s) independent of the pick order of cases from the storage area by the bot 110 forming a pickface. This may be referred to for description purposes as outbound flow sortation with the lift 150 at transfer stations (and/or at buffer stations).

Figure 8:
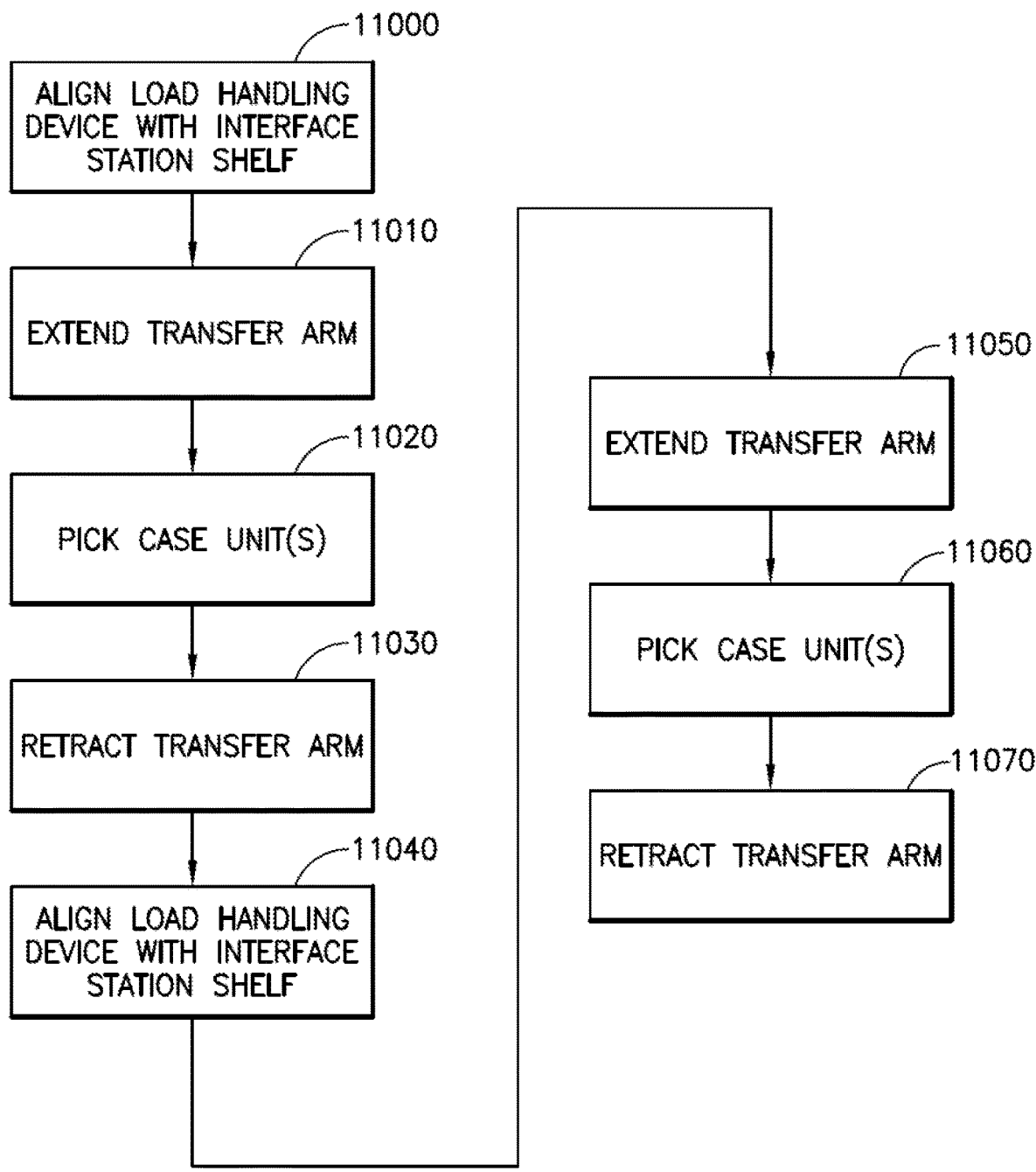
FIGS. 8-15 are flow diagrams in accordance with aspects of the disclosed embodiment.

In one aspect where the lift 150B1 picks case units 5, 7 from a common shelf 7000B of an interface station TS the lift 150B1 moves one or more load handling devices LHD, LHD1, LHD2 of the lift (and the pick head 4000A, 4000B, 4000C, 4000D, 4270 thereon) in the Z direction so that the transfer arm LHDA, LHDB is located substantially at a level of the interface station shelf 7000B (FIG. 8, Block 11000). The transfer arm LHDA, LHDB of the one or more load handling devices LHD, LHD1, LHD2 is extended (e.g. extension of a common transfer arm as in FIG. 5A or the substantially simultaneous extension of two transfer arms as in FIGS. 5C and 5D) in the Y direction so that the fingers 4273 are disposed between the slats 1210S below the case units 5, 7 (FIG. 8, Block 11010). The lift 150B1 moves the one or more load handling devices LHD, LHD1, LHD2 in the Z direction so that the fingers 4273 pass through the slats 12105 to lift/pick the case units 5, 7 from the interface station shelf 7000B (FIG. 8, Block 11020). The transfer arm LHDA, LHDB is retracted in the Y direction so as to place the case units 5, 7 within a transfer column TC (e.g. an area of open space in which the load handling device travels along the Z direction free from interference from the interface stations and outbound conveyors) of the lift 150B1 (FIG. 8, Block 11030). The lift 150B1 moves the one or more load handling devices LHD, LHD1, LHD2 in the Z direction so that the transfer arm LHDA, LHDB is located substantially at a level of an interface station 160TS of the conveyor 160CB (FIG. 8, Block 11040). The transfer arm LHDA, LHDB of the one or more load handling devices LHD, LHD1, LHD2 is extended in the Y direction so as to place the case units 5, 7 substantially above the interface station 160TS (FIG. 8, Block 11050) and the lift 150B1 moves the one or more load handling devices LHD, LHD1, LHD2 in the Z direction so that the fingers 4273 pass through the slats of the interface station 160TS (in a manner similar to that illustrated in FIG. 5B) to lower/place the case units 5, 7 on a shelf of the interface station 160TS (FIG. 8, Block 11060). The transfer arm LHDA, LHDB is retracted in the Y direction so as to place the transfer arm LHDA, LHDB within the transfer column TC of the lift 150B1 (FIG. 8, Block 11070). Here case units carried at all load stations LST1-LST3 (e.g. case unit holding locations) of a common platform PFM (e.g. as in FIG. 5A and as in FIGS. 5C, 5D where the simultaneous extension/retraction of transfer arms LHDA, LHDB effects a common platform) are picked, transferred and placed in unison.

Figure 9:
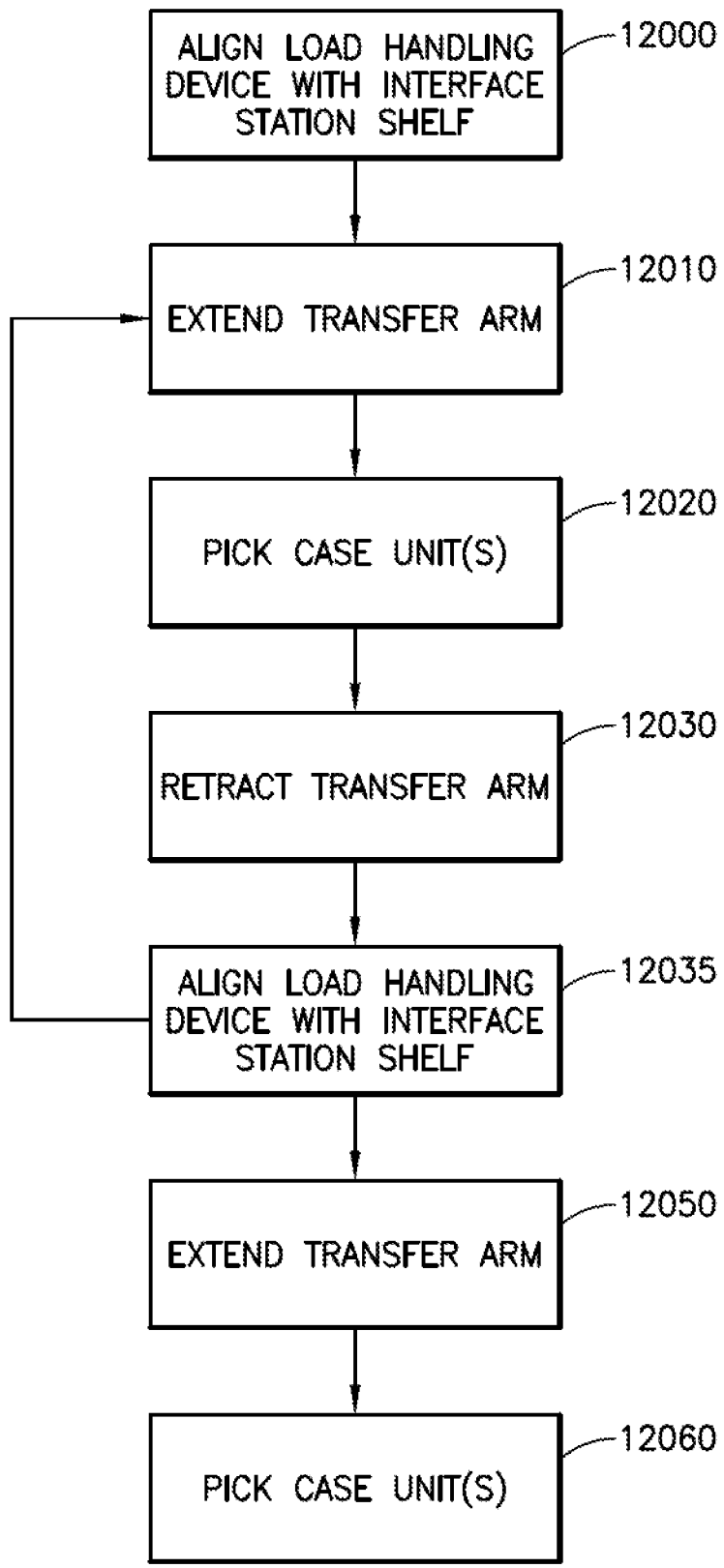

In one aspect, a multiple transfer arm load handling device LHD as in FIG. 5C (and also the individually operable load handling devices LHD1, LHD2 of FIG. 5D) picks and places case units from more than one interface station TS at different storage levels 130LA, 130LB and transfers the case units to the same or different outbound conveyor transfer stations TS (e.g. such as when the transfer stations TS of one or more the outbound conveyors serving a common lift 150 are stacked one above the other). For exemplary purposes only, a customer order may require case units 7, 9 to be delivered to conveyor 160CB. Again, to efficiently use each lift 150 in the storage and retrieval system 100 the controller, such as control server 120, determines on which interface stations(s) case units 7, 9 are located. The controller sends commands to a lift, such as lift 150B1 associated with the interface stations TS where case units 7, 9 are located to pick one or more of the outbound case units in a single pass of the load handling device LHD. Here, case units 7, 9 are located on different shelves 7000A-7000F of different interface stations TS such that the lift 150B1 moves one or more load handling devices LHD, LHD1, LHD2 of the lift (and the pick head 4000A, 4000B, 4000C, 4000D, 4270 thereon) in the Z direction so that the transfer arm LHDA, LHDB is located substantially at a level 130LA, 130LC of one of the interface station shelves 7000A, 7000B shelf (FIG. 9, Block 12000). The transfer arm LHDA, LHDB of the one or more load handling devices LHD, LHD1, LHD2 is extended in the Y direction so that the fingers 4273 are disposed between the slats 12105 below one of the case units 7, 9 (FIG. 9, Block 12010) such as case unit 7 when case unit 7 is being picked on an upstroke of the lift 150B before picking case unit 9 or case unit 9 when case unit 9 is being picked on a down stroke of the lift 150B before picking case unit 7. The lift 150B1 moves the one or more load handling devices LHD, LHD1, LHD2 in the Z direction so that the fingers 4273 pass through the slats 1210S to lift/pick one of the case units 7, 9 (which is some aspects may be a pickface including more than one case unit) from the interface station shelf 7000B (FIG. 9, Block 12020). The transfer arm LHDA, LHDB is retracted in the Y direction so as to place the case units 7, 9 within a transfer column TC (e.g. an area of open space in which the load handling device travels along the Z direction free from interference from the interface stations and outbound conveyors) of the lift 150B1 (FIG. 9, Block 12030). The lift 150B1 moves the one or more load handling devices LHD, LHD1, LHD2 in the Z direction so that the transfer arm LHDA, LHDB is located substantially at a level of interface station shelf 7000A, 7000B where the other case unit 7, 9 is located (FIG. 9, Block 12035) for picking the other case unit in the manner described above (FIG. 9, Blocks 12010, 12020, 12030). The lift 150B1 moves the one or more load handling devices LHD, LHD1, LHD2 in the Z direction so that the transfer arm LHDA, LHDB is located substantially at a level of an interface station 160TS of the conveyor 160CB (FIG. 9, Block 12035). The transfer arm LHDA, LHDB of the one or more load handling devices LHD, LHD1, LHD2 is extended in the Y direction so as to place the case units 7, 9 substantially above the interface station 160TS (FIG. 9, Block 12050) and the lift 150B1 moves the one or more load handling devices LHD, LHD1, LHD2 in the Z direction so that the fingers 4273 pass through the slats of the interface station 160TS (in a manner similar to that illustrated in FIG. 5B) to lower/place the case units 7, 9 on a shelf of the interface station 160TS (FIG. 9, Block 12060). In one aspect the case units 7, 9 are placed on the interface station 160TS substantially simultaneously as a unit while in other aspects the case units 7, 9 are placed on the interface station 160TS sequentially at different times, such as one after another and/or placed to different outbound conveyors interface stations 160TS (e.g. such as when the transfer stations TS of one or more the outbound conveyors serving a common lift 150 are stacked one above the other) according to a predetermined order out sequence for building the mixed pallet MPL (FIG. 2). The transfer arm LHDA, LHDB is retracted in the Y direction so as to place the transfer arm LHDA, LHDB within the transfer column TC of the lift 150B1 (FIG. 9, Block 12070).

Figure 10:
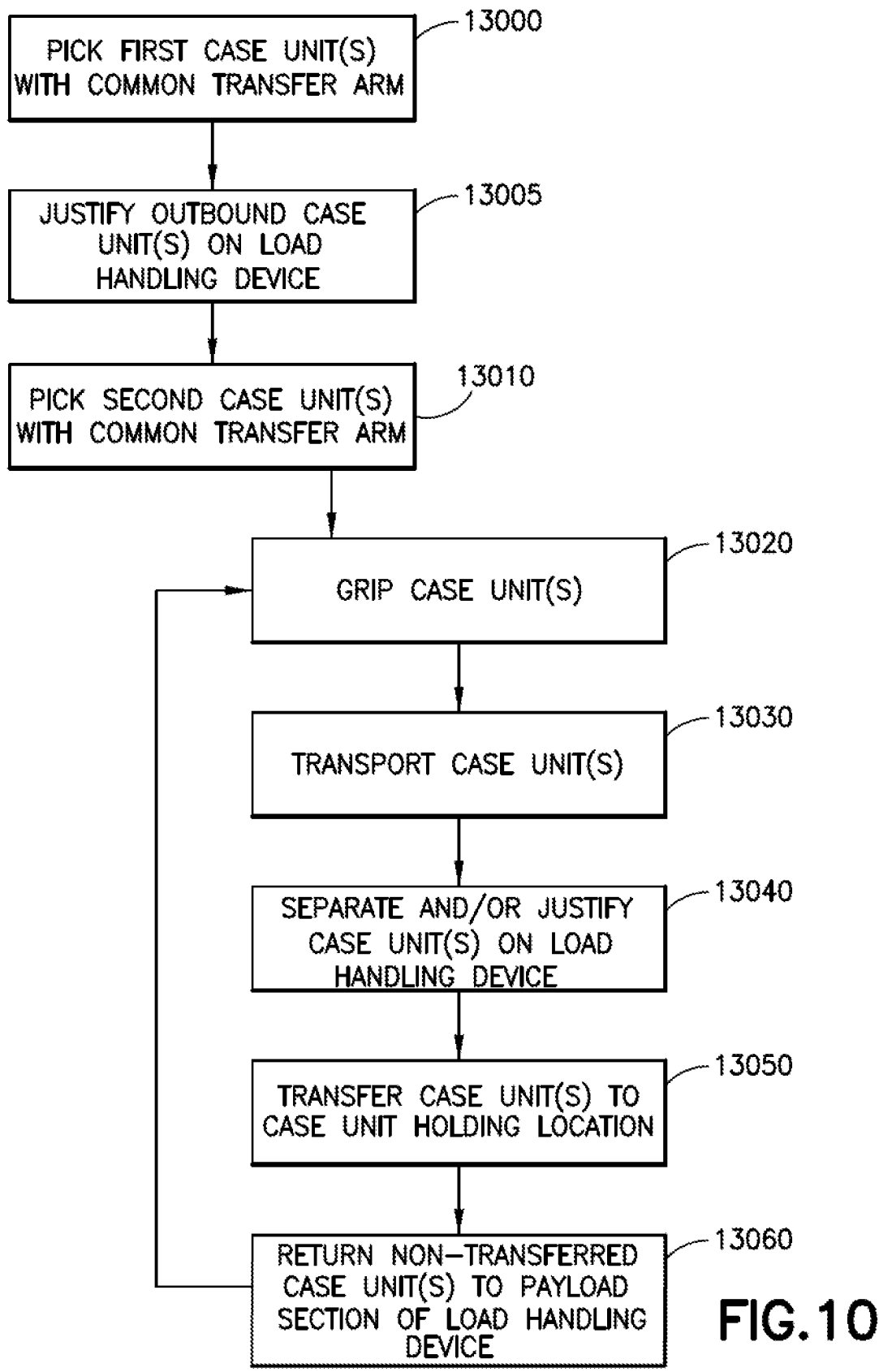

In one aspect a common load handling device LHD, LHD1, LHD2 is configured to pick/place one or more case units from multiple interface station TS shelves with a common transfer arm where the case units are sorted on the fly (e.g. during transport on the lift) and/or justified on the load handling device LHD, LHD1, LHD2. For example, the outbound case units 5, 7 are located on interface station shelves 7000B, 7000B of different storage levels 130LA, 130LB. Again, to efficiently use each lift 150 in the storage and retrieval system 100 the controller, such as control server 120, determines on which interface stations(s) case units 5, 7 are located. The controller sends commands to a lift, such as lift 150B1 associated with the interface stations TS where case units 5, 7 are located to pick one or more of the outbound case units in a single pass of the load handling device LHD. Here For example, referring to FIGS. 6, 7 and 7A-7E the load handling device LHD, LHD1, LHD2 of lift 150B1 picks case unit 7 (which may be a pickface of more than one case unit) from interface station shelf 7000B in the manner described above (FIG. 10, Block 13000). The case unit(s) 7 is justified on the load handling device towards the rear of the payload section 4110PL as will be described in greater detail below (FIG. 10, Block 13005). The load handling device LHD, LHD1, LHD2 continues to travel along the mast 4002 in a common pass of the vertical stack of interface stations TS and picks case unit 5 from a different interface station shelf 7000D with the common transfer arm LHDA so that both case unit(s) 7, 5 are located adjacent one another on the common transfer arm LHDA (FIG. 10, Block 13010). As may be realized, in one aspect, the controller 120 is configured to effect picking of the case unit(s) 5, 7 in any suitable order such as, for example, an order that is opposite an order in which the case unit(s) are placed at the interface station 160TS of the conveyor 160CB according to the predetermined order out sequence for forming the mixed pallet MPL.

Here the load handling device LHD, LHD1, LHD2 grips both case units 7, 5 within the payload section 4110PL in the manner described below (FIG. 10, Block 13020). The load handling device LHD, LHD1, LHD2 travels along the mast 4002 and interfaces with one or more output lifts 150B1 (FIG. 10, Block 13030). The load handling device LHD, 1HD1, LHD2 separates the case units 7, 5 within the payload section 4110PL, as will be described in greater detail below, so that case unit(s) are separated in any suitable manner such as, for example, so that case unit(s) 5 is justified towards the front of the payload section 4110PL and case unit(s) 7 is justified towards the back of the payload section 4110PL (FIG. 10, Block 13040). At least the case unit 5 is transferred to the interface station 160TS (FIG. 10, Block 13050). The load handling device LHAD, LHD1, LHD2 retracts the transfer arm LHDA, LHDB to return the non-transferred case unit(s) 7 (e.g. case units retained within the payload section) to the payload section 4110PL (FIG. 10, Block 13060) and grips the case unit 7 (FIG. 10, Block 13020). The case unit(s) 7 is transported to another interface station 160TSA of output lift 150B1 (or placed at the same interface station 160TS sequentially after placement of case unit(s) 5 at interface station 160TS) (FIG. 10, Block 13030), justified toward the front of the payload section 4110PL (FIG. 10, Block 13040), and transferred to interface station 160TS, 160TSA, as described above (FIG. 10, Block 13050). In other aspects, depending on the predetermined case unit output sequence, the load handling device LHD, LHD1, LHD2 places both case unit(s) 7, at a common location/ position, such as simultaneously at a single interface station of lifts 15081.

Figure 11:
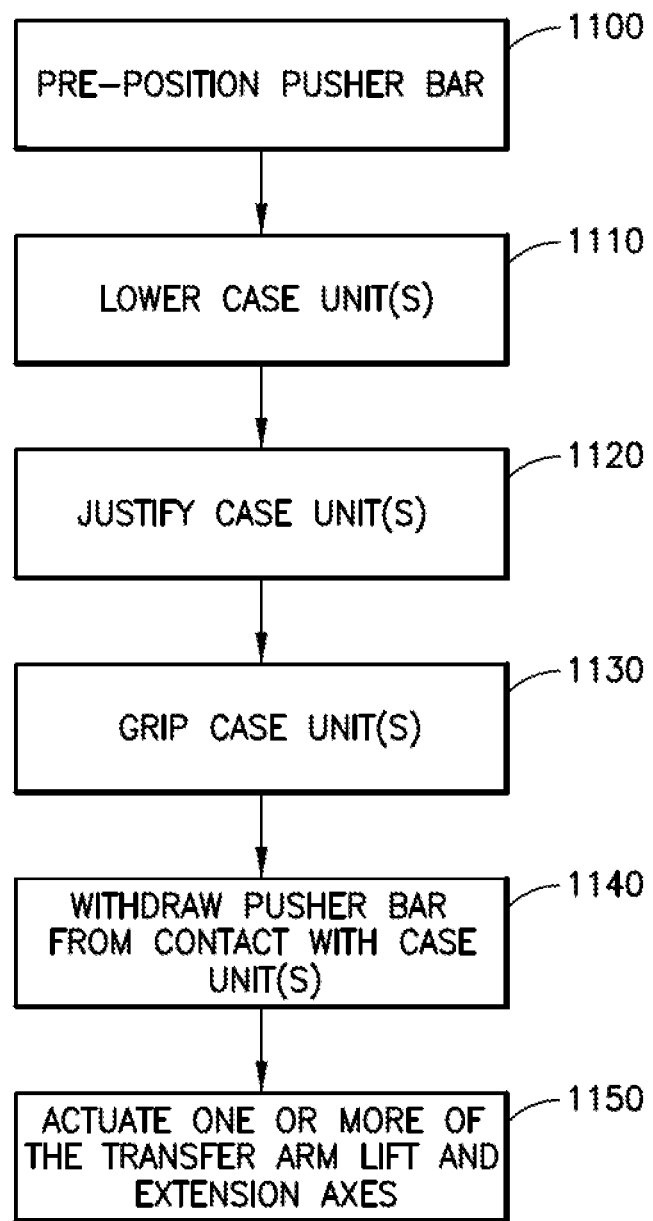

As noted above, because the pusher bar 4110PR is a separate, standalone axis of the load handling device LHD, LHD1, LHD2 that operates free of interference from the pick head 4270 extension and lift axes, the pusher bar 4110PR can be operated substantially simultaneously with the lifting and/or extension of the transfer arm LHDA, LHDB. The combined axis moves (e.g. the simultaneous movement of the pusher bar 4110PR with the transfer arm LHDA, LHDB extension and/or lift axes) provides for increased payload handling throughput and effects the ordered (e.g. according to the predetermined load out sequence) multi-pick of two or more case units from one or more interface station shelves 7000A-7000F, in one common pass of the vertical stack of interface stations TS. For example, referring again to FIGS. 7-7E during a transfer arm LHDA, LHDB multi-pick/place sequence the pusher bar 4110PR is prepositioned (as the case unit(s) and/or pickface are being picked and transferred into the payload section 4110PL) to a location that is a predetermined distance X2 away from the contact depth X3 (e.g. the depth of the tines occupied by the case unit(s) and/or pickface 7 when being picked/placed from interface station shelf 7000D or other case unit holding location) (FIG. 11, Block 1100). The distance X2 is a minimized distance that only allows sufficient clearance between pusher bar 110PR and the case unit(s) to allow the case unit(s) to be seated on the rollers 4110RL. As the case unit(s) 7 are lowered onto the rollers 4110RL (FIG. 11, Block 1110) the distance traveled by the pusher bar 4110PR to contact the case unit(s) 7 is a shorter distance X2 when compared to moving from a back side 4402 (relative to the Y direction and an access side 4401 of the payload section 4110PL) of the payload section 4110PL a distance X4 as with conventional transport vehicles. When the case unit(s) 7 are lowered by the transfer arm LHDA, LHDB and transferred to the rollers 4110RL so as to be solely supported by the rollers 4110RL, the pusher bar 4110PR is actuated to forward (relative to the lateral direction and an access side 4401 of the payload section 110PL) justify the case unit(s) 7 (FIG. 11, Block 1120). For example, the pusher bar 4110PB may push the case unit(s) 7 in the Y direction so that the case unit(s) contact the fence 4110PF (which is located at the access side 4401 of the payload section 4110PL) so that a case unit reference datum may be formed through contact between the case unit(s) 7 and the fence 4110PF. In one aspect the pusher bar 4110PR may engage or otherwise grip the case unit(s) 7 during transport of the case units (e.g. so as to hold the case unit(s) against the fence 4110PF) for maintaining the case unit(s) 7 in a predetermined spatial relationship with each other and the reference frame REFL (FIG. 5E) of the load handling device LHD, LHD1, LHD2 (FIG. 11, Block 1130). When placing the case unit(s) the pusher bar 4110PR, after justifying the case unit(s) 7 against the fence 4110PF, is withdrawn (e.g. in the Y direction) from contact with the case unit(s) 7 (FIG. 11, Block 1140). Substantially immediately after the pusher bar 4110PR disengages the case unit(s) 7 one or more of the lift axis (e.g. in the Z direction) and extension axis (e.g. in the Y direction) of the transfer arm LHDA, LHDB are actuated substantially simultaneously with the withdrawing movement of the pusher bar 4110PR (FIG. 11, Block 1150). In one aspect both the lift and extension axes are actuated when the pusher bar is withdrawn from contact with the case unit(s) 7 while in other aspect one of the lift and extension axes is actuated. As may be realized, the simultaneous movement of the transfer arm 4110PA lift axis and/or extension axis with the withdrawal of the pusher bar 4110PR as well as the decreased distance the pusher moves to justify the case unit(s) 7 decreases the time needed to transfer case unit(s) 7 (e.g. that are sorted on the load handling device LHD, LHD1, LHD2) to and from the load handling device and increases throughput of the storage and retrieval system 100.

Figure 12:
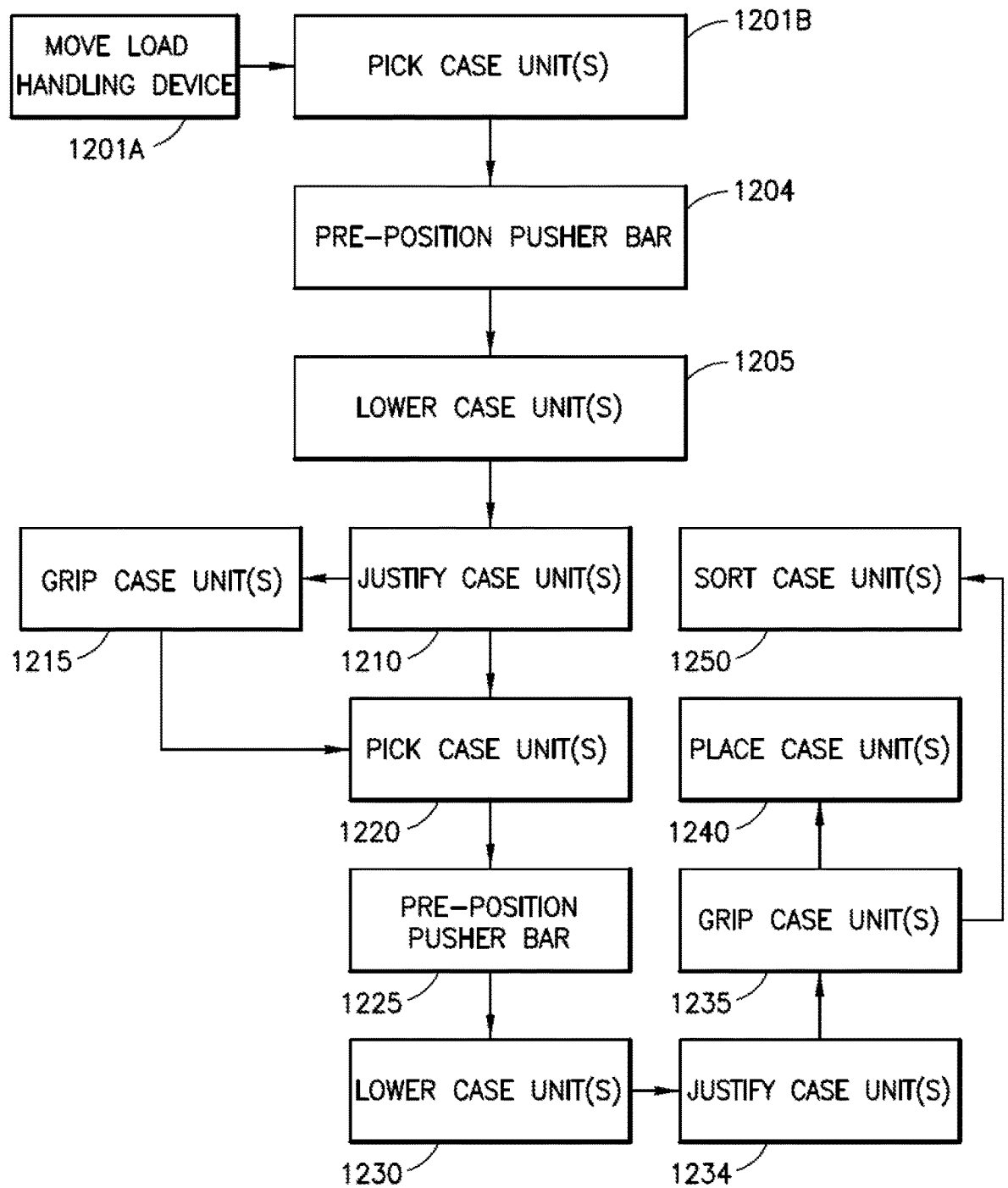

In another aspect of the disclosed embodiment, as may be realized, in the multi-pick/place sequence multiple case units are substantially simultaneously carried and manipulated within the payload section 4110PL to further increase throughput of the storage and retrieval system 100 and to effect the multi-pick/place sequence in accordance with a predetermined order out sequence for an outbound flow of case units. Referring also to FIG. 1, the lift 150B receives pick and place commands from, for example, control server 120 (and/or warehouse management system 2500) and executes those commands (e.g. under the control of control server 120 (or a lift controller) for forming the ordered multi-pick. Here the lift moves the load handling device LHD, LHD1, LHD2 in the Z-direction to pick two or more case units according to the predetermined order out sequence (FIG. 12, Block 1201A). In one aspect the manipulation of the case units 7, 5 is a sorting of the case units (in other words picking and placing of case units according to the predetermined load out sequence) where the cases are positioned on the transfer arm LHDA, LHDB for picking/placement of the case units and/or positioned so that the case units are not transferred and remain on the transfer arm LHDA, LHDB while other case units are transferred to and from the transfer arm LHDA, LHDB. Here, the load handling device LHD, LHD1, LHD2 travels in the Z direction and stops at a predetermined shelf 7000A-7000F of an interface station TS, according to the predetermined order out sequence, where the load handling device LHD, LHD1, LHD2 picks one or more case units from the predetermined shelf 7000A-700F of the interface station TS with a common transfer arm LHDA, LHDB where placement of the case units on the common transfer arm LHDA, LHDB corresponds to the predetermined order out sequence as will be described in greater detail below (e.g. the case units are sorted on-the-fly, e.g. during a single or unidirectional pass/traversal of the lift 150, without reversing direction or in one stroke, relative to the interface stations, noting that vertical movement of the lift 150 is not necessarily continuous vertical movement).

As an example of case manipulation on the bot 110, still referring to FIGS. 5E, 7, 7A-7E, case unit(s) 7 may be picked from a case unit holding location (e.g. such as interface station shelf 7000D for effecting the ordered multi-pick (FIG. 12, Block 1201B). As the case unit(s) 7 is being transferred into the payload section 4110PL the pusher bar 4110PR may be pre-positioned (FIG. 12, Block 1204) adjacent the fence 4110PF so that the pusher bar 4110PR is positioned between the case unit(s) 7 and the fence 4110PF when the case unit(s) 7 is lowered for transfer to the rollers 4110RL (FIG. 12, Block 1205). The pusher bar 4110PR is actuated to push the case unit(s) 7 (resting on the rollers 4110RL) in the Y direction towards the back (e.g. rear) 4402 of the payload section 4110PL so that the case unit(s) 7 contacts a justification surface 4273JS (FIG. 10) of the tines 4273A-4273E and is justified to the back 4402 of the payload section 4110PL (FIG. 12, Block 1210).

Figure 7:
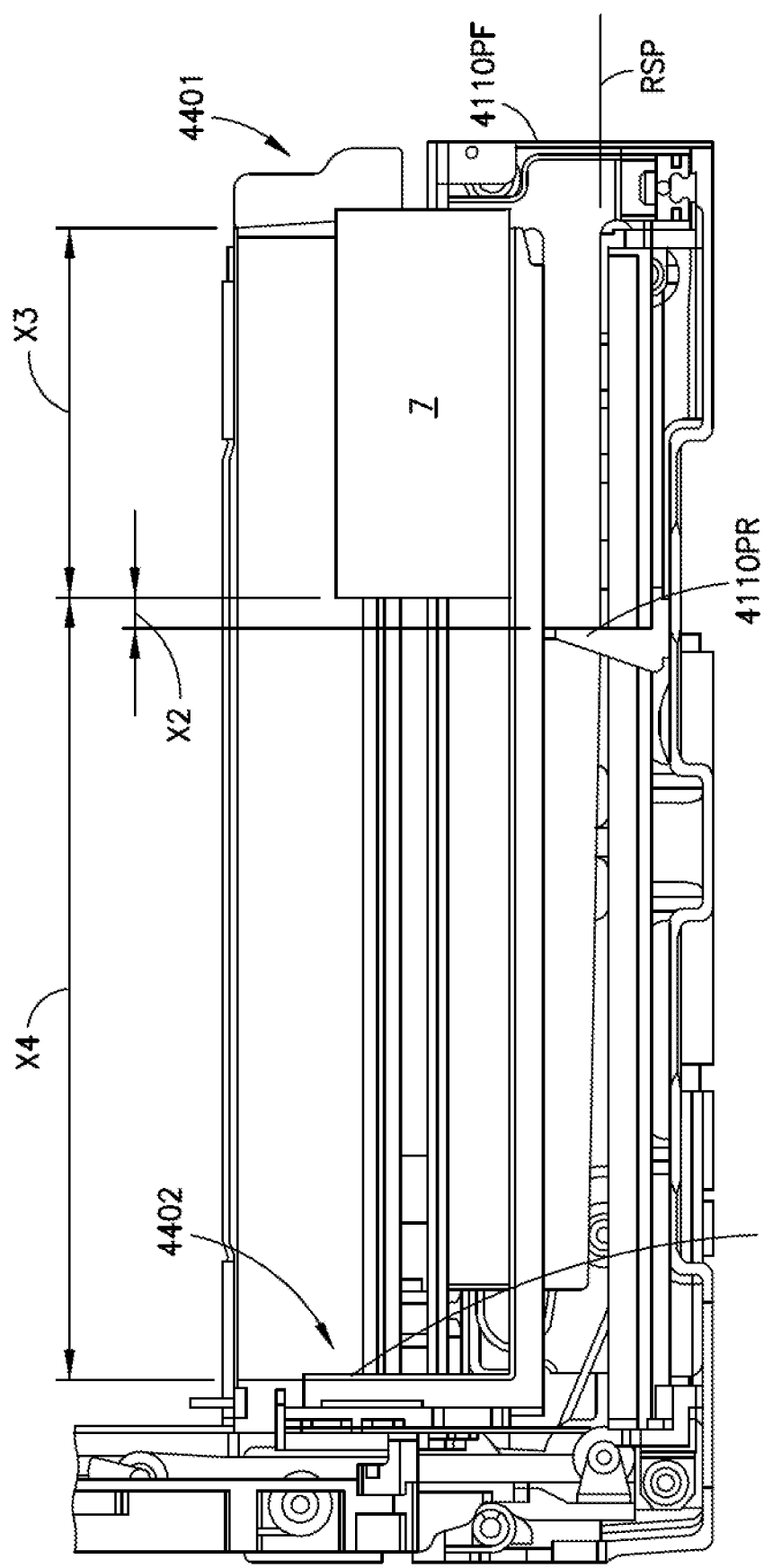
FIGS. 7, 7A-7E are schematic illustrations of a portion of the storage and retrieval system in accordance with aspects of the disclosed embodiment.
Figure 7A:
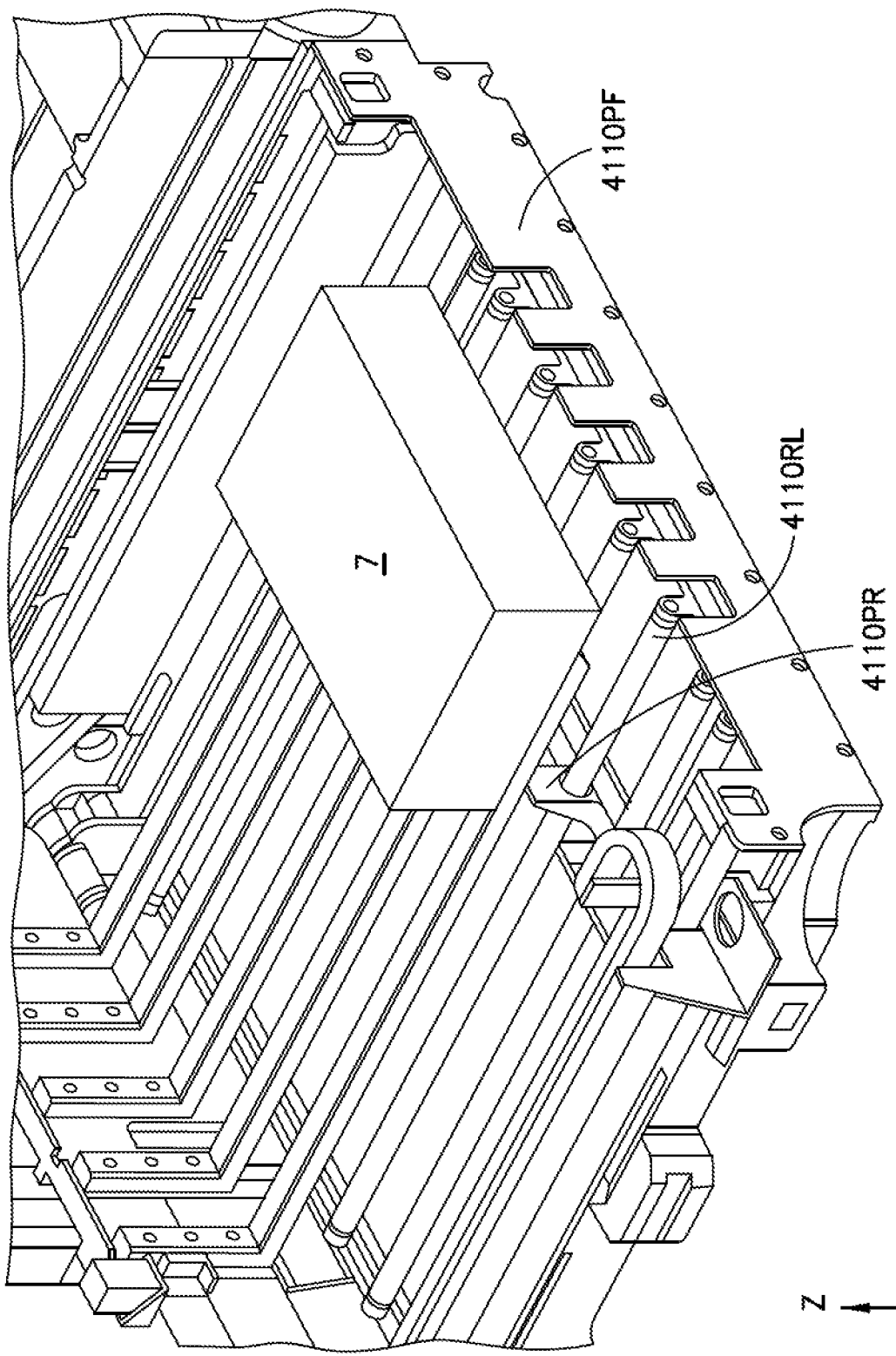
Figure 7B:
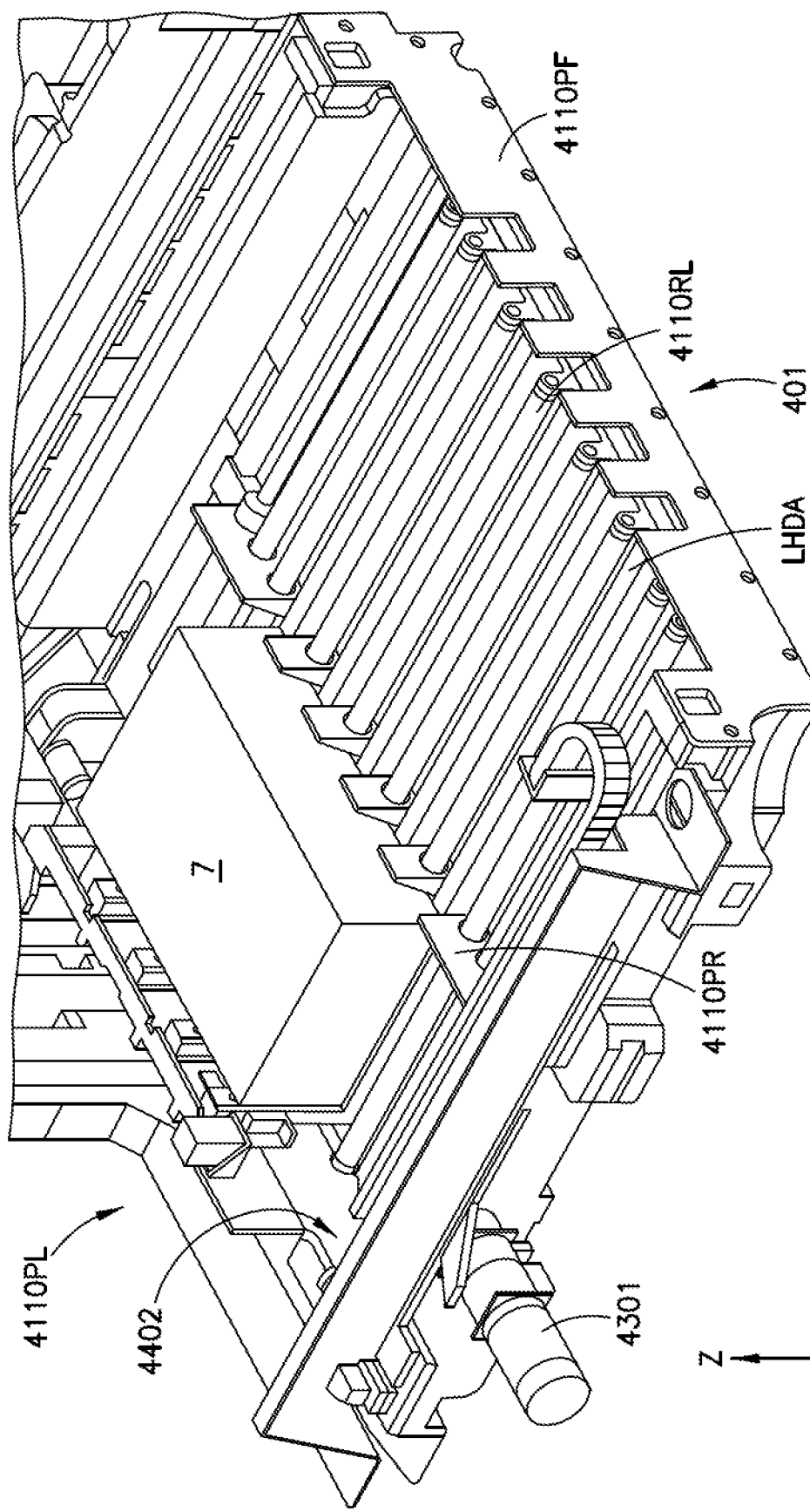
Figure 7C:
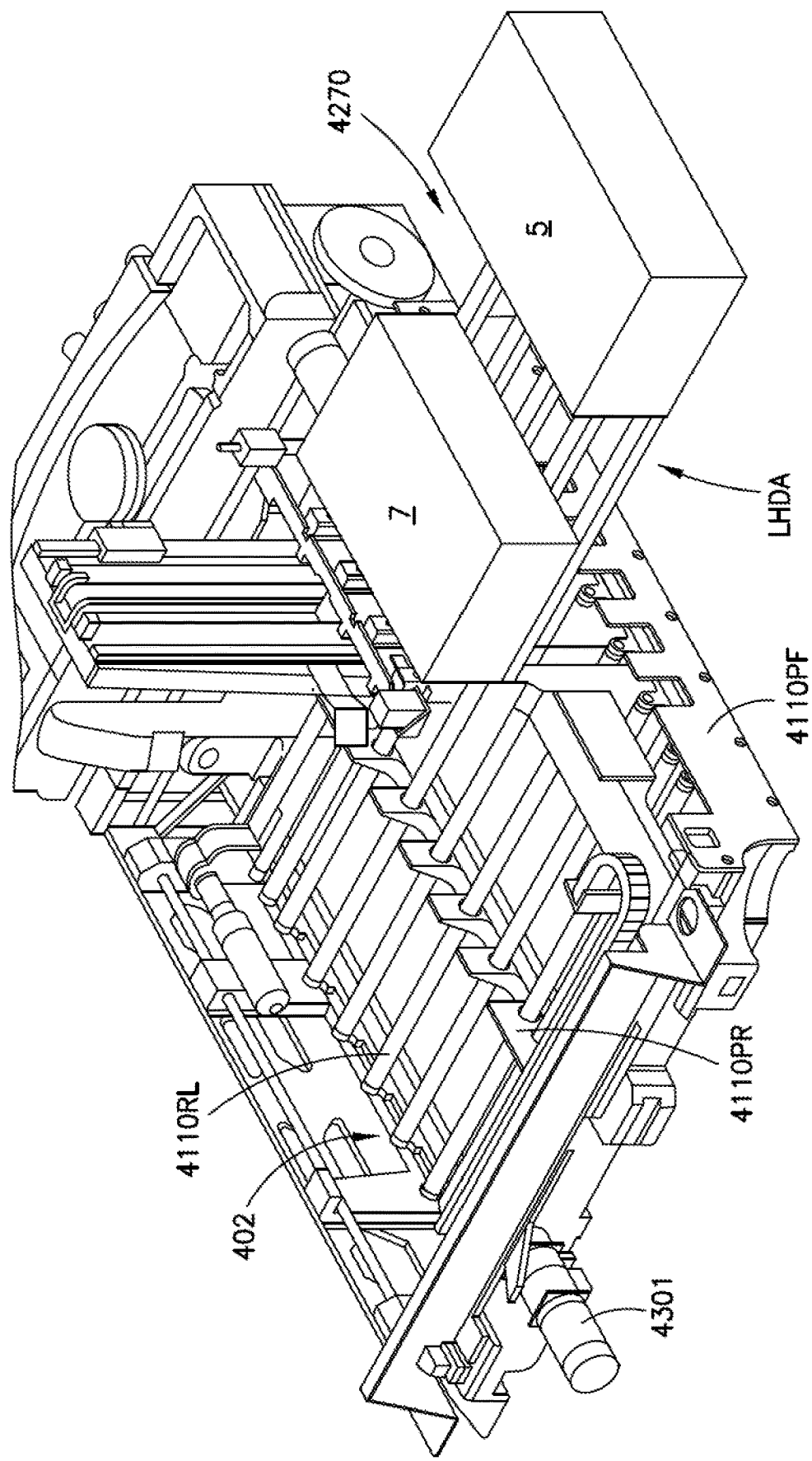
Figure 7D:
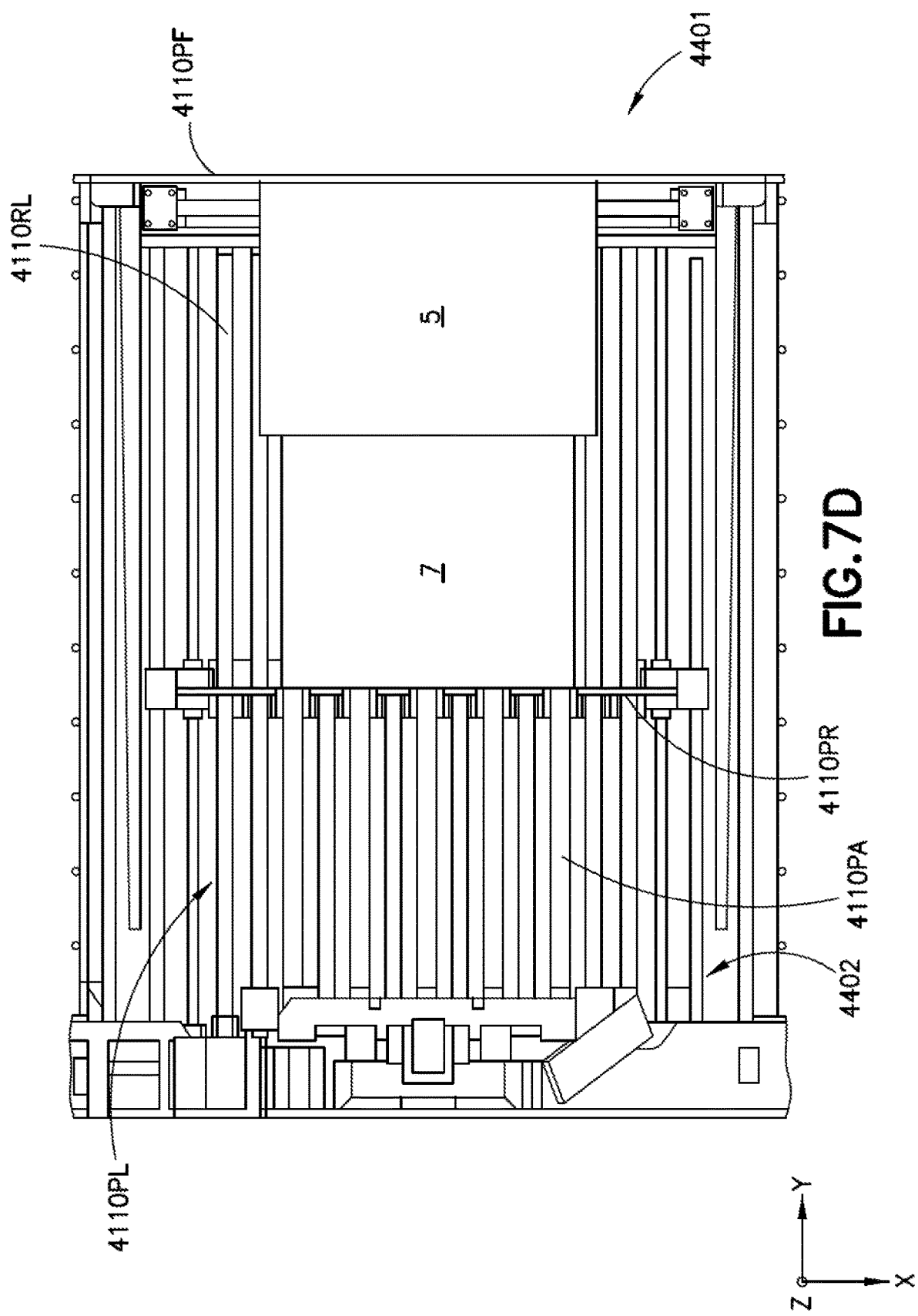
Figure 7E:
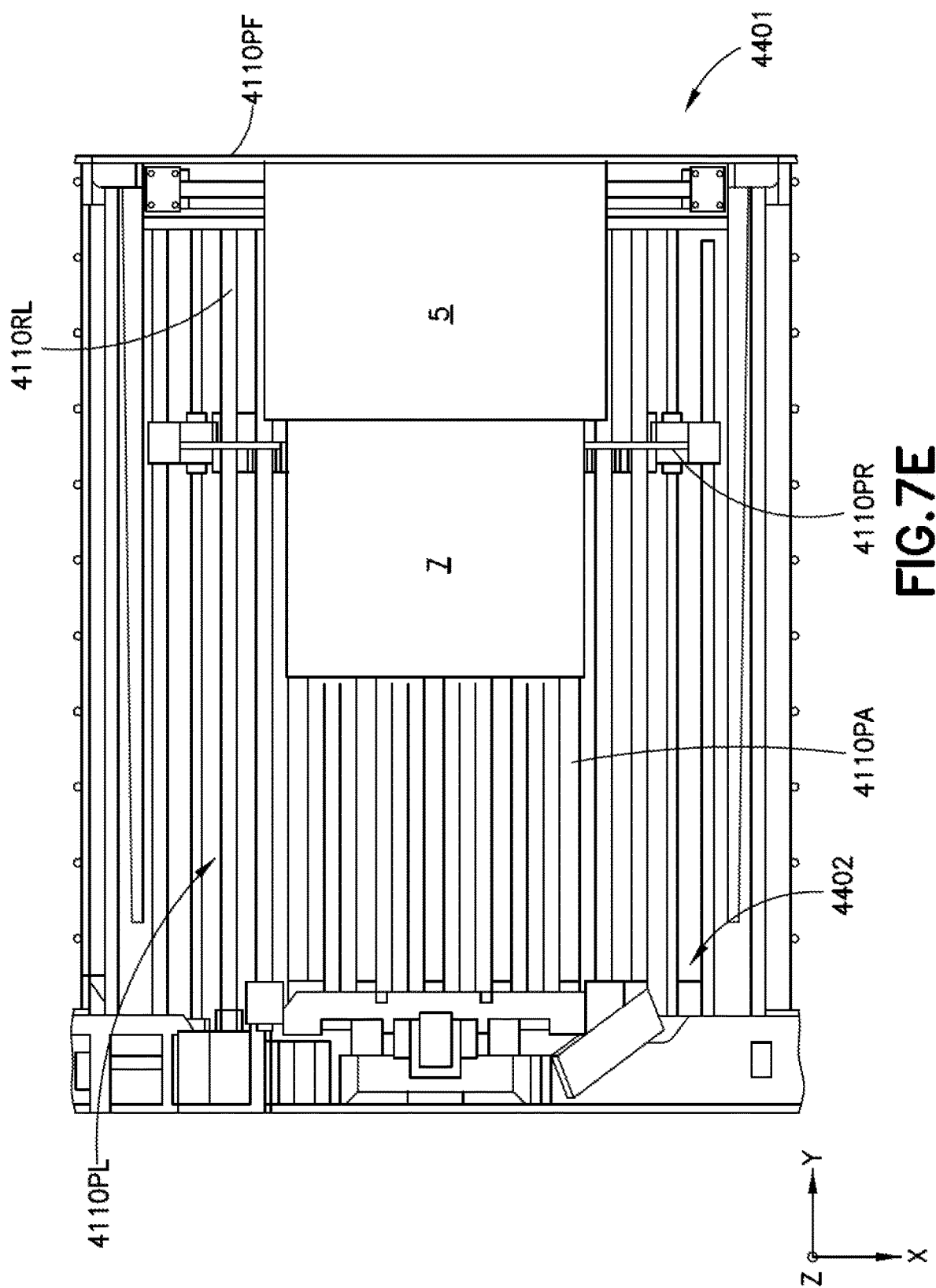
Figure 13:
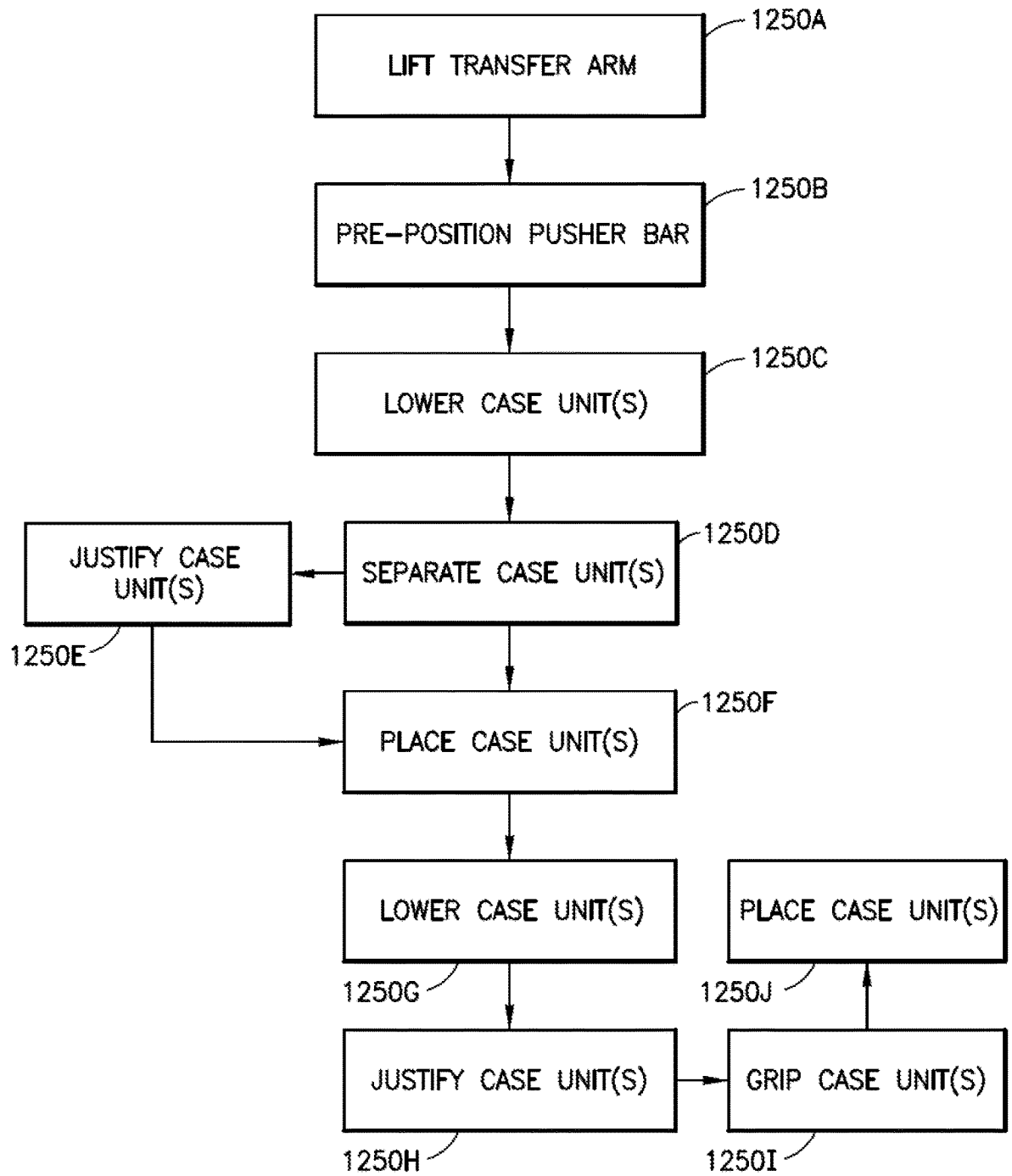

In one aspect, the load handling device LHD, LHDA, LHD2 continues to traverse mast 4002 in the same direction (e.g. so that all of the case units in the ordered multi-pick are picked in the common pass of the vertical stack of interface stations TS with the load handling device LHD, LHD1, LHD2 travelling in a single direction) and stops at another different predetermined shelf 7000A-7000F of a different interface station TS according to the predetermined order out sequence. As noted above, the pusher bar 4110PR remains in contact with (e.g. grips) the case unit(s) 7 during transport of the case unit(s) between interface station shelves 7000A-7000F so that the case unit(s) 7 remains in a predetermined location at the back 4402 of the payload section 4110PL (and/or at a predetermined location in the X direction) relative to the reference frame REFL of the lift 150B1 (FIG. 12, Block 1215). To pick subsequent case units, from for example, the another interface station shelf 7000B the pusher bar 4110PR is moved in the Y direction to disengage the case unit(s) 7 and the lift and extension axes of the transfer arm LHDA, LHDB are actuated to retrieve another case unit(s) 5 from the other interface station shelf 7000B (FIG. 12, Block 1220). While the case unit(s) 5 are being picked the pusher bar 4110PR is positioned in the Y direction adjacent the back 4402 of the payload section 4110PL so as to be located between the case units 7 and the justification surface 4273JS of the tines 4273A-4273E (FIG. 12, Block 1225). The case unit(s) 5 are transferred into the payload section and lowered/placed on the rollers 411ORL (FIG. 12, Block 1230) so that the case units 7, 5 are arranged relative to each other along the Y axis. The pusher bar 4110PR is actuated in the Y direction to push the case units 7, 5 towards the fence 4110PF to forward justify the case units 7, 5 (FIG. 12, Block 1234) and grip/hold the case units 7, 5 for transport (FIG. 12, Block 1235). As may be realized, in one aspect the case units 7, 5 are placed at the interface station 160TS together as a unit while in other aspects the case units 7, 5 are sorted, e.g. transported to and placed at different interface stations 160TS, 160TSA (FIG. 12, Block 1240).

Where the case units 7, 5 are sorted (FIG. 12, Block 1250) for placement at a common interface station 160TS, 160TSA (such as for sequential but chronologically spaced apart, placement of case unit) or at different interface stations 160TS, 160TSA, the case units 7, 5 are separated from each other in the payload section 4110PL. For example, the pick head 4270 of the transfer arm LHDA, LHDB may be moved in the Z direction to lift the case units 7, 5 from the rollers 4110RL by an amount sufficient to allow the pusher bar 4110PR to pass beneath the case unit(s) (FIG. 13, Block 1250A). As the case units 7, 5 are lifted the pusher bar 4110PR is positioned along the Y direction so as to be located between the case units 7, 5 (see FIG. 7E) (FIG. 13, Block 1250B). The pick head 4270 is lowered so that the case units 7, 5 are transferred to the rollers 4110RL and so that the pusher bar is inserted between the case units 7, 5 (FIG. 13, Block 1250C). The pusher bar 4110PR is moved in the Y direction (e.g. to separate the case unit(s)) to move case unit(s) 7 towards the back 402 of the payload section 4110PL (e.g. against the justification surface 4273JS of the tines 4273A-4273E or any other suitable position) while the case unit(s) 5 remain at the front of the payload section 4110PL adjacent the fence 4110PF (e.g. as shown in FIG. 7C) (FIG. 13, Block 1250D). As may be realized, where the case units are held against the justification surface 4273JS of the tines during transport, the pusher bar is moved in the Y direction (e.g. to separate the case unit(s)) to move case unit(s) 5 towards the front 4401 of the payload section 4110PL (e.g. against the fence 4110PF or any other suitable position) while the case unit(s) 7 remain at the back of the payload section 4110PL adjacent the justification surface 4273JS. The pusher bar 4110PR may also be moved in the Y direction to re-justify the case unit(s) 5 against the fence 4110PF to position the case unit(s) on the tines 4273A-4273E for placement at the interface station 160TS, 160TSA (FIG. 13, Block 1250E). As may be realized, with the case unit(s) 7 being positioned substantially against the justification surface 4273JS of the tines 4273A-4273E (e.g. of the pick head 4270) the case unit(s) 5 can be placed at the interface station 160TS, 160TSA substantially without interference from the case unit(s) 7 (FIG. 13, Block 1250F), e.g. the case unit 7 is free from contacting case units disposed at the case unit holding location. The case unit(s) 7 is lowered/transferred back into the payload section 4110PL (e.g. by retracting and lowering the transfer arm 4110PA) (FIG. 13, Block 1250G). The pusher bar 4110PR, which is pre-positioned between the justification surface 4273JS and the case unit(s) 7, pushes the case unit(s) 7, which is disposed on the rollers 4110RL, against the fence 4110PF to forward justify the case unit(s) 7 for placement at the same or another interface station 160TS, 160TSA (e.g. different than the holding location that case unit(s) 5 were placed) (FIG. 13, Block 1250H). The pusher bar 4110PR remains against the case unit(s) 7 for gripping (e.g. with the fence) the case unit(s) during transport to the other interface station 160TS, 160TSA (FIG. 13, Block 1250I). The pusher bar 4110PR moves away from the case unit(s) 7 and the transfer arm is actuated to lift and extend the pick head 4270 for placing the case unit(s) 7 at the other interface station 160TS, 160TSA (FIG. 13, Block 1250J).

In one aspect, referring again to FIG. 5D, a lift with multiple individually operable load handling devices LHD1, LHD2 picks and places case units from more than one interface station TS at different storage levels 130LA, 130LB and transfers the case units to the same or different outbound conveyor interface stations TS (e.g. such as when the transfer stations TS of one or more the outbound conveyors serving a common lift 150 are stacked one above the other). Here, each of the individually operable load handling devices LHD1, LHD2 picks and places case units from the interface station shelves 7000A-7000F and delivers the picked case units to the outbound conveyor 160CB in a manner substantially similar to the manner described above with respect to FIGS. 8, 9 and 10. It is noted that in one aspect each load handling device LHD1, LHD2 includes a single transfer arm LHDA, LHDB (see FIGS. 5A, 5D) or more than one transfer arm LHDA, LHDB (see FIG. 5C) (e.g. one load handling device include a single transfer arm while the other load handling device includes more than one transfer arm; both load handling devices include a single transfer arm; both load handling devices include more than one transfer arm). The load handling devices LHD1, LHD2 in one aspect include the sorting and justification mechanisms described above with respect to FIG. 5E.

The output lifts 150B1, 150B2 transfer the ordered multi-pick(s) placed on the shelves 7000A-7000L by the bots 110 to the output station 16OUT also in accordance with the predetermined order out sequence. For example, referring again to FIG. 6, the pickfaces 1-22 are picked by the lifts 150B1, 150B2 in sequenced order so that the pickfaces 1-22 are delivered to the output station 160UTin the predetermined order (indicated by, for example, the number associated with each case unit/pickface illustrated in FIG. 6) needed to form the mixed pallet load MPL (FIG. 2) and/or in the predetermined order sequence (e.g. an order out sequence) of picked items according to, for example, an order, fulfilling one or more customer orders, in which case units CU are sequenced for placement in one or more bag(s), tote(s) or other container(s) TOT at an operator station 160EP. As such, each of the interface stations TS of each lift 150B1, 150B2 forms a buffer that holds one or more case unit(s) until the case unit(s) are needed and picked by the respective lift 150B1, 150B2 for forming the mixed pallet load.

Figure 17:
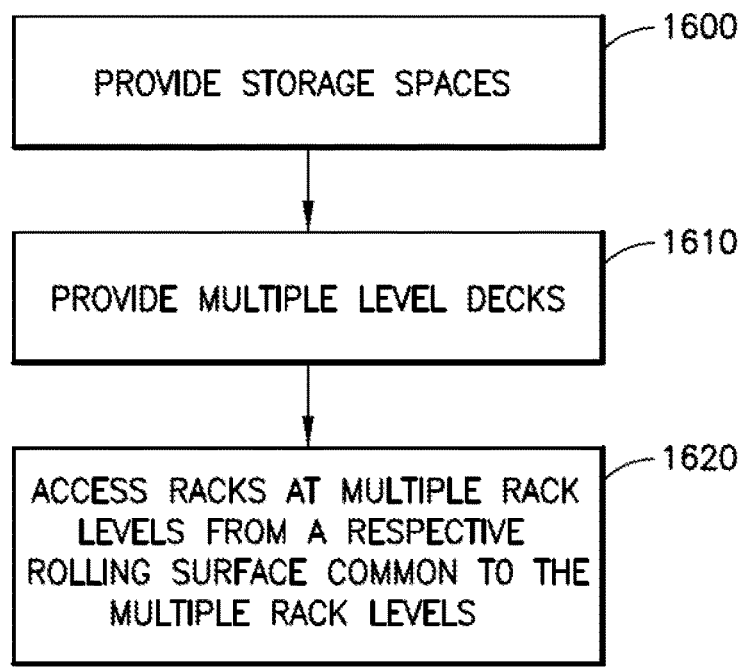
FIG. 17 is an exemplary flow diagram in accordance with aspects of the disclosed embodiment.

Referring to FIG. 17, in accordance with aspects of the disclosed embodiment, storage spaces arrayed on racks along picking aisles are provided (FIG. 17, Block 1600). Multiple level decks are also provided (FIG. 17, Block 1610), where at least one deck level of the multiple level decks communicates with each aisle, where the multiple level decks and aisles define a rolling surface for an autonomous transport vehicle at each level of the multiple level decks. Racks at multiple rack levels are accessed from a respective rolling surface that is common to the multiple rack levels (FIG. 17, Block 1620), where the racks are disposed along at least one aisle at each level of the multiple level decks. In one aspect, a vertical pitch between rack levels varies for a portion of a respective aisle. In one aspect, the vertical pitch between at least two rack levels of the portion of the respective aisle is related to another vertical pitch between at least two other rack levels of another aisle portion of the respective aisle so that the autonomous transport vehicle effects multiple picks in an ordered sequence in a common aisle pass. In one aspect, the vertical pitch between at least two rack levels of the portion of the respective aisle is related to another vertical pitch between at least two other rack levels of another aisle portion of the respective aisle so that the vertical pitch and the other vertical pitch effects substantially filling a vertical space between the multiple deck levels with stored items.

Figure 5G:
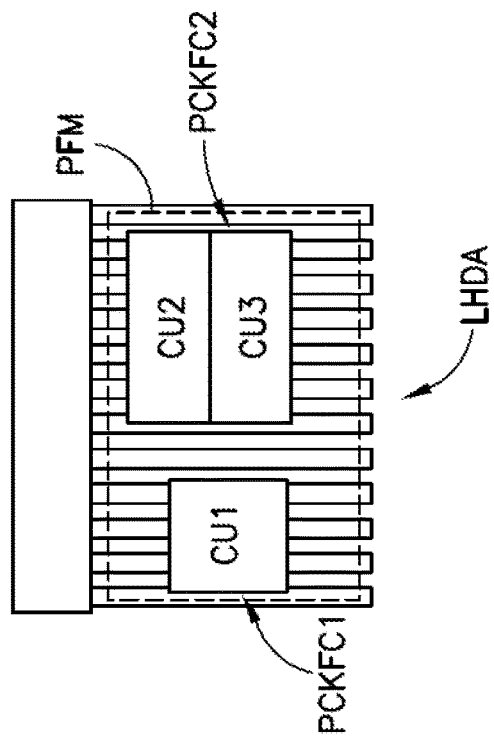
Figure 5F:
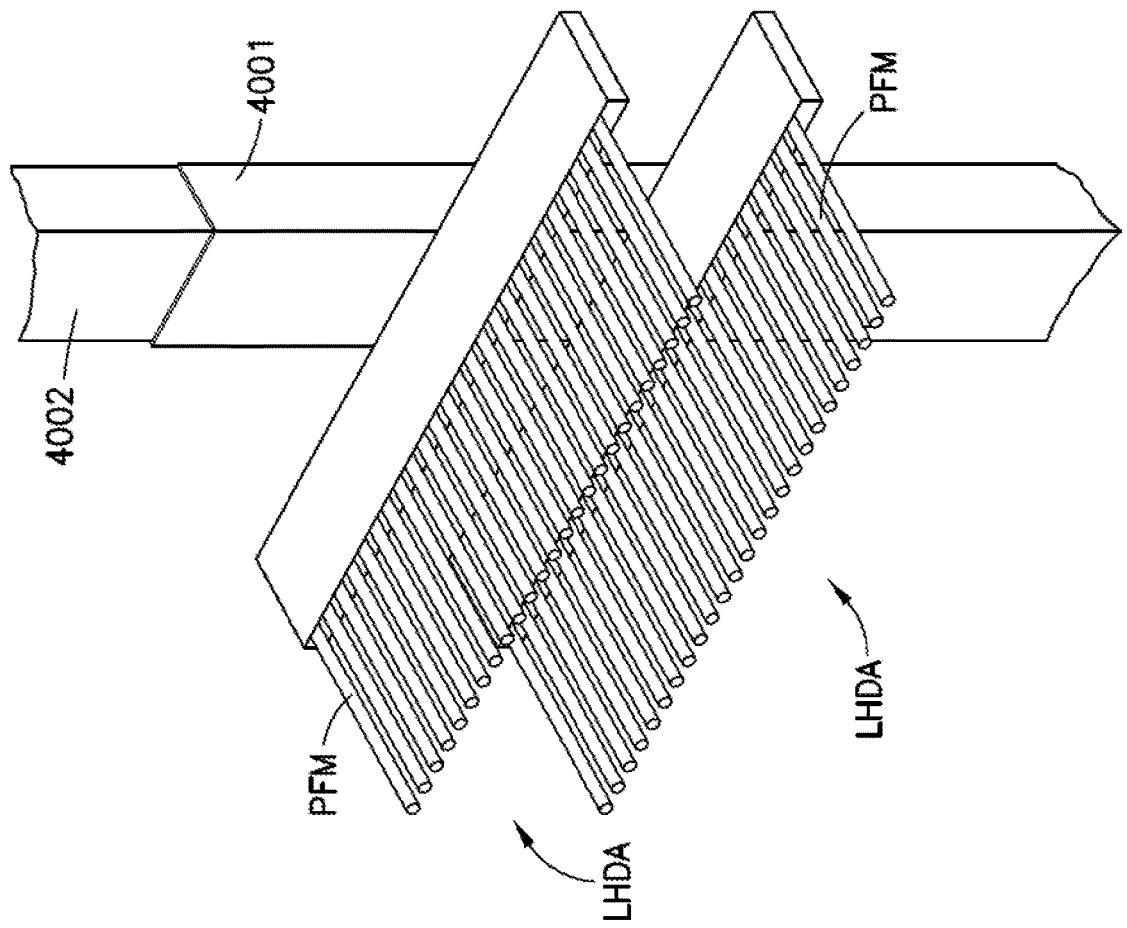

As may be realized, the load handling devices described above are configured to hold one or more pickfaces of differing sizes and/or including any number of case units. For exemplary purposes only, FIG. 5G illustrates a load handing device LHDA holding two pickfaces PCKFC1, PCKFC2. It is noted that load handling device LHDA is shown for illustration purposes only and it should be understood that any of the load handling devices described herein are configured in a manner substantially similar to that described with respect to load handling device LHDA. Here pickface PCKFC1 includes a single case unit CU1 while pickface PCKFC2 includes two case units CU2, CU3 such that pickface PCKFC2 is larger than PCKFC1. In other aspects the pickfaces PCKFC1, PCKFC2 have any suitable size and include any suitable number of case units. As may also be realized, while two pickfaces PCKFC1, PCKFC2 are illustrated being held on the load handling device LHDA in other aspects the load handling device LHDA holds any suitable number of pickfaces such as more than two or less than two. The arrangement of the pickfaces PCKFC1, PCKFC2 (and the case units/totes therein) are, in one aspect, arranged on an inbound or outbound lift 150A, 150B according to a predetermined sequence. As an example, the pickfaces PCKFC1, PCKFC2 are akin to one or more of pickfaces 5, 7 described above.

In accordance with one or more aspects of the disclosed embodiment, a lift includes at least one load handling device configured so as to reciprocate along a lift axis, the load handling device including a frame forming a payload section with a payload support surface having a common elevation configured to hold one or more pickfaces at the common elevation of the payload support surface; at least one transfer arm movably mounted to the frame; and a drive section connected to the load handling device and being configured to move the load handling device along the lift axis; wherein the one or more pickfaces carried in unison by the payload support surface of the at least one load handling device, define an order sequence of pickfaces on the at least one load handling device according to a predetermined case out order sequence of mixed cases.

In accordance with one or more aspects of the disclosed embodiment, the lift further includes a controller connected to the drive section, the controller being configured to effect the defined order sequence of pickfaces on the at least one load handling device according to a predetermined case out order sequence of mixed cases.

In accordance with one or more aspects of the disclosed embodiment, at least one pickface of the one or more pickfaces is a multiple case unit pickface.

In accordance with one or more aspects of the disclosed embodiment, the lift is configured to place the one or more pickfaces in accordance with a predetermined case out order sequence.

In accordance with one or more aspects of the disclosed embodiment, the at least one transfer arm is common to two or more pickfaces such that transfer arm is configured to hold the two are more pickfaces adjacent one another.

In accordance with one or more aspects of the disclosed embodiment, the at least one transfer arm comprises two independently operable transfer arms configured to individually transfer pickfaces to and from the load handling device.

In accordance with one or more aspects of the disclosed embodiment, the at least one load handling device comprises two independently operable load handling device configured to individually transfer pickfaces.

In accordance with one or more aspects of the disclosed embodiment, the load handling device further comprising a justification member disposed within the payload section wherein the controller is configured to control a combined movement of the justification member and the transfer arm to effect the sorting of the two or more case pickfaces carried in the payload section.

In accordance with one or more aspects of the disclosed embodiment, the lift further includes a justification member connected to the drive section and the controller, the justification member being movably mounted to the frame where the transfer arm and the justification member are each independently movable relative to each other.

In accordance with one or more aspects of the disclosed embodiment, the controller is configured to control the drive section and effect movement of the justification member and transfer arm so that the on-the-fly sortation is effected by retention of at least one of the two or more pickfaces within the payload section while at least another of the two or more pickfaces is transferred to or from the payload section.

In accordance with one or more aspects of the disclosed embodiment, the lift is a high speed lift having a pickface transfer transaction rate substantially equal to a pickface transfer transaction rate of an autonomous transport vehicle transferring pickfaces to the reciprocating lift.

In accordance with one or more aspects of the disclosed embodiment, the at least one load handling device is mounted on a mast so as to reciprocate along a length of the mast.

In accordance with one or more aspects of the disclosed embodiment, an automated storage and retrieval system lift includes a frame; at least one payload carriage having a carriage frame with a drive axis and forming a payload section configured to hold one or more payload items, and multiple independent degree of freedom transfer arms arranged on the first payload axis so as to move along a first payload axis transverse to the drive axis, the multiple independent degree of freedom transfer arms being disposed at least partly within the payload section; and wherein the multiple independent degree of freedom transfer arms and the payload section are configured to effect an on-the-fly sorting of the one or more payload items carried in the payload section.

In accordance with one or more aspects of the disclosed embodiment, the at least one payload carriage further comprises a justification member disposed within the payload section so as to move along a second payload axis transverse to the first payload axis.

In accordance with one or more aspects of the disclosed embodiment, the lift further including a controller connected to the justification member and the at least one transfer arm, the controller being configured to control a combined movement of the justification member and the at least one transfer arm to effect an on-the-fly sorting of the one or more payload items carried in the payload section.

In accordance with one or more aspects of the disclosed embodiment, the justification member and the at least one transfer arm are each independently movable relative to each other.

In accordance with one or more aspects of the disclosed embodiment, the controller is configured to effect movement of the justification member and the at least one transfer arm so that the justification member is inserted between two of the one or more payload items to cause a physical separation of the two of the one or more payload items.

In accordance with one or more aspects of the disclosed embodiment, the justification member is configured to bi-directionally move the one or more payload items along the second axis within the payload section.

In accordance with one or more aspects of the disclosed embodiment, wherein the controller is configured to control movement of the justification member and the at least one transfer arm so that sorting is effected by retention of at least one of the one or more payload items within the payload section while at least another of the one or more payload items is transferred to or from the payload section.

In accordance with one or more aspects of the disclosed embodiment, the at least one payload carriage comprises two individually operable payload carriages arranged side by side on the mast so as to travel along the mast independently of each other.

In accordance with one or more aspects of the disclosed embodiment, the at least one transfer arm includes multiple payload holding locations arranged to hold payloads in at least a side by side arrangement to effect a simultaneous transfer of the payloads to and from the at least one transfer arm.

In accordance with one or more aspects of the disclosed embodiment, the transfer arm includes a plurality of payload support tines configured for a pass through transfer of payloads to a payload holding location of a storage and retrieval system.

In accordance with one or more aspects of the disclosed embodiment, the drive axis comprises a common mast on which the multiple independent degree of freedom transfer arms are arranged.

In accordance with one or more aspects of the disclosed embodiment, a storage and retrieval system includes at least one transfer station configured to hold at least one pickface; at least one bot configured to transfer the at least one pickface to and from the at least one transfer station; at least one load handling device mounted so as to reciprocate along a lift axis, the at least one load handling device being in communication with the at least one transfer station and including a frame forming a payload section with a payload support surface having a common elevation configured to hold one or more pickfaces at the common elevation of the payload support surface; at least one transfer arm movably mounted to the frame; a drive section connected to the at least one load handling device and being configured to move the load handling device along the lift axis; wherein the one or more pickfaces carried in unison by the payload support surface of the at least one load handling device, define an order sequence of pickfaces on the at least one load handling device according to the predetermined case out order sequence of differently configured pickfaces.

In accordance with one or more aspects of the disclosed embodiment, the storage and retrieval system further including a controller connected to the drive section, the controller being configured to effect the defined order sequence of pickfaces on the at least one load handling device according to a predetermined case out order sequence between the differently configured pickfaces.

In accordance with one or more aspects of the disclosed embodiment, at least one pickface of the one or more pickfaces is a multiple case unit pickface.

In accordance with one or more aspects of the disclosed embodiment, the at least one load handling device is configured to place the one or more pickfaces in accordance with a predetermined case out order sequence.

In accordance with one or more aspects of the disclosed embodiment, the at least one transfer arm is common to two or more pickfaces such that transfer arm is configured to hold the two are more pickfaces adjacent one another.

In accordance with one or more aspects of the disclosed embodiment, the at least one transfer arm comprises two independently operable transfer arms configured to individually transfer pickfaces to and from the at least one load handling device.

In accordance with one or more aspects of the disclosed embodiment, the at least one load handling device comprises two independently operable load handling device configured to individually transfer pickfaces.

In accordance with one or more aspects of the disclosed embodiment, the at least one load handling device further comprising a justification member disposed within the payload section wherein the controller is configured to control a combined movement of the justification member and the transfer arm to effect the sorting of the two or more case pickfaces carried in the payload section.

In accordance with one or more aspects of the disclosed embodiment, the at least one load handling device further includes a justification member connected to the drive section and the controller, the justification member being movably mounted to the frame where the transfer arm and the justification member are each independently movable relative to each other.

In accordance with one or more aspects of the disclosed embodiment, the controller is configured to control the drive section and effect movement of the justification member and transfer arm so that the on-the-fly sortation is effected by retention of at least one of the two or more pickfaces within the payload section while at least another of the two or more pickfaces is transferred to or from the payload section.

In accordance with one or more aspects of the disclosed embodiment, the at least one load handling device is a high speed lift having a pickface transfer transaction rate substantially equal to a pickface transfer transaction rate of an autonomous transport vehicle transferring pickfaces to the at least one load handling device.

In accordance with one or more aspects of the disclosed embodiment, an order sequence of the differently configured pickfaces is independent from an order sequence of pickfaces at the transfer station.

In accordance with one or more aspects of the disclosed embodiment, a method includes picking a pickface with a common platform of a lift, the pickface being in an ordered sequence on the common platform; and substantially simultaneously placing the pickface, with the common platform, in the ordered sequence at an outbound pickface holding location.

In accordance with one or more aspects of the disclosed embodiment, the pickface includes mixed case units.

In accordance with one or more aspects of the disclosed embodiment, the pickface includes more than one different pickface.

In accordance with one or more aspects of the disclosed embodiment, the pickface is picked from a common level of a pickface holding location.

In accordance with one or more aspects of the disclosed embodiment, the pickface is picked from multiple levels of pickface holding locations.

In accordance with one or more aspects of the disclosed embodiment, a method includes picking more than one pickface with a common platform of a lift; and effecting, with the lift, an on-the-fly sortation of the more than one pickface.

In accordance with one or more aspects of the disclosed embodiment, the on-the-fly sortation of the more than one pickface includes traversing, with the common platform, a stack of pickface holding locations in a common direction.

In accordance with one or more aspects of the disclosed embodiment, a method includes picking at least one pickface with a common platform of a lift; and placing, with the lift, the at least one pickface at an outbound pickface holding location in one offload step, where the at least one pickface has a sorted arrangement at offload.

In accordance with one or more aspects of the disclosed embodiment, the at least one pickface includes mixed case units.

In accordance with one or more aspects of the disclosed embodiment, the at least one pickface includes more than one different pickface.

In accordance with one or more aspects of the disclosed embodiment, the at least one pickface is picked from a common level of a pickface holding location.

In accordance with one or more aspects of the disclosed embodiment, the at least one pickface is picked from multiple levels of pickface holding locations.

In accordance with one or more aspects of the disclosed embodiment, a lift includes at least one load handling device mounted so as to reciprocate along a lift axis, the load handling device including a frame forming a payload section with a common payload support platform configured to hold one or more pickfaces on the common payload support platform; at least one transfer arm movably mounted to the frame; a drive section connected to the load handling device and being configured to move the load handling device along the lift axis; and a controller connected to the drive section and being configured to effect picking more than one pickface with the common payload support platform, and an on-the-fly sortation of the more than one pickface with the common payload support platform.

In accordance with one or more aspects of the disclosed embodiment, the controller is configured to effect picking of the more than one pickface, with the common payload support platform, in an ordered sequence and placing the one or more pickfaces, with the common payload support platform, in the ordered sequence at an outbound pickface holding location.

In accordance with one or more aspects of the disclosed embodiment, the controller is configured to effect the on-the-fly sortation of the more than one pickface where the common payload support platform traverses a stack of pickface holding locations in a common direction.

In accordance with one or more aspects of the disclosed embodiment, the controller is configured to effect placement of more than one pickface at an outbound pickface holding location in one offload step, where the more than one pickface has a sorted arrangement at offload.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A lift comprising:
   at least one load handling device configured so as to vertically reciprocate along a vertical axis, the load handling device including
     a frame forming a payload section with a payload support surface having a common elevation configured to hold one or more pickfaces at the common elevation of the payload support surface;
     at least one transfer arm movably mounted to the frame; and
     a drive section connected to the load handling device and being configured to move the load handling device along the vertical axis;
   wherein the one or more pickfaces carried by the payload support surface of the at least one load handling device are disposed by carriage with the payload support surface so that, on exit from the payload support surface, the one or more pickfaces define an order sequence of pickfaces on the at least one load handling device according to a predetermined case out order sequence of mixed cases.

2. The lift of claim 1, further comprising a controller connected to the drive section, the controller being configured to effect the defined order sequence of pickfaces on the at least one load handling device according to a predetermined case out order sequence of mixed cases.

3. The lift of claim 1, wherein at least one pickface of the one or more pickfaces is a multiple case unit pickface.

4. The lift of claim 1, wherein the lift is configured to place the one or more pickfaces in accordance with a predetermined case out order sequence.

5. The lift of claim 1, wherein the at least one transfer arm is common to two or more pickfaces such that transfer arm is configured to hold the two are more pickfaces adjacent one another.

6. The lift of claim 1, wherein the at least one transfer arm comprises two independently operable transfer arms configured to individually transfer pickfaces to and from the load handling device.

7. The lift of claim 1, wherein the at least one load handling device comprises two independently operable load handling device configured to individually transfer pickfaces.

8. The lift of claim 1, wherein the lift is a high speed lift having a pickface transfer transaction rate substantially equal to a pickface transfer transaction rate of an autonomous transport vehicle transferring pickfaces to the vertically reciprocating lift.

9. The lift of claim 1, wherein the at least one load handling device is mounted on a mast so as to reciprocate along a length of the mast.

10. A storage and retrieval system comprising:
    at least one transfer station configured to hold at least one pickface;
    at least one bot configured to transfer the at least one pickface to and from the at least one transfer station;
    at least one load handling device mounted so as to reciprocate along a lift axis, the at least one load handling device being in communication with the at least one transfer station and including
      a frame forming a payload section with a payload support surface having a common elevation configured to hold one or more pickfaces at the common elevation of the payload support surface;

at least one transfer arm movably mounted to the frame;

a drive section connected to the load handling device and being configured to move the at least one load handling device along the lift axis;

wherein the one or more pickfaces carried by the payload support surface of the at least one load handling device are disposed by carriage with the payload support surface so that, on exit from the payload support surface, the one or more pickfaces define an order sequence of pickfaces on the at least one load handling device according to a predetermined case out order sequence of differently configured pickfaces.

11. The lift of claim 10, further comprising a controller connected to the drive section, the controller being configured to effect the defined order sequence of pickfaces on the at least one load handling device according to a predetermined case out order sequence between the differently configured pickfaces.

12. The storage and retrieval system of claim 10, wherein at least one pickface of the one or more pickfaces is a multiple case unit pickface.

13. The storage and retrieval system of claim 10, wherein the load handling device is configured to place the one or more pickfaces in accordance with a predetermined case out order sequence.

14. The storage and retrieval system of claim 10, wherein the at least one transfer arm is common to two or more pickfaces such that transfer arm is configured to hold the two or more pickfaces adjacent one another.

15. The storage and retrieval system of claim 10, wherein the at least one transfer arm comprises two independently operable transfer arms configured to individually transfer pickfaces to and from the at least one load handling device.

16. The storage and retrieval system of claim 10, wherein the at least one load handling device comprises two independently operable load handling device configured to individually transfer pickfaces.

17. The storage and retrieval system of claim 10, wherein the at least one load handling device is a high speed lift having a pickface transfer transaction rate substantially equal to a pickface transfer transaction rate of an autonomous transport vehicle transferring pickfaces to the at least one load handling device.

18. The storage and retrieval system of claim 10, wherein an order sequence of the differently configured pickfaces is independent from an order sequence of pickfaces at the transfer station.

19. A method comprising:

picking two or more pickfaces with a common platform of a lift, the two or more pickfaces being in an ordered sequence relative to each other on the common platform; and substantially simultaneously placing the one or more pickfaces, with the common platform, so that, upon placement from the common platform, the one or more pickfaces defines an ordered sequence of pickfaces at an outbound pickface holding location.

20. The method of claim 19, wherein the one or more pickfaces include mixed case units.

21. The method of claim 19, wherein the one or more pickfaces are picked from a common level of a pickface holding location.

22. The method of claim 19, wherein the one or more pickfaces are picked from multiple levels of pickface holding locations.

* * * * *

UNITED STATES PATENT AND TRADEMARK OFFICE
CERTIFICATE OF CORRECTION

PATENT NO. : 10,954,066 B2  
APPLICATION NO. : 16/284930  
DATED : March 23, 2021  
INVENTOR(S) : Pankratov et al.

Page 1 of 1

It is certified that error appears in the above-identified patent and that said Letters Patent is hereby corrected as shown below:

On the Title Page

ASSIGNEE should be "SYMBOTIC LLC"

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*